(12) United States Patent
Harvey et al.

(10) Patent No.: US 12,261,341 B2
(45) Date of Patent: Mar. 25, 2025

(54) COMPACT FUEL CELL MODULES AND ASSEMBLIES

(71) Applicant: CH INNOVATIONS INC., Vancouver (CA)

(72) Inventors: David B. Harvey, Dresden (DE); Rudolf Coertze, Chemnitz (DE)

(73) Assignee: CH INNOVATIONS INC., Vancouver (CA)

( * ) Notice: Subject to any disclaimer, the term of this patent is extended or adjusted under 35 U.S.C. 154(b) by 0 days.

(21) Appl. No.: 17/597,639

(22) PCT Filed: Jul. 16, 2020

(86) PCT No.: PCT/CA2020/050992
§ 371 (c)(1),
(2) Date: Jan. 14, 2022

(87) PCT Pub. No.: WO2021/007678
PCT Pub. Date: Jan. 21, 2021

(65) Prior Publication Data
US 2022/0278347 A1  Sep. 1, 2022

(30) Foreign Application Priority Data

Jul. 16, 2019 (DE) .......................... 102019119304.4

(51) Int. Cl.
*H01M 8/2483* (2016.01)
*H01M 8/026* (2016.01)
(Continued)

(52) U.S. Cl.
CPC ......... *H01M 8/2483* (2016.02); *H01M 8/026* (2013.01); *H01M 8/0265* (2013.01); *H01M 8/0267* (2013.01); *H01M 2008/1095* (2013.01)

(58) Field of Classification Search
CPC .. H01M 8/2483; H01M 8/026; H01M 8/0265; H01M 8/0267; H01M 8/0258; H01M 2008/1095
See application file for complete search history.

(56) References Cited

U.S. PATENT DOCUMENTS 6,531,238 B1  3/2003  King
6,677,069 B1  1/2004  Piascik et al.
(Continued)

FOREIGN PATENT DOCUMENTS

| CN | 1495955 A | 5/2004 |
| CN | 1643718 A | 7/2005 |

(Continued)

OTHER PUBLICATIONS

Renewable Energy Resources, vol. 32, No. 12, "Research Status on Flow Field of PEM Fuel Cell", Dec. 20, 2014, Chen Shizhong, Liu Jian, Chen Ning, Wu Yuhoul, relevant pp. 142-150.

(Continued)

*Primary Examiner* — Eugenia Wang
(74) *Attorney, Agent, or Firm* — OYEN, WIGGS, GREEN & MUTALA LLP

(57) ABSTRACT

Flow field plates for fuel cells may include an interior region bounded by an interior boundary that contains openings which, when the flow field plates are stacked, form plural headers extending along a fuel cell stack. A flow field may surround the interior boundary. The headers may include headers for fuel, oxidant and coolant for example. The flow field may include elements that direct flow of a reactant in a radial direction and/or in a circumferential direction. A fuel cell stack may be enclosed in a housing that compresses the stack. In some embodiments plural fuel cells are combined in a power unit in which the fuel cell stacks are received within a fuel cell block equipped with a fluid manifolding (Continued)

stack interface that provides fluid interfaces to the headers of the fuel cell stack.

28 Claims, 38 Drawing Sheets

(51) Int. Cl.
*H01M 8/0265* (2016.01)
*H01M 8/0267* (2016.01)
*H01M 8/10* (2016.01)

(56) References Cited

U.S. PATENT DOCUMENTS

| | | | |
|---|---|---|---|
| 6,773,843 B2 | 8/2004 | Kitagawa et al. | |
| 7,150,932 B1 | 12/2006 | Hofler et al. | |
| 7,846,608 B2 | 12/2010 | Dong et al. | |
| 10,062,913 B2 | 8/2018 | Leger et al. | |
| 10,686,199 B2 | 6/2020 | Leger et al. | |
| 2003/0235751 A1 | 12/2003 | Kelly et al. | |
| 2004/0033410 A1 | 2/2004 | Brady et al. | |
| 2004/0043270 A1 | 3/2004 | Tsunoda | |
| 2004/0137306 A1 | 7/2004 | Turpin et al. | |
| 2004/0234836 A1* | 11/2004 | Orishima | H01M 8/2432 429/457 |
| 2005/0170235 A1 | 8/2005 | Hu et al. | |
| 2005/0271909 A1 | 10/2005 | Bai et al. | |
| 2006/0088743 A1 | 4/2006 | Gallagher et al. | |
| 2007/0141440 A1 | 6/2007 | Yang et al. | |
| 2009/0208803 A1 | 8/2009 | Farrington | |
| 2010/0081016 A1 | 4/2010 | Sugiura et al. | |
| 2015/0180079 A1* | 6/2015 | Leger | H01M 8/04201 429/437 |
| 2019/0140289 A1 | 5/2019 | Leger et al. | |

FOREIGN PATENT DOCUMENTS

| | | |
|---|---|---|
| CN | 1885604 A | 12/2006 |
| CN | 1917265 A | 2/2007 |
| CN | 101044650 A | 9/2007 |
| CN | 101656320 B | 1/2012 |
| CN | 106129436 A | 11/2016 |
| CN | 111370726 B | 10/2021 |
| JP | 2004 146345 A | 5/2004 |
| JP | 5178056 B2 | 4/2013 |
| WO | 2003012903 A1 | 2/2003 |
| WO | 2013011609 A1 | 1/2013 |
| WO | 2014026287 A1 | 2/2014 |
| WO | 2014042136 A1 | 3/2014 |

OTHER PUBLICATIONS

Extended European Search Report dated Jun. 27, 2024.
Search Report issued on Chinese patent application No. 202080064543.3 dated Jun. 11, 2024.
Compact mixed-reactant fuel cells, Priestnall Ma et al., Journal of Power Sources, vol. 106, Apr. 1, 2002.
Extended European Search Report issued on European patent application No. 20841417.7 dated Jul. 24, 2024.

* cited by examiner 2100e
2100f
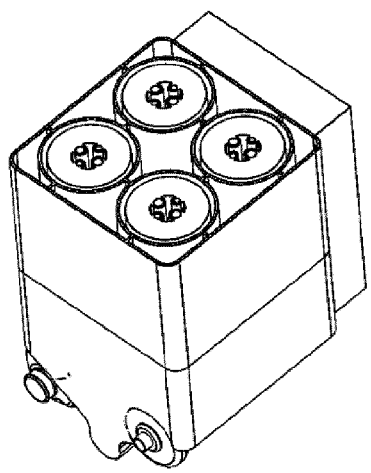
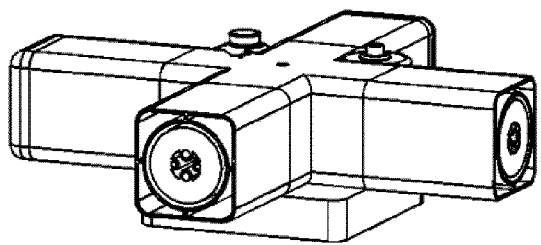
FIGURE 21E
FIGURE 21F
2100g
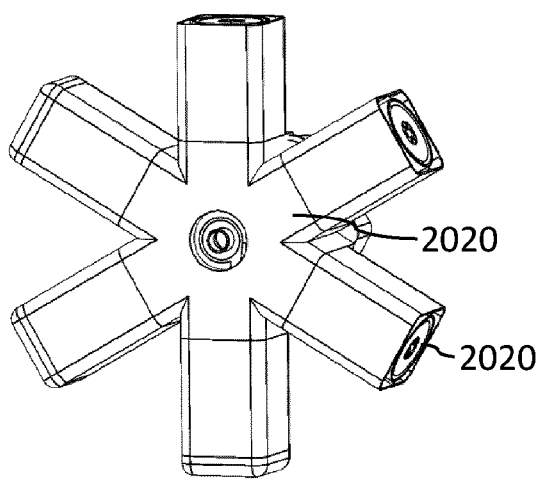
FIGURE 21G

COMPACT FUEL CELL MODULES AND ASSEMBLIES

CROSS-REFERENCE TO RELATED APPLICATIONS

This application claims priority under the Paris Convention from DE patent application No. 10 2019 119 304.4 filed 16 Jul. 2019 and entitled COMPACT FUEL CELL MODULE AND FUEL CELL ENGINE BLOCK which is hereby incorporated herein by reference for all purposes.

FIELD

The present invention relates to electrochemical fuel cells, integrated fuel cell systems (e.g. power units) and fuel cell parts (e.g. flow field plates and membrane electrode assemblies).

BACKGROUND

A fuel cell is an electrochemical cell that converts chemical energy of a fuel (for example, hydrogen) and an oxidizing agent (for example, oxygen) into electricity through an electrochemical reaction. Planar fuel cells can be assembled in series with one another to form a fuel cell stack (also referred to herein as a 'stack'). Each fuel cell typically includes a membrane electrode assembly (MEA) which is pressed between two electrical current collectors referred to herein as bipolar plates.

A fuel cell module includes a fuel cell stack and, optionally, other components, for example a housing. A fuel cell system includes a fuel cell module and balance of plant components, for example air, fuel and control systems. "Balance of plant" refers to supporting components and auxiliary systems of a power plant (for example, a fuel cell power plant) other than the power-generating unit itself (for example, the fuel cell stack or module).

The bipolar plates of a fuel cell may include flow fields that deliver hydrogen fuel and oxygen (typically as air from the environment) to sites where an electrochemical reaction to convert reactant gases into electrical power can occur. The bipolar plates may also include flow fields to discharge products of the electrochemical reaction, for example water.

A bipolar plate can act as an anode for one cell and a cathode for an adjacent cell, and may include an anode plate and a cathode plate. A bipolar plate may be made of metal or a conductive polymer (which may be a carbon-filled composite, for example). A bipolar plate usually incorporates flow channels for fluid feeds, and may also contain conduits for heat transfer. A bipolar plate typically has flow fields on opposite sides of the anode and cathode plates for the distribution of reactant gases (hydrogen and air, for example). There is usually another set of flow channels, referred to herein as coolant channels, for flow of a coolant to cool fuel cells in the stack. The coolant may be water, water-glycol, or air, for example. Air supplied to the fuel cell as an oxidant may also be used as a coolant.

There is a need for fuel cells that are compact and offer a high power density for diverse applications such as powering vehicles.

SUMMARY

The present technology has a number of aspects. These aspects may be applied individually or in suitable combinations. Aspects of the technology include, without limitation:

Fuel cell layout;
Flow field plate design;
Combination of layout and flow field plate design;
Integration and packaging of fuel cell modules; and
Fuel cell power units.

One example aspect of the invention provides a fuel cell stack. The fuel cell stack comprises a plurality of fuel cells configured to provide an oxidant header, a fuel input header, and a fuel output header that extends through the plurality of fuel cells along the stack. Each of the plurality of fuel cells comprises a membrane electrode assembly sandwiched between first and second flow field plates. The membrane electrode assembly and flow field plates each have a major surface where an interior region is bounded by an interior perimeter and an exterior region is bounded by the interior perimeter and an exterior perimeter that encompasses the interior perimeter. The interior region is formed with a plurality of openings that collectively fill a majority of an area of the interior region. The plurality of openings include at least: an oxidant opening, a fuel inlet opening, and a fuel outlet opening. The oxidant openings of the flow field plates and membrane electrode assembly are aligned to provide the oxidant header. The fuel inlet openings of the flow field plates and membrane electrode assembly are aligned to provide the fuel input header. The fuel outlet openings of the flow field plates and membrane electrode assembly are aligned to provide the fuel output header. The first and second flow field plates are respectively formed to provide first and second flow fields respectively located in the exterior regions of the first and second flow field plates that face the membrane electrode assembly and extend substantially circumferentially around the interior region. The fuel input header and the fuel output header are both in fluid communication with the first flow field. The oxidant header is in fluid communication with the second flow field.

In some embodiments, the first and second flow fields each cover at least 90% of an area of the exterior region. In some embodiments, the ratio of the area of the exterior region to the area of the interior region is at least 3:1. In some embodiments, the first and second flow fields extend radially outward from the interior perimeter. In some embodiments, the first and second flow fields each have an annular configuration. In some embodiments, the first and second flow fields are each bounded by the interior and exterior perimeters. In some embodiments, the first and second flow fields extend radially outwardly to a polygonal outer boundary.

In some embodiments, the exterior perimeter follows outside edges of the first and second flow field plates. In some embodiments, the interior perimeter is circular. In other embodiments, the interior perimeter is polygonal. For example, the interior perimeter may be hexagonal, rectangular, etc. In some embodiments, the interior perimeter and the exterior perimeter are concentric circles. In some embodiments, the exterior perimeter is circular. In other embodiments, the exterior perimeter is polygonal. For example, the exterior perimeter may be hexagonal or rectangular.

In some embodiments, the oxidant opening in each of the first and second flow field plates has an area that is at least equal to a combined area of the fuel inlet opening and the fuel outlet opening. For example, the area of the oxidant opening may be at least twice the combined area of the fuel inlet opening and the fuel outlet opening.

In some embodiments, the first flow field comprises a first transition region located adjacent to a first tier of one or more tiers. In these embodiments, each of the one or more tiers comprises a respective plurality of channels wherein adjacent ones of the channels are separated by a respective landing, and wherein the transition region is configured to provide a hydraulic resistance to flow that is less than a hydraulic resistance of the first tier. For example, the hydraulic resistance of the first transition region may be at least 10% lower than the hydraulic resistance of the first tier. The first transition region may have a depth that is greater than depths of the channels of the first tier. The first transition region may be substantially free of landings. The one or more tiers may comprise a plurality of tiers, and the fuel cell stack may optionally comprise one or more additional transition regions located between two adjacent tiers. The one or more additional transition regions have depths that are greater than an average depth of the channels of the adjacent ones of the plurality of tiers. The one or more additional transition regions may follow arcuate paths. In some embodiments, the first flow field is a circumferential flow field, and the channels of the one or more tiers are curved to direct a flow of fluid from the fuel input header around the interior perimeter to the fuel outlet header. In some embodiments, the first transition region extends radially. For example, the first transition region may extend from the interior perimeter to the exterior perimeter. In some embodiments, the one or more tiers comprise a plurality of tiers that are spaced circumferentially around the interior perimeter. In some embodiments, the first flow field is a radial flow field, the one or more tiers are spaced radially, the respective plurality of channels of each tier are oriented radially, and the first transition region is a circumferential transition region that is adjacent to, and surrounds, the interior perimeter. Each of the plurality of tiers may substantially fill a corresponding annular region of the first flow field. Each of the plurality of tiers may comprise a different number of the channels. In some embodiments, the channels of a second tier of the one or more tiers are tapered in width. In some embodiments, the landings of a second tier of the one or more tiers are tapered in width. In some embodiments, the tiers of the first flow field are arranged to guide a flow of fuel from the fuel input header by distributing the flow of fuel along the first transition region, allowing the flow of fuel to flow from the first transition region, through the one or more tiers, collecting the flow and guiding the flow to the fuel output header. Guiding the flow of fuel to the fuel output header may sometimes comprise guiding the flow radially inward toward the fuel output header.

In some embodiments, the plurality of openings that collectively fill a majority of the area of the interior region include a first coolant opening, and the first coolant openings of the flow field plates and membrane electrode assembly are aligned to provide a first coolant header that extends along the fuel cell stack, wherein the first coolant header is in fluid communication with a third flow field in each of the fuel cells. The plurality of openings that collectively fill a majority of the area of the interior region may include a second coolant opening, and the second coolant openings of the flow field plates and membrane electrode assembly may be aligned to provide a second coolant header that extends along the fuel cell stack, wherein the second coolant header is in fluid communication with the third flow field in each of the fuel cells.

In some embodiments, at least one of the fuel input header and the fuel output header are in fluid communication with the first flow field by way of a transition that penetrates through the first flow field plate. In some embodiments, the second flow field comprises a first transition region located adjacent to a first tier of one or more tiers of the second flow field, and each of the one or more tiers of the second flow field comprises a respective plurality of channels wherein adjacent ones of the channels of the second flow field are separated by a respective landing, and wherein the first transition region of the second flow field is configured to provide a hydraulic resistance to flow that is less than a hydraulic resistance of the first tier of the second flow field.

In some embodiments, the hydraulic resistance of the first transition region of the second flow field is at least 10% lower than the hydraulic resistance of the first tier of the second flow field. In some embodiments, the first transition region of the second flow field has a depth that is greater than depths of the channels of the first tier of the second flow field. In some embodiments, the first transition region of the second flow field is substantially free of landings.

In some embodiments, the second flow field is a radial flow field, and the second flow field plate defines an outer surface that extends around the second flow field and the outer surface is apertured to allow passage of an oxidant through the outer surface. In some embodiments, the one or more tiers of the second flow field comprise a plurality of tiers. In some embodiments, the second flow field comprises one or more additional transition regions located between two adjacent ones of the plurality of tiers. For example, the one or more additional transition regions of the second flow field may have depths that are greater than an average depth of the channels of the adjacent ones of the plurality of tiers. The one or more additional transition regions of the second flow field may follow arcuate paths.

In some embodiments, the second flow field is a radial flow field, the one or more tiers of the second flow field are spaced radially, the respective plurality of channels of each tier of the second flow field are oriented radially, and the first transition region of the second flow field is a circumferential transition region that is adjacent to, and surrounds, the interior perimeter. In some embodiments, each of the plurality of tiers of the second flow field substantially fills a corresponding annular region of the second flow field.

In some embodiments, the first and second flow field plates are circular. In some embodiments, the fuel cell stack comprises a housing enclosing the fuel cells and configured to apply axial compression to the fuel cells of the fuel cell stack. The full cell stack may optionally comprise a coupler on the housing, where the coupler comprises ports connected to provide fluid connections to the fuel input header, the fuel output header and the oxidant header. The coupler may comprise a twist to lock coupling, a quick connect coupling and/or a bayonet coupling. In some embodiments, the housing is cylindrical.

In some embodiments, the fuel cell stack comprises an end cap at one end of the fuel cell stack. In some embodiments, the fuel cell stack comprises a humidifier in the end cap. In some embodiments, the fuel cell stack comprises a purge valve in the end cap. In some embodiments, the fuel cell stack comprises a fuel pump in the end cap and the fuel pump is operative to pump fuel into the fuel inlet header or out of the fuel outlet header.

Another aspect of the invention relates to a fuel cell assembly. The fuel cell assembly comprises at least one fuel cell stack having features described above and/or elsewhere herein and a fuel cell block The fuel cell block comprises a cavity, a fuel inlet passageway for directing fuel to the fuel inlet header of the fuel cell stack, a fuel outlet passageway for collecting a fuel exhaust stream from the fuel outlet header of the fuel cell stack, and an oxidant passageway for directing oxidant to, or collecting an oxidant exhaust stream from the oxidant header of the fuel cell stack and a fluid manifolding stack interface. The fuel cell stack is received within the cavity and the fluid manifolding stack interface fluidly couples the fuel inlet header to the fuel inlet passageway in the block, the fuel outlet header to the fuel outlet passageway in the block, and the oxidant header to the oxidant passageway in the block.

In some embodiments, the fuel cell assembly comprises a plurality of the fuel cell stacks each received in a corresponding cavity within the block. In some embodiments, each respective fuel cell stack in the block comprises a respective coolant inlet header and a respective coolant outlet header, and the fuel cell block comprises a coolant inlet passageway for directing coolant to the coolant inlet header of each respective fuel cell stack; and a coolant outlet passageway for collecting a coolant exhaust stream from the coolant outlet header of each respective fuel cell stack wherein the fluid manifolding stack interface fluidly couples the coolant inlet header of each respective fuel cell stack to the coolant inlet passage and couples the coolant outlet header of each respective fuel cell stack to the coolant outlet passage.

In some embodiments, the fuel cell block is a first block, and the fuel cell assembly comprises a second block and each of the first and second blocks receives a plurality of the fuel cell stacks. The second block and first block may be arranged in a vee configuration. Each of the first and second blocks may be coupled to a third block containing BOP equipment coupled to the pluralities of fuel cell stacks by way of respective fluid manifolding stack interfaces.

Another aspect of the invention relates to a fuel cell power unit. The fuel cell power unit comprises at least one fuel cell block, a fluid manifolding stack interface, and a plurality of fuel cell modules. Each of the fuel cell modules comprises a respective fuel cell stack comprising a plurality of fuel cells. Each of the respective fuel cell stacks comprises a respective fuel inlet header, a respective fuel outlet header, and a respective first oxidant header. The fuel cell block comprises a fuel inlet passageway for directing fuel to the fuel inlet headers, a fuel outlet passageway for collecting a fuel exhaust stream from the fuel outlet headers, and an oxidant passageway for directing oxidant to, or collecting an oxidant exhaust stream from, the first oxidant headers. For each of the fuel cell stacks in the fuel cell block, the fluid manifolding stack interface fluidly couples the fuel inlet header to the fuel inlet passageway, fluidly couples the fuel outlet header to the fuel outlet passageway, and fluidly couples the first oxidant header to the first oxidant passageway (in the plurality of fuel cell stacks to the respective passageway in the fuel cell engine block).

In some embodiments, each of the fuel cell stacks comprises a respective coolant inlet header and a respective coolant outlet header, and the fuel cell block comprises a coolant inlet passageway for directing coolant to the coolant inlet headers, and a coolant outlet passageway for collecting a coolant exhaust stream from the coolant outlet headers. In these embodiments, the fluid manifolding stack interface fluidly couples each of the coolant inlet headers to the coolant inlet passageway and fluidly couples each of the coolant outlet headers to the coolant outlet passageway.

In some embodiments, each of the fuel cell stacks is enclosed in a housing. Each of the fuel cell stacks may be provided in a module that comprises the respective housing enclosing the fuel cell stack. Each of the modules may optionally comprise means for axially compressing the respective stack of fuel cells. In some embodiments, the housing is removable from the at least one fuel cell block as a unit. Each of the modules may comprises a coupler configured to releasably mechanically couple the respective module to the fuel cell block. Each of the modules may optionally comprise first electrical contacts, and the fuel cell block may optionally comprise second electrical contacts corresponding to each of the modules and when the module is coupled to the fuel cell block by the coupler the corresponding first and second electrical contacts are in electrical contact. In some embodiments, the module comprises a first plurality of fluid couplings, and for each of the modules, the fuel cell block comprises a second plurality of fluid couplings respectively configured to mate with one of the first plurality of couplings and when the module is coupled to the fuel cell block by the coupler the corresponding first and second plurality of couplings are coupled to one another.

In some embodiments, the fuel cell block comprises plates located at opposing ends of each of the fuel cell stacks and the fuel cell stacks are compressed between the respective plates. In some embodiments, the at least one fuel cell block is coupled to a second block containing balance of plant components. The one or more balance of plant components may include one or more components selected from: an oxidant compressor, an oxidant humidifier, a coolant pump, a fuel pump, a controller, a power converter, power electronics, valves, actuators, and sensors. In some embodiments, at least one fuel cell block comprises a chamber which receives each of the plurality of fuel cell stacks and a removable lid covering the chamber.

In some embodiments, in each of the plurality of fuel cell stacks the respective fuel inlet header, the fuel outlet header and the first oxidant header extend longitudinally through an interior of the fuel cell stack. In these embodiments, the fuel cell power unit may optionally comprises a second oxidant header for each of the respective fuel cell stacks, the second oxidant header located in a gap provided between the fuel cell stack and the fuel cell block.

In some embodiments, the fluid manifolding stack interface is connected to feed an oxidant stream to opposing ends of the first oxidant header in each of the fuel cell stacks. In some embodiments, each of the fuel cell stacks has a cylindrical configuration. The fuel inlet and outlet headers and the first oxidant header may be located in a central cylindrical duct of the fuel cell stack.

In some embodiments, the fuel cell power unit comprises two to thirty of the fuel cell stacks. In some embodiments, the fuel cell power unit comprises a plurality of the fuel cell blocks mounted to the second block. Each of the plurality of fuel cell blocks may contain a plurality of the fuel cell stacks. In some embodiments, the at least one fuel cell block comprises a plurality of fuel cell blocks. In some embodiments, the plurality of fuel cell blocks comprise a first fuel cell block and a second fuel cell block and each of the first and second fuel cell blocks supports two to five of the fuel cell stacks. The first and second fuel cell blocks may be arranged in a vee configuration. In some embodiments, the fuel cell stacks are arranged in a vertical inclined configuration, a vertical configuration, a vee configuration, a horizontal configuration, a boxer configuration, a revolver configuration or a radial configuration.

In some embodiments, each of the one or more fuel cell blocks and a corresponding plurality of the fuel cell stacks are arranged side by side in a line. In some embodiments, a first set of the fuel cell stacks are oriented with their axes parallel to a first direction and a second set of the fuel cell stacks are oriented with their axes parallel to a second direction different from the first direction.

In some embodiments, the fuel cell power unit comprises a fuel source connected to supply a fuel to the fuel inlet passageway. In some embodiments, the fuel cell power unit comprises a source of compressed air connected to supply a compressed air to the first oxidant passageway. In some embodiments, the fuel inlet passageway, the fuel outlet passageway and the first oxidant passageway comprise passageways molded into the at least one fuel cell block. In some embodiments, the fuel cell power unit comprises an electrical block heater in thermal contact with the at least one fuel cell block. In some embodiments, the fuel cell power unit comprises a common distribution system which is: at least partly housed in the at least one fuel cell block, coupled to the fuel inlet passageway and the first oxidant passageway, coupled to feed reactants to the fuel cell stacks, and comprises a plurality of selectively controllable valves operable to control, regulate and/or balance with respect to one another the supply of reactants to the fuel cell stacks.

In some aspects of the invention, any embodiment of the fuel cell power unit described herein may comprise any embodiment of the fuel cell stacks described herein.

Another aspect of the invention relates to a fuel cell power unit comprising a fuel cell block and at least one fuel cell module. The fuel cell module comprises a plurality of headers including: a fuel inlet header, a fuel outlet header, an oxidant inlet header, and an oxidant outlet header. The fuel cell block comprises a plurality of passageways including: a fuel inlet passageway for directing fuel to the fuel inlet header, a fuel outlet passageway for collecting a fuel exhaust stream from the fuel outlet header, an oxidant inlet passageway for directing oxidant to the oxidant inlet header, and an oxidant outlet passageway for collecting an oxidant exhaust stream from the oxidant outlet header. The fuel cell module is mechanically coupled to the fuel cell block via a coupling device, the coupling device configured to fluidly couple each of the plurality of headers of the fuel cell module to the corresponding one of the plurality of passageways of the fuel cell block.

In some embodiments, the coupling device includes a quick-connect fastener. The quick-connect fastener may, for example, comprise a rotational fastener. In some embodiments, the fuel cell module comprises a fuel cell stack as described above or elsewhere herein. In some embodiments, the fuel cell module comprises a fuel cell stack enclosed in a housing. The housing may have a cylindrical configuration and the quick connect fastener is on one end of the housing.

Another aspect of the invention relates to a flow field plate comprising a flow field. The flow field comprises one or more tiers. Each tier comprises a respective plurality of channels. Each pair of adjacent channels of the respective plurality of channels is separated by a respective landing. A first tier of the one or more tiers has an adjacent transition region extending along one side of the first tier such that the channels of the first tier are in fluid communication with the adjacent transition region. The adjacent transition region has a width and depth such that a hydraulic resistance of the adjacent transition region is less than a hydraulic resistance of the first tier.

In some embodiments, the hydraulic resistance of the adjacent transition region is at least 10% lower than the hydraulic resistance of the first tier. In some embodiments, a cross sectional area of the adjacent transition region is at least 10% lower than a cross sectional area of the channels of the first tier. In some embodiments, the flow field is a radial flow field comprising the one or more tiers, the one or more tiers are annular and spaced radially, the respective plurality of channels of each tier are oriented radially, and the adjacent transition region is a circumferential transition region that extends circumferentially around a center of curvature of the one or more tiers. In some embodiments, the flow field is a circumferential flow field comprising the one or more tiers, the one or more tiers are spaced circumferentially, the respective plurality of channels of each tier are oriented circumferentially, and the adjacent transition region extends radially.

In some embodiments, the depth of the adjacent transition region is greater than an average depth of the plurality of channels of the first tier. In some embodiments, the flow field plate is circular. In some embodiments, the at least one tier comprises a second tier. In these embodiments, the plurality of channels of the second tier may be converging or diverging channels which are narrower at a first end of the second tier than they are at a second end of the second tier. In some embodiments, the landings of the second tier are converging or diverging landings which are narrower at a first end of the second tier than they are at a second end of the second tier. The second tier may be an innermost tier of the one or more tiers. Alternatively, the second tier may be an outermost tier of the one or more tiers.

Another aspect of the invention relates to a flow field plate comprising a flow field. The flow field comprises one or more tiers. Each tier comprises a respective plurality of channels. Each pair of adjacent channels of the respective plurality of channels is separated by a respective landing. A first tier of the one or more tiers has a first adjacent transition region extending along one side of the first tier and a second adjacent transition region on a second side of the first tier. The first transition region has a first width and a first depth. The second transition region has a second width and a second depth, wherein the first and second adjacent transition regions are in fluid communication by way of the channels of the first tier and the first width is different from the second width and/or the first depth is different from the second depth.

In some embodiments, the depth of the first adjacent transition region and the depth of the second adjacent transition region are greater than an average depth of the respective plurality of channels in the first tier.

In some aspects of the invention, any embodiment of the fuel cell stack described herein may comprise any embodiment of the plurality of flow field plates described herein.

Another aspect of the invention provides apparatus having any new and inventive feature, combination of features, or sub-combination of features as described herein.

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIGS. 21A-21G are schematic diagrams of fuel cell engine configurations, according to various example embodiments.

DETAILED DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive sense.

The present technology includes form factors and flow distribution layouts suitable for high power density fuel cells, and systems and methods for integration of a fuel cell stack with balance of plant components to form a fuel cell assembly.

Figure 1A:
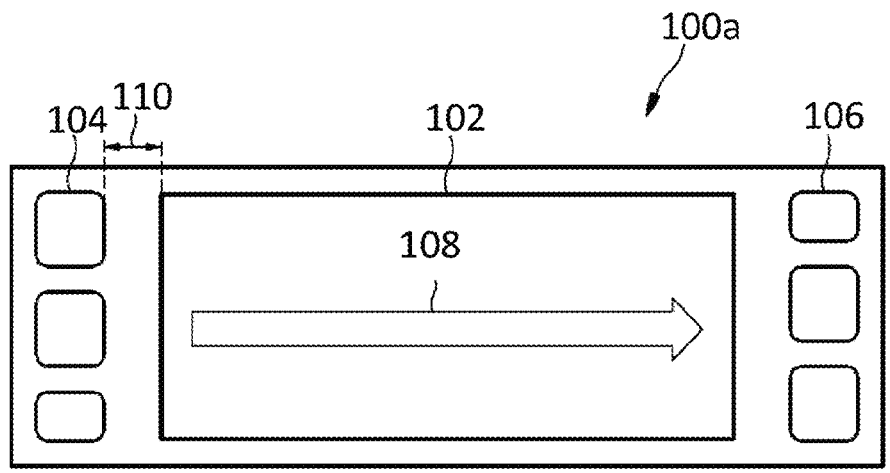
FIG. 1A is a schematic drawing of a layout of a conventional fuel cell stack shown in cross-section.

FIG. 1A is a schematic drawing of a layout 100a of a conventional fuel cell stack shown in cross-section. The cross-section is orthogonal to a longitudinal axis of the fuel cell stack i.e., orthogonal to an axis along which constituent fuel cells are stacked.

A fuel cell stack typically has a plurality of fuel cells stacked adjacent to one another. Each fuel cell of the fuel cell stack typically comprises a membrane electrode assembly (MEA), and a pair of bipolar plates. Bipolar plates may be shared by adjacent fuel cells. The fuel cell stack typically comprises a pair of end plates.

Layout 100a has a rectangular cross section. The MEAs and bipolar plates of fuel cells in the fuel cell stack of layout 100a have a rectangular cross section. Layout 100a comprises a flow field/active area 102, distributor headers 104 for reactant and coolant entering flow field/active area 102, and collector headers 106 for reactant and coolant exiting flow field/active area 102. A flow direction 108 (indicated by block arrow 108) is a direction of flow of a reactant or a coolant from distributor headers 104 to collector headers 106. In layout 100a, distributor headers 104 and collector headers 106 have a low aspect ratio, and are substantially square or round in cross section.

One drawback of layout 100a is the presence of a transition region 110. Increasing a width of transition region 110 between distributor headers 104 and flow field/active area 102 (and between flow field/active area 102 and collector headers 106) can reduce flow field/active area 102 as a proportion of the total area of layout 100a, and thereby significantly reduce a power density of the fuel cell stack.

Another drawback of layout 100*a* is the conventional aspect ratio of flow field/active area 102. Increasing a length of flow field/active area 102 in flow direction 108 (relative to a width of flow field/active area 102) can increase pressure loss in the fuel cell stack. Typical values of the width of transition region 110 and length of flow field/active area 102 in conventional layout 100*a* can lead to lower than desired power density, greater than desired pressure loss, and/or less than desired current density uniformity.

The term "transition region" refers to a region of a flow field plate through which fluids pass between a supply header and an active area of a fuel cell, or between tiers of a multi-tiered flow field plate, or between the active area of the fuel cell and a collector header. In some implementations, a transition region is "open" i.e., free of channels or other structural features (such as those included to provide support to the plate or MEA when the stack is under compression). For example a transition region may comprise an open channel.

Figure 1B:
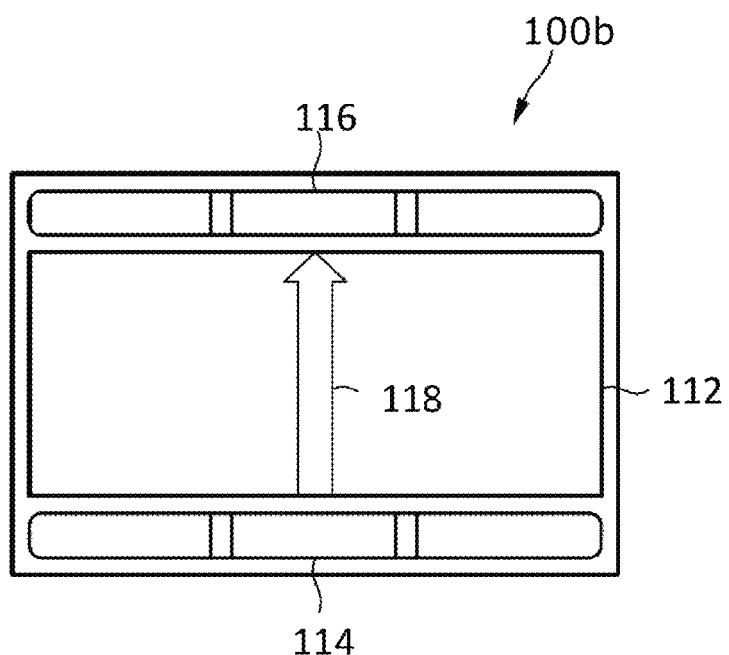
FIG. 1B is a schematic drawing of another layout of a conventional fuel cell stack shown in cross-section.

FIG. 1B is a schematic drawing of another layout 100*b* of a conventional fuel cell stack shown in cross-section. Layout 100*b* comprises a flow field/active area 112, distributor headers 114 for reactant and coolant entering flow field/active area 112, and collector headers 116 for reactant and coolant exiting flow field/active area 112.

A flow direction 118 (indicated by block arrow 118) is a direction of flow of a reactant or a coolant from distributor headers 114 to collector headers 116. Reactants and coolant traversing flow field/active area 112 in flow direction 118 travel a shorter distance than reactants and coolant traversing flow field/active area 102 of FIG. 1A, thereby leading to a lower pressure loss and an improved oxidant flow uniformity compared to layout 100*a*.

A drawback of layout 100*b* is that distributor headers 114 and collector headers 116 have a higher aspect ratio than distributor headers 104 and collector headers 106 of FIG. 1A. The higher aspect ratio can lead to greater inhomogeneity in the distribution of reactants and/or coolant within distributor headers 114, collector headers 116, and flow field/active area 112. Furthermore, distributor headers 114 and collector headers 116 can be structurally disadvantageous owing to the presence of narrow bands of material that span lengthy sections of fluid space, making the headers prone to breakage and/or cracking in a fuel cell stack.

The various example embodiments and implementations described herein provide features of construction that may be applied to achieve greater uniformity of flow of a reactant throughout the active area of a flow field. Some embodiments apply such features individually and/or in any combination to yield constructions for flow field plates which can provide flows that are uniform within 5% across the active area. Such constructions can advantageously provide improvement of efficiency, energy density and/or service life of a fuel cell.

Even where not explicitly described, any fuel cell, fuel cell stack, fuel cell module or fuel cell power unit described herein may include suitable means for collecting electrical power generated by the fuel cell, fuel cell stack, fuel cell module of fuel cell power unit. For example, current collecting plates, contacts or electrical conductors may be included at either end of a fuel cell stack to collect electrical power that may be applied to power a load.

Figure 2:
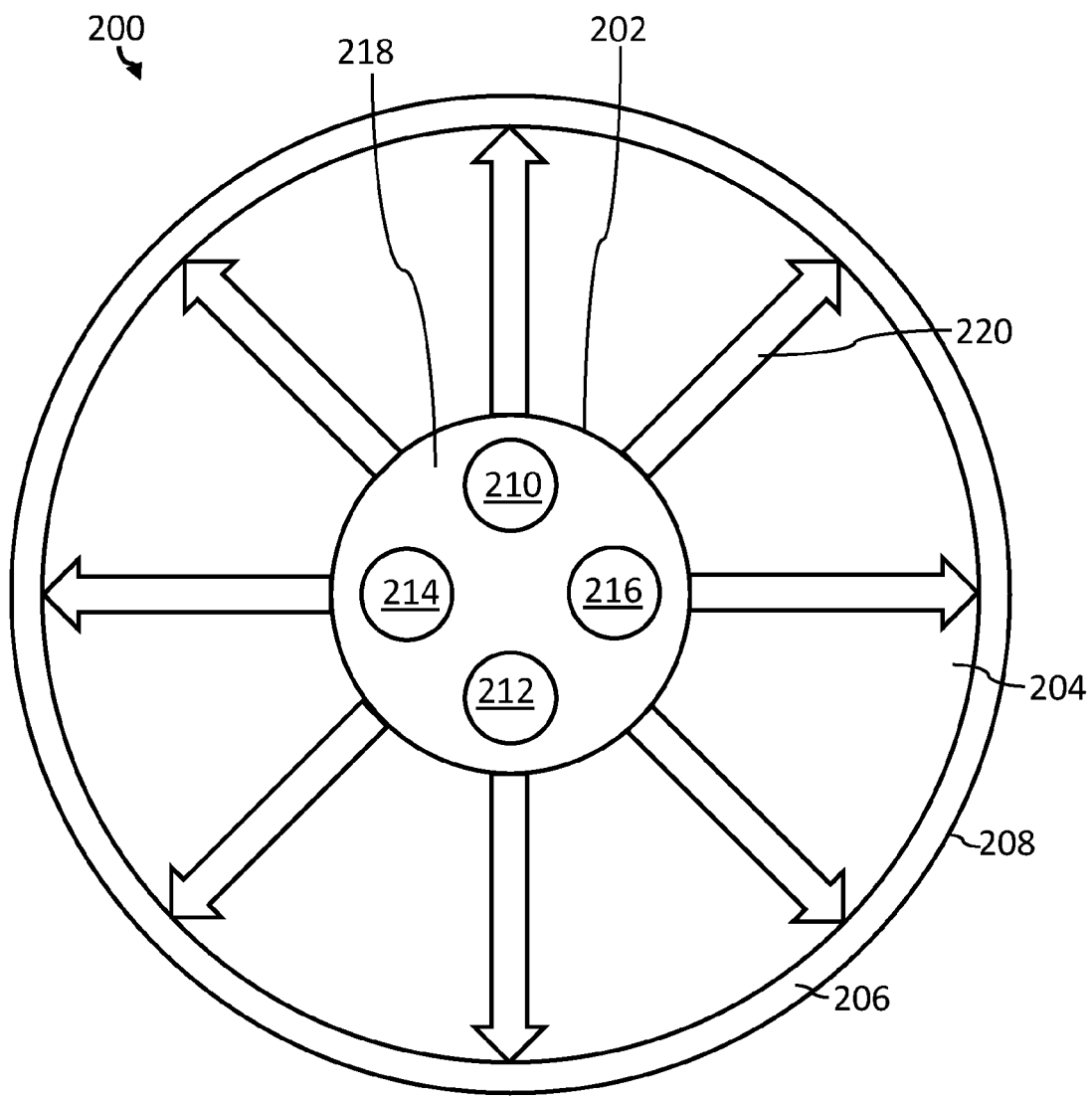
FIG. 2 is a schematic drawing of a fuel cell stack shown in cross-section, according to an example embodiment.

FIG. 2 is a schematic drawing of a fuel cell stack 200 shown in cross-section, according to an example embodiment of the present technology. Fuel cell stack 200 is a cylindrical fuel cell stack. In other example embodiments, the fuel cell stack has a different geometry, e.g., the fuel cell stack may be a rectangular or hexagonal prism.

Fuel cell stack 200 comprises an interior region 202 surrounded by an annular flow field/active area 204. Interior region 202 is a central interior region, and is cylindrical with a circular cross-section in a plane orthogonal to a longitudinal axis of fuel cell stack 200. In other example embodiments, interior region 202 may be located off-center (i.e., off-axis with respect to the longitudinal axis of fuel cell stack 200), and/or a cross-section of interior region 202 may have an alternative shape such as rectangular or hexagonal.

A fuel cell stack according to any of the embodiments described herein may optionally be constructed with flow field plates in which a ratio of a maximum radius measured from a centroid of the area of the flow field plate to an outer edge of the flow field plate to a minimum radius of the flow field plate is less than 1.5:1 (e.g. for a circular flow field plate this ratio is 1:1).

Flows of fuel/oxidant pass through the active area on opposing sides of an MEA. Coolant circulates in the bipolar plates between active areas of adjacent cells in the stack. See, for example, FIG. 4C which schematically shows a portion of a fuel cell stack.

Flow field/active area 204 is enclosed by a header 206 formed between an outer circumference of field flow/active area 204 and a housing 208. As described in more detail below, housing 208 can have various forms, including a) a compression jacket, b) an enclosure of a twist-lock stack in combination with a compression jacket, and c) a block of a fuel cell assembly.

A pair of coolant headers 210 and 212, a fuel inlet header 214 and a fuel outlet header 216 are located in interior region 202. During operation of fuel cell stack 200, one of coolant headers 210 and 212 is a coolant inlet header and the other is a coolant outlet header. In some implementations, the fuel is hydrogen, and fuel inlet and outlet headers are hydrogen inlet and outlet headers, respectively.

In the example embodiment illustrated in FIG. 2, coolant headers 210 and 212, fuel inlet header 214 and fuel outlet header 216 are shown to have circular cross-sections. In other example embodiments, coolant headers 210 and 212, fuel inlet header 214 and fuel outlet header 216 may have different cross-sectional shapes from the examples shown in FIG. 2, and/or from each other. For example, one or more of coolant headers 210 and 212, fuel inlet header 214 and fuel outlet header 216 may have a polygonal cross-section, in particular for example a square cross-section or a hexagonal cross-section.

Interior region 202 can include, or serve as, a first oxidant header 218 for an oxidant path 220. First oxidant header 218 may be used an inlet or an outlet. The oxidant may be, for example, air. In some implementations, oxidant path 220 extends radially from first oxidant header 218, through flow field/active area 204 from where it can exit through header 206 which serves as a second oxidant header. Oxidant passing radially through flow field/active area 204 can induce an electrochemical reaction in fuel cells of fuel cell stack 200, and can assist in a discharge of reaction products (e.g., water).

Advantageously, in any embodiment described herein a flow field may have a relatively high area relative to an area taken up by the interior region (e.g. 202) which is mostly made up of openings which define parts of one or more headers. For example in some embodiments a ratio of the area of an exterior region lying outside of the interior perimeter to the area of the interior region (or a ratio of an area of a flow field to an area of the interior region) may be at least 2½:1 or at least 3:1 or at least 5:1.

In some embodiments a flow field surrounds or extends circumferentially around the interior region. The flow field may be said to "surround" or "circumferentially extend around" the interior region if the flow field extends at least 85% or 90% or 97% or 99% or 100% of the circumference of the interior perimeter. In some embodiments a flow field covers most of the area of a flow field plate outside of the interior perimeter (e.g. at least 75% or at least 80% or at least 90% or at least 95% of the area of the flow field plate outside of the interior perimeter.

In some embodiments a majority of the area of the interior region is made up of openings. For example, the collective area of openings in the interior region may make up at least 60% or at least 70% or at least 80% or at least 90% of the area of the interior region.

The term "radially" in the context of a flow field of a fuel cell stack (e.g., fuel cell stack 200) includes flows having a radial component, including straight-line, curved, spiral, interdigitated, and meandering flows.

More broadly, the present description describes a) flow fields in which a primary flow is radial and where the flow field may additionally include circumferential distributors to provide a secondary flow, and b) flow fields in which a primary flow is circumferential and where the flow field may additionally include radial distributors to provide a secondary flow. A circumferential distributor is an annular distributor in which secondary flow is directed around the annulus. Circumferential distributors can be spaced radially. More detailed description of flow fields is provided below, for example with reference to FIGS. 10A-10B, 11A-11B, 12A-12B, 13A-13B, 14A-14C, 15A-15C, 16A-16C, and 17A-17B.

More detailed descriptions of various example embodiments of fuel cell stacks with flow field plates (e.g. bipolar plates) having an interior region surrounded by a flow field/active area is provided below with reference to FIGS. 6A-6D, 7A-7E, 8A-8F, and 9A-9C.

In some embodiments a flow field in active area 204 comprises a plurality of annular sections or tiers centered on interior region 202. Each tier includes a set of channels for guiding a flow of reactant through active area 204. The tiers may differ in the number of channels. For example, outer tiers may include more channels than inner tiers. In some embodiments the channels are directed radially.

Figure 3:
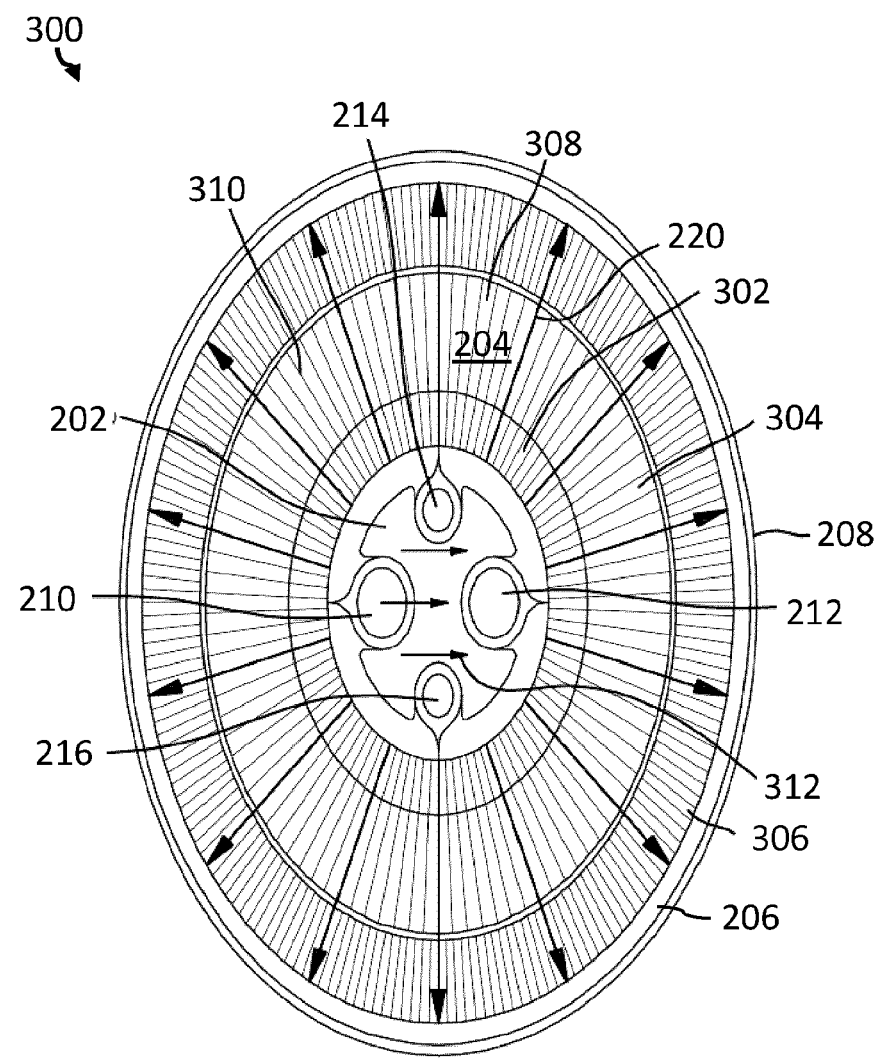
FIG. 3 is a schematic diagram of flow field plate of the fuel cell stack of FIG. 2 shown in a perspective cross-section, according to an example embodiment.

FIG. 3 is a schematic diagram of an example flow field plate 300 that may be provided in fuel cell stack 200 of FIG. 2 shown in a perspective cross-section. Flow field/active area 204 comprises three flow field concentric tiers 302, 304, and 306. Each of tiers 302, 304, and 306 includes a plurality of radial channels (e.g., channel 308). Adjacent channels are separated by a respective rib (e.g., rib 310). The number of channels and channel width can vary from one tier to another. For example, in plate 300, tier 306 has approximately twice the number of channels as tier 302.

In other example embodiments, the number and geometry of tiers may vary from the example of FIG. 3. The number of tiers may be more than three or may be fewer than three. There may be only a single tier, for example. Oxidant is introduced from first oxidant header 202 (see oxidant flow 312), and oxidant path 220 extends from first oxidant header 202 radially outwards in the direction of housing 208, where oxidant streams from the channels can be recombined and exhausted via second oxidant header 206.

Figure 4A:
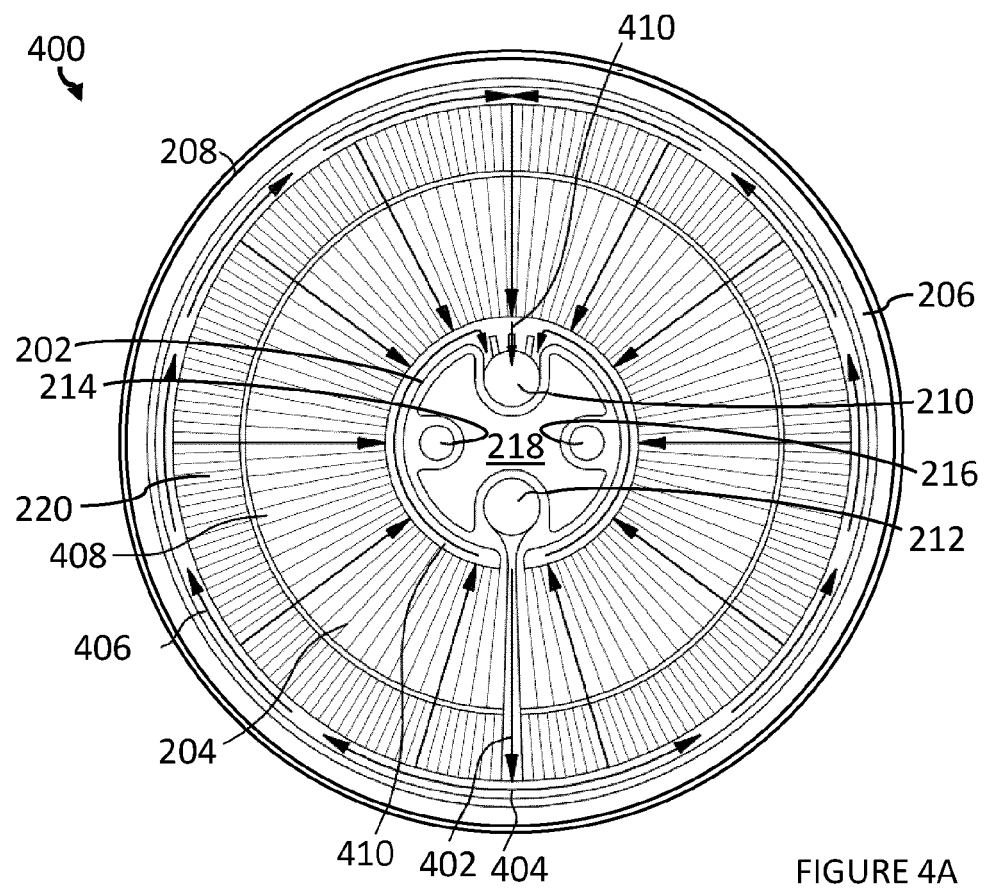
FIGS. 4A and 4B are a sectional drawing and a perspective sectional drawing, respectively, of a flow field plate of the fuel cell stack of FIG. 2, according to an example embodiment.
Figure 4B:
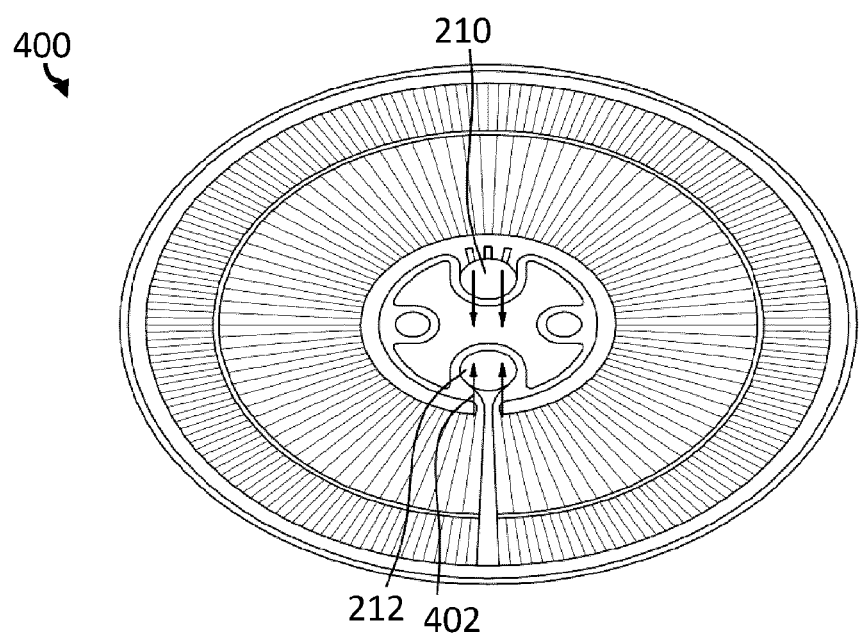

FIGS. 4A and 4B are a sectional drawing and a perspective sectional drawing, respectively, of an example flow field plate 400 that may be used in fuel cell stack 200 of FIG. 2. In this disclosure, the term "flow field plate" means any plate that includes a flow field. A bipolar plate is an example of a flow field plate. A bipolar plate may include a flow field on each of two major faces of the bipolar plate. A flow field plate may include an anode flow field on one major face and a coolant flow field on a second major face. A flow field plate may include a cathode flow field on one major face and a coolant flow field on a second major face.

Flow field plate 400 may be used, for example, to guide flows of fuel (e.g., hydrogen gas) or coolant. In some embodiments, a stack includes some flow field plates connected to distribute fuel. In FIGS. 4A and 4B, plate 400 is connected to guide a flow of coolant.

As described with reference to FIG. 2, coolant headers 210 and 212 are located in interior region 202. Coolant header 212 is fluidly coupled to a distributor 402, which in the embodiment shown is fluidly coupled to a flow-splitter 404. Arrows in distributor 402 and flow-splitter 404 indicate a direction of flow of fluid. In one operational mode, coolant flow at flow-splitter 404 is split into two flows which pass around an outer circumference 406 of flow field plate 400. Coolant may be directed radially inward via flow field 408 toward interior region 202.

A collector 410 is fluidly coupled to coolant header 210 and extends peripherally around interior region 202. In this operational mode, collector 410 collects and exhausts coolant to coolant header 210. In another operational mode, flow may be reversed, and coolant can be supplied at coolant header 210 and exhausted at coolant header 212.

Where a flow field plate 400 is used to distribute a flow of fuel, distributor 402 and collector 410 are fluidly coupled to fuel headers 214 and 216, and fuel may be directed to flow in flow field 408, in a manner similar to the flow of coolant described above. The directions of flow fields for coolant and fuel in a fuel cell stack (e.g., fuel cell stack 200 of FIG. 2) may be the same, counter to one another or crossing one another, for example.

Figure 4C:
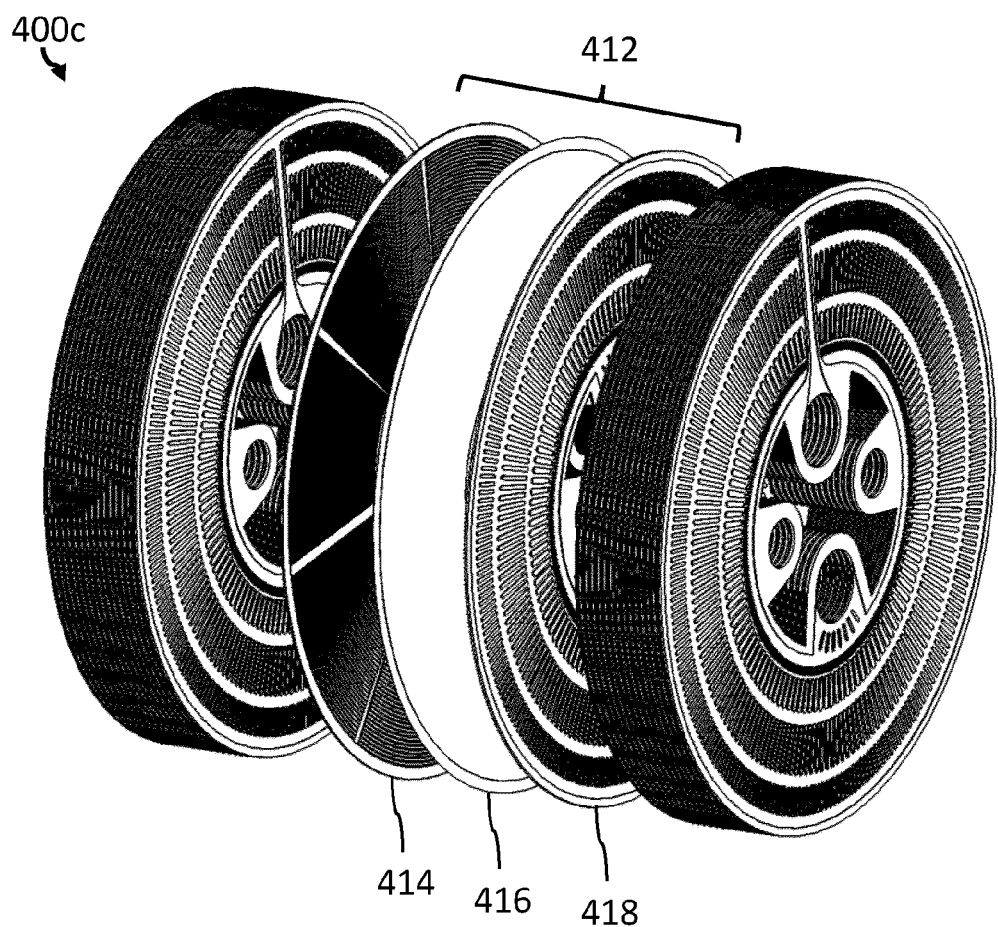
FIG. 4C is a partially-exploded view of a fuel cell stack, according to an example embodiment.

FIG. 4C is a partially-exploded view of a fuel cell stack 400c, according to an example embodiment. Fuel cell stack 400c comprises a stack of repeating units—each unit 412 comprising an anode fuel plate 414, a membrane electrode assembly (MEA) 416, and a cathode oxidant/coolant plate 418. In the illustrated embodiment, the coolant flow field is on the opposing side of the oxidant plate. In other embodiments, the coolant flow field is on the opposing side of the fuel plate. In yet other embodiments, there are cooperating coolant channels on the opposing sides of both the oxidant and fuel plates.

In the descriptions of fuel cells, stacks and fuel cell modules herein, suitable seals can be provided between components to prevent mixing and leakage of fuel, oxidant, and coolant streams. For example, flow field plates and/or MEAs can include conventional gaskets and/or seals.

The coolant side of a cathode plate may have a seal to an opposing anode surface. The seal may be affixed by chemical means (e.g. by gluing), or by thermal bonding (e.g., welding). Any suitable mechanical seals may be provided (e.g. a seal in which a bead or gasket is compressed between the plates).

MEA 416 may have an exterior frame and/or an interior frame. MEA 416 may be continuous or segmented into sections with small framed bridges (e.g., quadrants) depending at least in part on a process for manufacturing MEA 416.

A standalone fuel cell module can be assembled using layouts and flow fields described above (FIGS. 2, 3 and 4A-4C), and in more detail below (FIGS. 6A-6D, 7A-7E, 8A-8F, 9A-9C, 10A-10B, 11A-11B, 12A-12B, 13A-13B, 14A-14C, 15A-15C, 16A-16C, and 17A-17B). A standalone fuel cell module can include a fuel cell stack sandwiched between a pair of end caps. End caps may be conical or cylindrical, spherical, or semi-spherical, for example.

In some implementations, compression can be applied using a compression jacket that is attached to the endcaps. The compression jacket can compress the stack in a direction of a longitudinal axis of the stack. The compression jacket can be a spring or can include springs. The spring behaviour of such an arrangement can approach a behaviour of a constant force vs. displacement spring. In some implementations, end caps include a humidifier, purge valve, and/or a passive or active fuel pump. The compression jacket can form an outer oxidant header between the stack and the jacket.

As in conventional fuel cell stacks and modules, electrical power can be delivered via a pair electrically conductive current collector plates which sandwich the fuel cells in the stack. Each current collector plate can collect an electrical current at a respective end of the stack. Each current collector plate can form, or be electrically coupled to, a respective electrical terminal (one positive and the other negative) which, in turn, can be electrically coupled to a load or another fuel cell stack.

Figure 5:
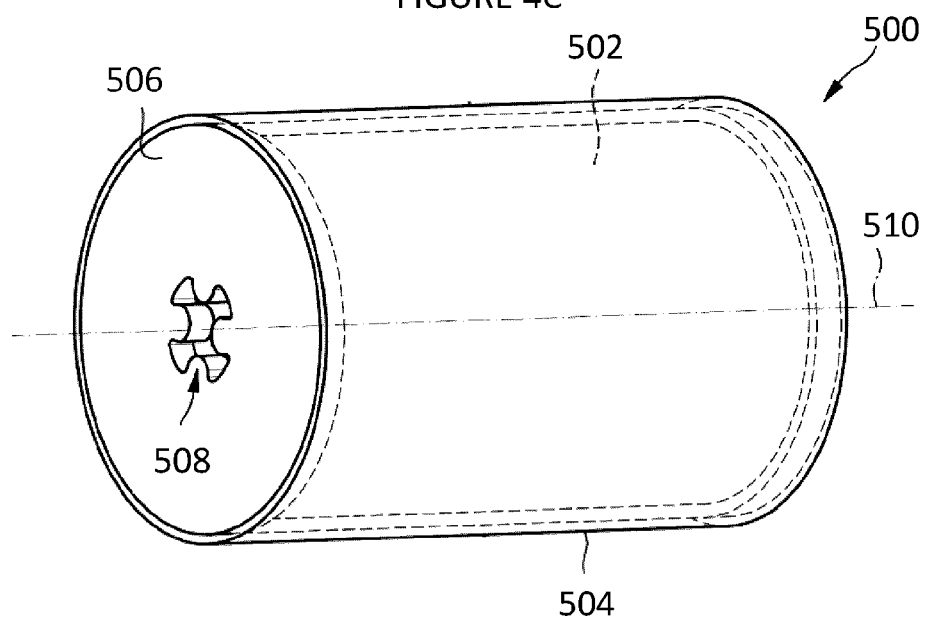
FIG. 5 is a perspective, partly-transparent view of a fuel cell module comprising a fuel cell stack and a housing, according to an example embodiment.

FIG. 5 is a perspective, partly-transparent view of a fuel cell module 500 comprising a fuel cell stack 502 (shown by dashed lines) and a housing 504. Housing 504 is terminated at one end by an end cap 506. In some implementations, a similar end cap is provided at the other end. In some implementations, housing 504 comprises a pot-shaped or cup-shaped base body, which is terminated by end cap 506 at only one end.

A coupling device can mechanically and fluidly couple fuel cell module 500 to an external system (for example, a fuel cell block). In some implementations, a fastener 508 is provided to secure housing 504 to the external system. In some implementations, fastener 508 is a rotational fastener. In some implementations, fastener 508 includes a bayonet mechanism. In some implementations, fastener 508 is a twist-lock fastener. Fastener 508 may be present on end cap 506, and, in some implementations, is centered on end cap 506 with respect to a central axis 510, as shown in FIG. 5. In other implementations, fastener 508 is located off-axis from central axis 510. Fastener 508 may be used to mechanically couple fuel cell module 500 to other components e.g., balance of plant (BoP) components. Fastener 508 may be used to secure attachments for in-flow and out-flow of coolant, oxidant, and/or fuel.

In some embodiments a fuel cell assembly includes one or more fuel cell modules 500. Advantageously a fuel cell module 500 may be quickly removed and replaced by uncoupling fastener 508. The removed fuel cell module 500 may then be refurbished.

Housing 504 may house other subsystems (not shown in FIG. 5) e.g., circulation pumps for circulating coolant and/or reactant, and/or compressors for supplying compressed air as oxidant.

Integration of fuel cell modules (e.g., fuel cell module 500) in a fuel cell assembly is described in more detail below e.g. with reference to FIGS. 20A-20H and FIGS. 21A-21G.

Supply and Exhausting of Fluids

As described above with reference to FIG. 1, conventional fuel cell designs having a rectangular layout typically have headers for reactant and coolant fluids situated at opposing ends of the fuel cell layout. In these designs, the headers for reactant and coolant fluids occupy space that could otherwise be available for an active area of the fuel cell. Reducing the space available for the active area of the fuel cell can reduce a power density of the fuel cell. In other conventional fuel cell designs (e.g., designs having circular or hexagonal layouts), the openings for reactant and coolant fluids are typically situated either outside the active area of the fuel cell or within the active area itself. In these designs, as for rectangular layouts, the openings may occupy space that could otherwise be available for the active area of the fuel cell, which can reduce a power density of the fuel cell.

The present technology describes fuel cell layouts in which a central oxidant header, and a fuel inlet and outlet are situated within a central interior perimeter of a fuel cell layout, thereby increasing a power density of the fuel cell. In one implementation, an oxidant stream can enter the flow field plate via the central oxidant header, and exit the flow field plate at a surface at or near an external perimeter of the flow field plate. In another implementation, the oxidant stream can enter the flow field plate at a surface at or near the external perimeter of the flow field plate, and exit the flow field plate via the central oxidant header. In some implementations, one or both of a coolant inlet and a coolant outlet are also situated inside the central oxidant header, thereby further increasing the power density of the fuel cell.

In this disclosure, 'perimeter' refers to a path that encompasses a two-dimensional shape. The phrase 'exterior perimeter' refers to a path that encompasses the two-dimensional shape of the outside of a fuel cell layout. An exterior perimeter of a fuel cell layout may encompass an interior perimeter.

Circular Layouts

FIGS. 6A-6D are schematic drawings of example layouts 600a-600d, respectively, of a cylindrical fuel cell stack (for example, the fuel cell stack of fuel cell module 500 of FIG. 5) shown in cross-section. The cross-section is orthogonal to a longitudinal axis of the cylindrical fuel cell stack, i.e., orthogonal to an axis along which constituent fuel cells are stacked. Layouts 600a-600d are collectively referred to herein as layouts 600. Layouts 600 are substantially the same whether the cross-section of the cylindrical fuel cell stack passes through a bipolar plate, a flow field plate or an MEA.

Each of layouts 600a-600d includes two regions:

a) a respective interior region 602a-602d (collectively 602), which is bounded by a respective interior perimeter 604a-604d (collectively 604), and b) a respective exterior region 606a-606d (collectively 606), which is bounded by respective interior perimeter 604a-604d and a respective exterior perimeter 608a-608d (collectively 608).

Elements of a fuel cell stack can have any of layouts 600. Accordingly, bipolar plates in the fuel cell stack have one of layouts 600 i.e., each major surface is divided into two regions—an interior region bounded by an interior perimeter, and an exterior region bounded by the interior perimeter and an exterior perimeter, where the exterior perimeter encompasses the interior perimeter. Each major surface of a bipolar plate lies in a respective plane that is orthogonal to the longitudinal axis of the fuel cell stack. The interior regions of different bipolar plates in the fuel cell stack can be coextensive. Similarly, the exterior regions of different bipolar plates in the fuel cell stack can be coextensive.

Interior perimeters 604 are circular. In other implementations (see, for example, FIGS. 8A-8F, 9A-9C), interior perimeters 604 are non-circular. Exterior perimeters 608a and 608b are circular, and have a larger diameter than interior perimeters 604a and 604b. Interior perimeters 604a and 604*b*, and exterior perimeters 608*a* and 608*b* are concentric circles. Exterior perimeter 608*c* is circular save for a protrusion 610*c*. Exterior perimeter 608*d* is circular save for a pair of protrusions 610*d* and 612*d*, which may be on opposing sides of layout 600*d*.

Exterior regions 606*a* and 606*b* are annular regions bounded by respective circular exterior perimeters 608*a* and 608*b*, and respective circular interior perimeters 604*a* and 604*b*. Exterior region 606*c* is an annular region save for protrusion 610*c*. Exterior region 606*d* is an annular region save for protrusions 610*d* and 612*d*.

Each of layouts 600 comprises a respective central oxidant opening 614*a*-614*d* (collectively 614) located inside interior region 602. When bipolar plates and MEAs having a layout 600 are stacked, central oxidant openings 614 form an oxidant header for introducing an oxidant stream to MEAs in the fuel cell stack, or exhausting an oxidant stream from MEAs in the fuel cell stack. The oxidant stream comprises an oxidant which is usually oxygen. The oxidant stream can be air, for example.

Central oxidant openings 614 may be formed to accommodate other openings within interior regions 602 of layouts 600. Other openings may include fuel openings and/or coolant openings, for example. When bipolar plates and MEAs having a layout 600 are stacked, fuel openings form headers for introducing a fuel stream to MEAs in the fuel cell stack, or exhausting a fuel stream from MEAs in the fuel cell stack. Similarly, coolant openings form headers for a coolant stream.

In some implementations, a perimeter of central oxidant openings 614 includes one or more inward protrusions which accommodate fuel openings and/or coolant openings. In some implementations, central oxidant openings 614 are shaped to at least attempt to maximize an area of central oxidant openings 614 within interior regions 602 while accommodating other openings.

Each of layouts 600 further comprises a respective exterior surface 616*a*-616*d* (collectively 616) where, when layouts 600*s* are layouts of a cathode flow field plate, an oxidant stream can be introduced to an MEA in the fuel cell stack, or exhausted from an MEA in the fuel cell stack. In this case, the oxidant flow field is fluidly coupled to an oxidant header formed between exterior surface 616 and a housing or a block enclosure, for example.

Central oxidant openings 614 may form a first oxidant header for introducing an oxidant stream to MEAs in the fuel cell stack, or for exhausting an oxidant stream from MEAs in the fuel cell stack. The first oxidant header is fluidly coupled to the oxidant flow field (see, for example, FIG. 19B which shows a back feed/front feed transition, and back feed channels between an oxidant header and a flow field). Similarly, exterior surface 616 in concert with a housing or block enclosure may form a second oxidant header for introducing an oxidant stream to MEAs in the fuel cell stack, or for exhausting an oxidant stream from MEAs in the fuel cell stack. The oxidant stream can flow radially from inlet to outlet across a flow field plate.

In some implementations, an oxidant stream is introduced to an MEA via central oxidant openings 614, and exhausted from MEAs via surfaces 616. In some implementations, an oxidant stream is fed to an oxidant header formed by central oxidant openings 614 from both ends of the fuel cell stack at the same time. In other implementations, an oxidant stream is fed to the oxidant header from only one end of the fuel cell stack. In yet other implementations, an oxidant stream is fed to the oxidant header partway along the fuel cell stack as well as, or instead of, at one or both ends.

In some implementations, an oxidant stream is introduced to MEAs via surfaces 616, and exhausted from MEAs via central oxidant openings 614. In some implementations, an oxidant stream is exhausted via central oxidant openings 614 from both ends of the fuel cell stack. In other implementations, an oxidant stream is exhausted via central oxidant openings 614 from only one end of the fuel cell stack.

Each of layouts 600 further comprises a respective pair of fuel openings 618*a*-618*d* (collectively 618) and 620*a*-620*d* (collectively 620) located inside interior regions 602. When flow field plates and MEAs having a layout 600 are stacked, fuel openings 618 form a fuel inlet header for introducing fuel into MEAs in the fuel cell stack. Fuel openings 620 similarly form a fuel outlet header for exhausting the fuel stream from MEAs in the fuel cell stack.

Layout 600*a* comprises a pair of coolant openings 622*a* and 624*a* located in interior region 602*a*. Layout 600*b* comprises two pairs of coolant openings 622*b* and 624*b*, and 626*b* and 628*b*, located in interior region 602*b*. Layout 600*c* comprises a pair of coolant openings 622*c* and 624*c*. Coolant opening 622*c* is located in interior region 602*c*. Coolant opening 624*c* is located in protrusion 610*c* of exterior region 606*c*. Layout 600*d* comprises a pair of coolant openings 622*d* and 624*d*. Coolant openings 622*d* and 624*d* are located in protrusions 612*d* and 610*d*, respectively, of exterior region 606*d*.

Coolant openings 622*a*-622*d* are collectively referred to herein as coolant openings 622. When bipolar plates and MEAs having a layout 600 are stacked, coolant openings 622, and additionally coolant opening 626*b* of FIG. 6B, form a coolant inlet header for introducing coolant to coolant flow fields in the fuel cell stack. Coolant openings 624*a*-624*d* are collectively referred to herein as coolant openings 624. When bipolar plates and MEAs having a layout 600 are stacked, coolant openings 624, and additionally coolant opening 628*b* of FIG. 6B, form a coolant outlet header for exhausting coolant from coolant flow fields in the fuel cell stack.

Each of layouts 600 comprises a respective flow field/active area 630*a*-630*d* (collectively 630) located in exterior region 606. In plates having layouts 600, flow field/active areas 630 each include a respective flow field. The flow field typically delivers a reactant (e.g. hydrogen or oxygen) to a gas diffusion layer (GDL) and a catalyst of an MEA. It can be desirable for the flow field to be designed to deliver a reactant to the MEA in a way which attempts to minimize a drop in pressure across the flow field. In MEAs having layouts 600, flow field/active areas 630 each include a respective GDL and catalyst.

Openings 614, 618, 620, 622, 624 of layouts 600, and openings 626*b* and 628*b* of layout 600*b*, in flow field plates and MEAs of a fuel cell stack align to form headers that can extend through the fuel cell stack.

Hexagonal Layouts

FIGS. 7A-7E are schematic drawings of example layouts 700*a*-700*e*, respectively, of a hexagonal-prism-shaped fuel cell stack shown in cross-section. The cross-section is orthogonal to a longitudinal axis of the hexagonal-prism-shaped fuel cell stack, i.e., orthogonal to an axis along which constituent fuel cells are stacked. Layouts 700*a*-700*e* are collectively referred to herein as layouts 700. Layouts 700 are substantially the same whether the cross-section of the hexagonal-prism-shaped fuel cell stack passes through a bipolar plate, a flow field plate, or an MEA.

Each of layouts 700a-700e includes two regions:

a) a respective interior region 702a-702e (collectively 702), which is bounded by a respective interior perimeter 704a-704e (collectively 704), and b) a respective exterior region 706a-706e (collectively 706), which is bounded by respective interior perimeter 704a-704e and a respective exterior perimeter 708a-708e (collectively 708).

Interior perimeters 704 are circular. In other implementations (see, for example, FIGS. 8A-8F, 9A-9C), interior perimeters 704 are non-circular. Exterior perimeters 708a and 708b are hexagonal, and have a longer perimeter than interior perimeters 704a and 704b. Interior perimeters 704a and 704b, and exterior perimeters 708a and 708b are concentric shapes. Exterior perimeter 708c is hexagonal save for a protrusion 710c. Each of exterior perimeters 708d and 708e are hexagonal save for a respective pair of protrusions 710d and 712d, and 710e and 712e, which may be on opposing sides of layouts 700d and 700e, respectively.

Exterior regions 706 encompass interior regions 702. Exterior regions 706a and 706b are bounded, on an inner side, by respective circular interior perimeters 704a and 704b, and, on an outer side, by respective hexagonal exterior perimeters 708a and 708b. Exterior region 706c is similar in shape to exterior regions 706a and 706b save for protrusion 710c. Exterior regions 706d and 706e are similar in shape to exterior regions 706a and 706b save for protrusions 710d and 712d, and 710e and 712e, respectively.

Each of layouts 700 comprises a respective central oxidant opening 714a-714e (collectively 714) located inside interior region 702. When bipolar plates and MEAs having a layout 700 are stacked, central oxidant openings 714 form an oxidant header for introducing an oxidant stream to MEAs in the fuel cell stack, or for exhausting oxidant from MEAs in the stack. The oxidant stream comprises an oxidant which is usually oxygen. The oxidant stream can be air, for example.

Central oxidant openings 714 may be formed to accommodate other openings within interior regions 702 of layouts 700. Other openings may include fuel openings and/or coolant openings, for example. In some implementations, a perimeter of central oxidant openings 714 includes one or more inward protrusions which accommodate fuel openings and/or coolant openings. In some implementations, central oxidant openings 714 are shaped to at least attempt to maximize an area of central oxidant openings 714 within interior regions 702 while accommodating other openings.

Each of layouts 700 further comprises a respective exterior surface 716a-716e (collectively 716) where an oxidant stream can be exhausted from MEAs in the fuel cell stack as described with reference to layouts 600.

Each of layouts 700 further comprises a respective pair of fuel openings 718a-718e (collectively 718) and 720a-720e (collectively 720) located inside interior region 702. When bipolar plates and MEAs having a layout 700 are stacked, fuel openings form headers for introducing a fuel stream to MEAs in the fuel cell stack, or exhausting a fuel stream from MEAs in the fuel cell stack. Similarly, coolant openings form headers for a coolant stream.

Layout 700a comprises a pair of coolant openings 722a and 724a located in interior region 702a. Layout 700b comprises two pairs of coolant openings 722b and 724b, and 726b and 728b, located in interior region 702b. Layout 700c comprises a pair of coolant openings 722c and 724c. Coolant opening 722c is located in interior region 702c. Coolant opening 724c is located in protrusion 710c of exterior region 706c. Layouts 700d and 700e each comprise a pair of coolant openings 722d and 724d, and 722e and 724e, respectively. Coolant openings 722d and 724d are located in protrusions 712d and 710d, respectively, of exterior region 706d. Coolant openings 722e and 724e are located in protrusions 712e and 710e, respectively, of exterior region 706e.

Coolant openings 722a-722e are collectively referred to herein as coolant openings 722. When bipolar plates and MEAs having layout 700 are stacked, coolant openings 722, and additionally coolant opening 726b of FIG. 7B, form a coolant header for introducing a coolant stream to coolant flow fields in the fuel cell stack. Coolant openings 724a-724e are collectively referred to herein as coolant openings 724. Coolant openings 724, and additionally coolant opening 728b of FIG. 7B, similarly form a coolant header for exhausting the coolant stream from coolant flow fields in the fuel cell stack.

Each of layouts 700 further comprises a respective flow field/active area 730a-730e (collectively 730) located inside exterior region 706. In flow field plates having layouts 700, flow field/active areas 730 each include a respective flow field. The flow field typically delivers reactants (e.g. hydrogen and oxygen) to a gas diffusion layer (GDL) and a catalyst of an MEA. It can be desirable for the flow field to be designed to deliver a reactant to the MEA which attempts to minimize a drop in pressure. In MEAs having layouts 700, flow field/active areas 730 each include a respective GDL and catalyst.

Openings 714, 718, 720, 722, 724 of layouts 700, and openings 726b and 728b of layout 700b, in flow field plates and MEAs of a fuel cell stack align to form headers that can extend through the fuel cell stack.

FIGS. 8A-8F are schematic drawings of example layouts 800a-800f, respectively, of a hexagonal-prism-shaped fuel cell stack shown in cross-section. The cross section is orthogonal to a longitudinal axis of the hexagonal-prism-shaped fuel cell stack, i.e., orthogonal to an axis along which constituent fuel cells are stacked. Layouts 800a-800f are collectively referred to herein as layouts 800. Layouts 800 are substantially the same whether the cross-section of the hexagonal-prism-shaped fuel cell stack passes through a flow field plate or an MEA.

Each of layouts 800a-800f includes two regions:

a) a respective interior region 802a-802f (collectively 802), which is bounded by a respective interior perimeter 804a-804f (collectively 804), and b) a respective exterior region 806a-806f (collectively 806), which is bounded by respective interior perimeter 804a-804f and a respective exterior perimeter 808a-808f (collectively 808).

Interior perimeters 804 are hexagonal. Exterior perimeters 808a-808c are hexagonal, and have a longer perimeter than interior perimeters 804a-804c. Interior perimeters 804a-804c, and their corresponding exterior perimeters 808a-808c are concentric hexagons. Exterior perimeter 808d is hexagonal save for a protrusion 810d. Each of exterior perimeters 808e and 808f are hexagonal save for a respective pair of protrusions 810e and 812e, and 810f and 812f, which may be on opposing sides of layouts 800e and 800f, respectively.

Exterior regions 806 encompass interior regions 802. Exterior regions 806a-806c are bounded, on an inner side, by respective hexagonal interior perimeters 804a-804c, and, on an outer side, by respective hexagonal exterior perimeters 808a-808c. Exterior region 806d is similar in shape to exterior regions 806a-806c save for protrusion 810d. Exterior regions 806e and 806f are similar in shape to exterior regions 806a-806c save for protrusions 810e and 812e, and 810f and 812f, respectively.

Each of layouts 800 comprises a respective central oxidant opening 814a-814f (collectively 814) located inside interior region 802. When bipolar plates and MEAs having a layout 800 are stacked, central oxidant openings 814 form headers for introducing an oxidant stream to MEAs in the fuel cell stack, or exhausting an oxidant stream from MEAs in the fuel cell stack. The oxidant stream comprises an oxidant which is usually oxygen. The oxidant stream can be air, for example.

Central oxidant openings 814 may be formed to accommodate other openings within interior regions 802 of layouts 800. Other openings may include fuel openings and/or coolant openings, for example, which when stacked can form fuel and coolant headers, respectively, as described above with reference to FIG. 6A-6D. In some implementations, a perimeter of central oxidant openings 814 includes one or more inward protrusions which accommodate fuel openings and/or coolant openings. In some implementations, central oxidant openings 814 are shaped to at least attempt to maximize an area of central oxidant openings 814 within interior regions 802 while accommodating other openings.

Each of layouts 800 further comprises a respective exterior surface 816a-816f (collectively 816) where an oxidant stream can be exhausted from MEAs in the fuel cell stack.

Each of layouts 800 further comprises a respective pair of fuel openings 818a-818f (collectively 818) and 820a-820f (collectively 820) located inside interior region 802.

Layouts 800a and 800b comprises a pair of coolant openings 822a and 824a, and 822b and 824b, respectively, located in interior regions 802a and 802b, respectively. Layout 800c comprises two pairs of coolant openings 822c and 824c, and 826c and 828c, located in interior region 802c. Layout 800d comprises a pair of coolant openings 822d and 824d. Coolant opening 822d is located in interior region 802d. Coolant opening 824d is located in protrusion 810d of exterior region 806d. Layouts 800e and 800f each comprise a pair of coolant openings 822e and 824e, and 822f and 824f, respectively. Coolant openings 822e and 824e are located in protrusions 812e and 810e, respectively, of exterior region 806e. Coolant openings 822f and 824f are located in protrusions 812f and 810f, respectively, of exterior region 806f.

Coolant openings 822a-822f are collectively referred to herein as coolant openings 822. When bipolar plates and MEAs are stacked, coolant openings 822, and additionally coolant opening 826c of FIG. 8C, can form a coolant header for introducing a coolant stream to coolant plate assemblies in the fuel cell stack. Coolant openings 824a-824f are collectively referred to herein as coolant openings 824. Similarly, coolant openings 824, and additionally coolant opening 828c of FIG. 8C, can form a coolant header for exhausting the coolant stream from coolant flow fields in the fuel cell stack.

Each of layouts 800 further comprises a respective flow field/active area 830a-830f (collectively 830) located in a respective exterior region of exterior regions 806. In flow field plates having layouts 800, flow field/active areas 830 each include a respective flow field. The flow field typically delivers reactants (e.g. hydrogen and oxygen) to a gas diffusion layer (GDL) and a catalyst of an MEA. It can be desirable for the flow field to be designed to deliver a reactant to the MEA with increased uniformity across the active area, in a way which attempts to minimize a drop in pressure across the flow field. In MEAs having layouts 800, flow field/active areas 830 each include a respective GDL and catalyst.

Openings 814, 818, 820, 822, 824 of layouts 800, and openings 826c and 828c of layout 800c, in flow field plates and MEAs of a fuel cell stack align to form headers that can extend through the fuel cell stack.

Rectangular Layouts

Figure 9A:
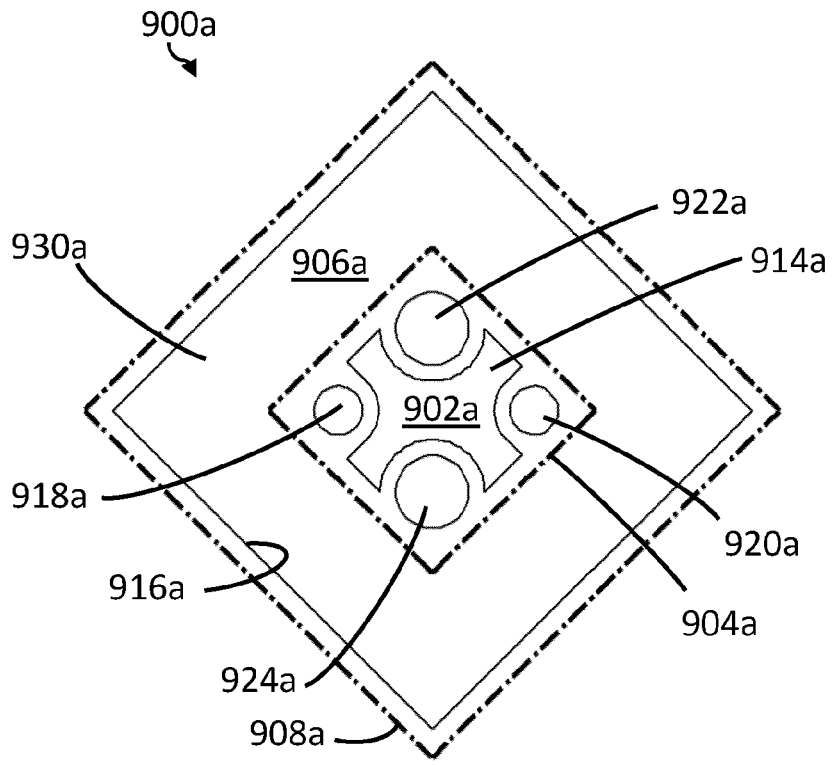
FIGS. 9A-9C are schematic drawings of layouts of a rectangular-prism-shaped fuel cell stack shown in cross-section, according to an example embodiment.
Figure 9B:
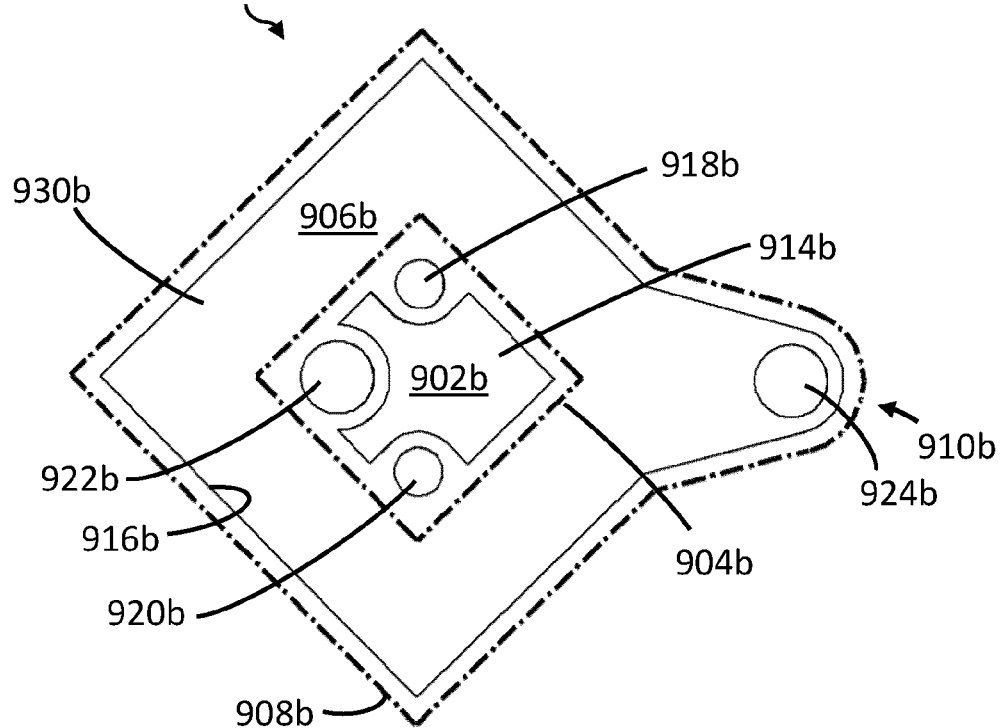
Figure 9C:
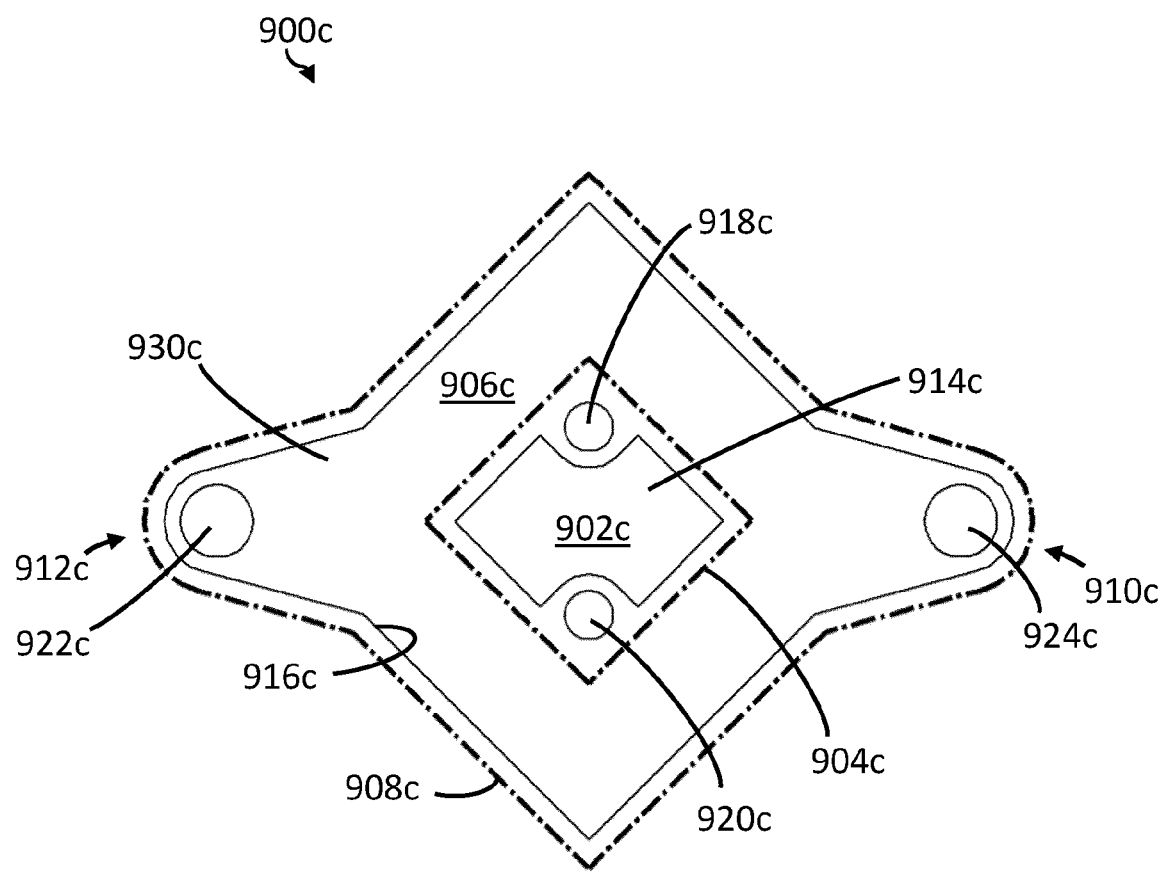

FIGS. 9A-9C are schematic drawings of layouts 900a-900c, respectively, of a rectangular-prism-shaped fuel cell stack shown in cross-section, according to an example embodiment. In the following description, the cross section, and the interior and exterior perimeters are described as rectangular in shape. A person of skill in the art will appreciate that where two adjacent sides of a rectangular cross section, interior perimeter, or exterior perimeter are of equal length, the corresponding cross section, interior perimeter, or exterior perimeter can also be described as square in shape. The cross section is orthogonal to a longitudinal axis of the rectangular-prism-shaped fuel cell stack, i.e., orthogonal to an axis along which constituent fuel cells are stacked. Layouts 900a-900c are collectively referred to herein as layouts 900. Layouts 900 are substantially the same whether the cross-section of the rectangular-prism-shaped fuel cell stack passes through a flow field plate or an MEA.

Each of layouts 900a-900c includes two regions:

a) a respective interior region 902a-902c (collectively 902), which is bounded by a respective interior perimeter 904a-904c (collectively 904), and b) a respective exterior region 906a-906c (collectively 906), which is bounded by respective interior perimeter 904a-904c and a respective exterior perimeter 908a-908c (collectively 908).

Interior perimeters 904 are rectangular. In some implementations, two adjacent sides of an interior perimeter of interior perimeters 904 are equal. Exterior perimeter 908a is rectangular, and has a longer perimeter than interior perimeter 904a. In the example implementation of FIG. 9A, interior perimeter 904a and exterior perimeter 908a are concentric squares. Exterior perimeter 908b is rectangular save for a protrusion 910b. Exterior perimeter 908c is rectangular save for a respective pair of protrusions 910c and 912c, which may be on opposite sides to each other of layout 900c.

Exterior regions 906 encompass interior regions 902. Exterior region 906a is bounded, on an inner side, by square interior perimeter 904a, and, on an outer side, by a square exterior perimeter 908a. Exterior region 906b is similar in shape to exterior region 906a save for protrusion 910b. Exterior region 906c is similar in shape to exterior region 906a save for protrusions 910c and 912c.

Each of layouts 900 comprises a respective central oxidant opening 914a-914c (collectively 914) located inside interior region 902. When bipolar plates and MEAs are stacked, central oxidant openings 914 can form an oxidant header for introducing an oxidant stream to MEAs in the fuel cell stack. The oxidant stream comprises an oxidant which is usually oxygen. The oxidant stream can be air, for example.

Central oxidant openings 914 may be formed to accommodate other openings within interior regions 902 of layouts 900. Other openings may include fuel openings and/or coolant openings, for example. In some implementations, a perimeter of central oxidant openings 914 includes one or more inward protrusions which accommodate fuel openings and/or coolant openings. In some implementations, central oxidant openings 914 are shaped to at least attempt to maximize an area of central oxidant openings 914 within interior regions 902 while accommodating other openings.

Each of layouts 900 further comprises a respective exterior surface 916a-916c (collectively 916) where an oxidant stream can be exhausted from MEAs in the fuel cell stack.

Each of layouts 900 further comprises a respective pair of fuel openings 918a-918c (collectively 918) and 920a-920c (collectively 920) located in a respective interior region of interior regions 902. Fuel openings 918 belong to a fuel inlet header for introducing a fuel stream into MEAs in the fuel cell stack. Fuel openings 920 belong to a fuel outlet header for exhausting the fuel stream from MEAs in the fuel cell stack.

Layout 900a comprises a pair of coolant openings 922a and 924a located in interior region 902a. Layout 900b comprises a pair of coolant openings 922b and 924b. Coolant opening 922b is located in interior region 902b. Coolant opening 924b is located in protrusion 910b of exterior region 906b. Layout 900c comprises a pair of coolant openings 922c and 924c. Coolant openings 922c and 924c are located in protrusions 912c and 910c, respectively, of exterior region 906c.

Coolant openings 922a-922c are collectively referred to herein as coolant openings 922. When bipolar plates and MEAs are stacked, coolant openings 922 can form a coolant inlet header for introducing a coolant stream to coolant flow fields in the fuel cell stack. Coolant openings 924a-924e are collectively referred to herein as coolant openings 924. Similarly, coolant openings 924 can form a coolant outlet header for exhausting the coolant stream from coolant flow fields in the fuel cell stack.

Each of layouts 900 further comprises a respective flow field/active area 930a-930c (collectively 930) located in a respective exterior region of exterior regions 906. In flow field plates having layouts 900, flow field/active areas 930 each include a respective flow field. The flow field typically delivers reactants (e.g. hydrogen and oxygen) to a gas diffusion layer (GDL) and a catalyst of an MEA. It can be desirable for the flow field to be designed to deliver a reactant to the MEA in a way which attempts to minimize a drop in pressure across the flow field. In MEAs having layouts 900, flow field/active areas 930 each include a respective GDL and catalyst.

As described above, when flow field plates and MEAs are stacked, openings 914, 918, 920, 922, 924 of layouts 900 in flow field plates and MEAs of a fuel cell stack align to form headers that can extend through the fuel cell stack.

Flow Field Plates

The performance and durability of a fuel cell may be increased by a) effectively managing liquid water, and/or b) ensuring a uniform current distribution across an active area of the fuel cell. The active area of a fuel cell is an area of the fuel cell that is electrochemically active and able to produce electrical power from supplied reactants. The active area typically includes a GDL and a catalyst.

Flow field plates are typically designed to deliver reactant (fuel or oxidant) to the MEA, and to carry away product water or unused reactant. Example designs for flow field plates include parallel, serpentine, and interdigitated flow. A parallel design is simple, and typically has a low pressure drop between inlet and outlet. A serpentine design is better for water management than a parallel design but tends to have a higher parasitic load because of a higher pressure drop. An interdigitated design can provide better reactant access to the catalyst, though it usually has a higher pressure drop than a parallel design.

Fluid flow channels in a flow field plate are typically, though not always, rectangular in cross section. The size and spacing of channels can affect performance. Wider channels tend to provide greater reactant access to the catalyst. A greater spacing between channels tends to have the opposite effect, and can also cause a greater accumulation of water. Channels are spaced apart by ribs (also referred to herein as landings or landing regions). Generally, there is a tendency for reactant concentration to decrease along a length of a channel as reactant is consumed by an electrochemical reaction. This can lead to reduced uniformity in distribution of reactant and concommittant less uniform current density. In some implementations, the present technology can mitigate this issue, for example by mixing and redistributing reactants via transitions regions in a flow field.

Understanding the performance of flow fields in which a flow radiates from an internal header to an external header can be complicated because an active area per unit angle subtended at the center of the flow field increases with distance from the center. Expanding the channel area while maintaining the rib area can result in deceleration of the flow and protrusion of the MEA into the flow channels. Deceleration of the flow can cause flow stagnation and accumulation of liquid water. Protrusion of the MEA into channels can result in channel blockages and non-uniform contact resistance across the active area.

Some embodiments of the present technology ameliorate these shortcomings by providing flow plates configured with multi-tiered flow fields. The channel area and rib area of a multi-tier flow field can be adjusted tier by tier. The number of tiers can be selected to improve performance and to facilitate efficient removal of liquid water. The channel width (or rib width) can be selected and the number of ribs chosen to achieve a desired rib width (or channel width). In this manner, flow cross-section across the flow field can be adjusted to provide a more uniform current distribution, improved water removal, and/or more uniform compression on the MEA (more uniform contact resistance distribution) over the active area of the flow field plate.

A transition zone can be provided between each tier. In the transition zone, a flow resistance in a direction perpendicular to a primary flow direction can be less than in the primary flow direction, and the flow can be more uniform. A lower flow resistance can promote a secondary flow to arise in the transition zone which can make the primary flow more uniform. The size of the transition zone preceding each tier can be matched to the upcoming tier (also referred to herein as the downstream tier) through its flow resistance, thereby creating a secondary flow that results in greater uniformity of the primary flow.

In some embodiments, a restrictor layer, which is a special type of tier, or multiple tiers, is included between two other tiers, inside an innermost tier, or outside an outermost tier. In a restrictor layer, the ribs are referred to herein as restrictors. A restrictor layer can increase flow uniformity in an upstream flow region. Flow tends to move along a path of least resistance; for example, a restrictor layer may be provided downstream from the upstream flow region (which may, for example comprise one or more tiers). The restrictor layer may be designed to provide a flow resistance that is slightly higher than that of the most flow resistive elements of the upstream flow region. This construction can help to distribute the flow more uniformly in the upstream flow region. The use of tiered flow fields and/or tiered flow fields with flow restrictors can improve fuel cell performance, power density, and durability.

Dimensions of restrictors in a restrictor layer (including height, width, depth, and a cross-sectional profile along their length) can be chosen to create a hydraulic resistance which is greater than the hydraulic resistance of upstream tiers, transition zones, and distributors. This can force the flow to distribute in the upstream regions (circumferentially, radially, or ideally both) more uniformly. The cross-sectional profile of a restrictor can be chosen such that it is either diverging, converging, or constant based at least in part on its ability to improve liquid water removal. A converging restrictor (i.e., one tapering in the direction of flow) can increase flow velocity, while lowering local pressure near an exit of the restrictor layer. A diverging restrictor (i.e., one expanding in the direction of flow) can decrease flow velocity while recovering some of the pressure lost from the flow moving through the narrowest section. A constant cross section can provide a blend of both depending at least in part on the channel/rib spacing. Additional features of restrictors, such as rounded noses or tails, can prevent the flow from separating and forming transient instabilities such as eddies.

Some embodiments provide a restrictor that has channels that are "converging/diverging" meaning that from each end the channels converge to a narrow point part way along the channels. Such embodiments can advantageously provide desirable flow properties for flow in either direction through the flow restrictor. In some embodiments a radial flow field includes a converging/diverging flow restrictor at a radially outermost part of the flow field.

The type of restrictor layer can be selected based at least in part on operating conditions of the stack, power range of operation, and other characteristics such as wettability of the flow channels and force of attachment of water droplets on a GDL surface. A restrictor layer can include one or more types of restrictors. A restrictor layer can include multiple tiers. In some implementations, restrictors within each tier are the same type. In some implementations, the type of restrictors used in a tier are different from one tier to another.

Some embodiments use a combination of restrictor layers downstream from one or more tiers in an active area of a flow field and transition layers upstream from tiers in an active layer of the flow field to promote uniform flow of a reactant (e.g. an oxidant or fuel) throughout the flow field.

Tiered Cathode Flow Fields

Figure 10A:
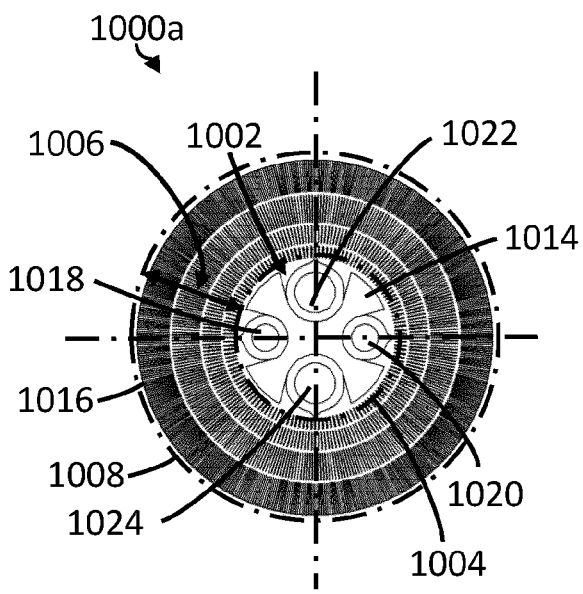
FIGS. 10A and 10B are schematic diagrams of a tiered cathode flow field plate, according to an example embodiment.
Figure 10B:
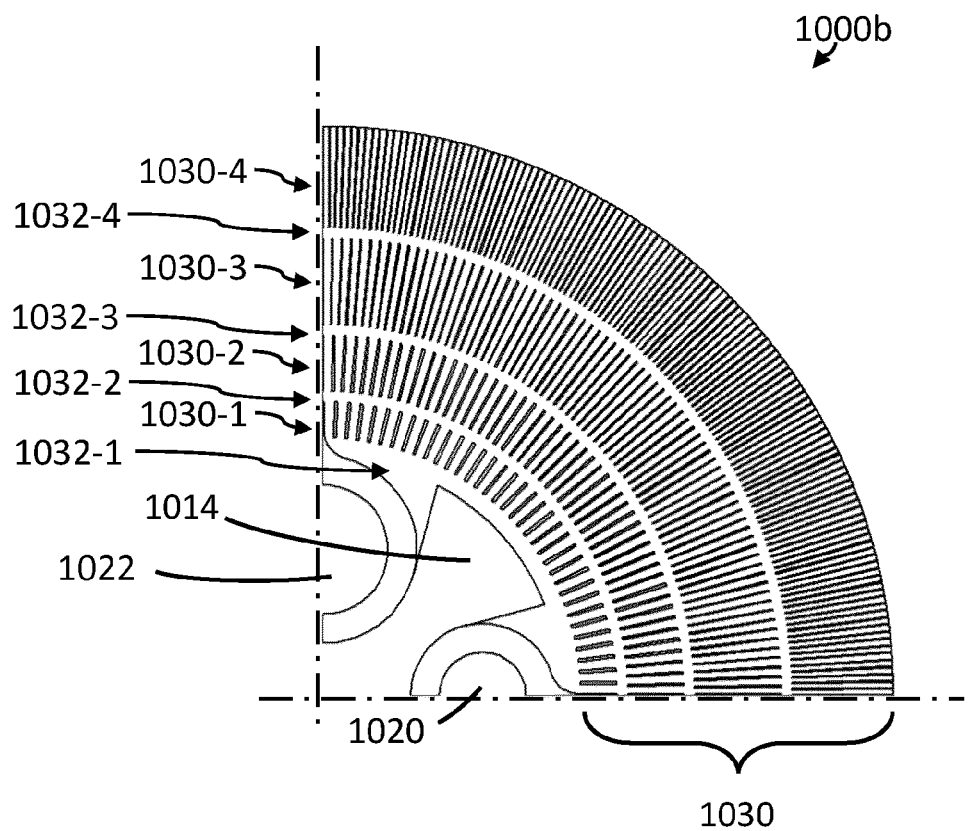

FIGS. 10A and 10B are schematic diagrams of an example implementation of a tiered cathode flow field plate 1000. FIG. 10A is a view of the side of flow field plate 1000 that includes the flow field. FIG. 10B is an expanded view of one quadrant of flow field plate 1000.

Figure 6A:
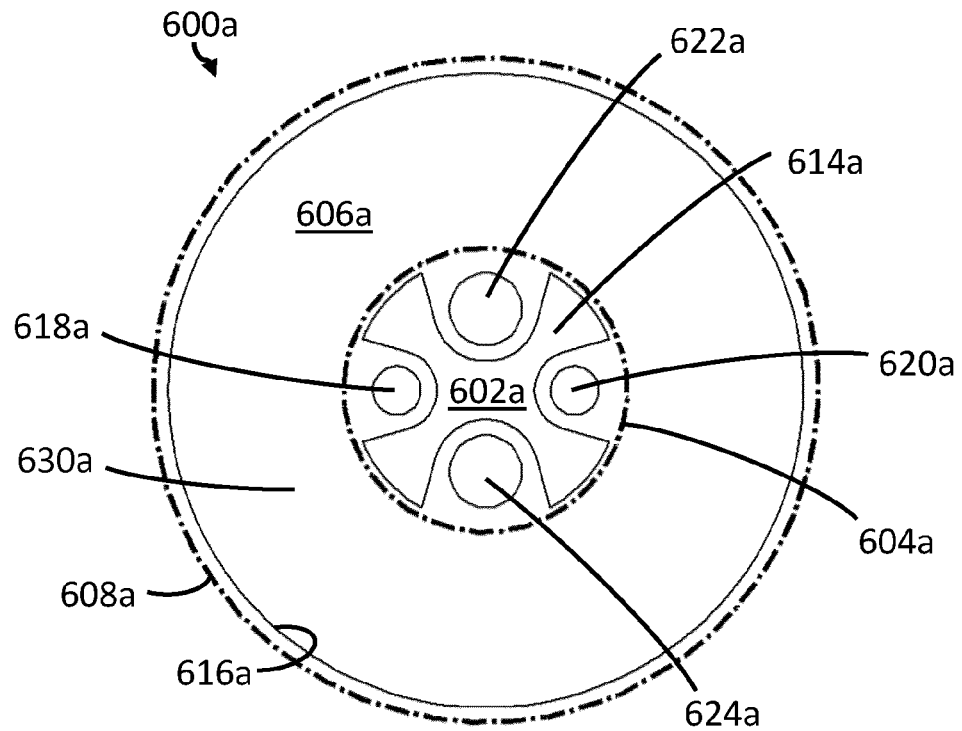
FIGS. 6A-6D are schematic drawings of layouts of a cylindrical fuel cell stack (for example, the fuel cell stack of fuel cell module of FIG. 5) shown in cross-section, according to an example embodiment.
Figure 6B:
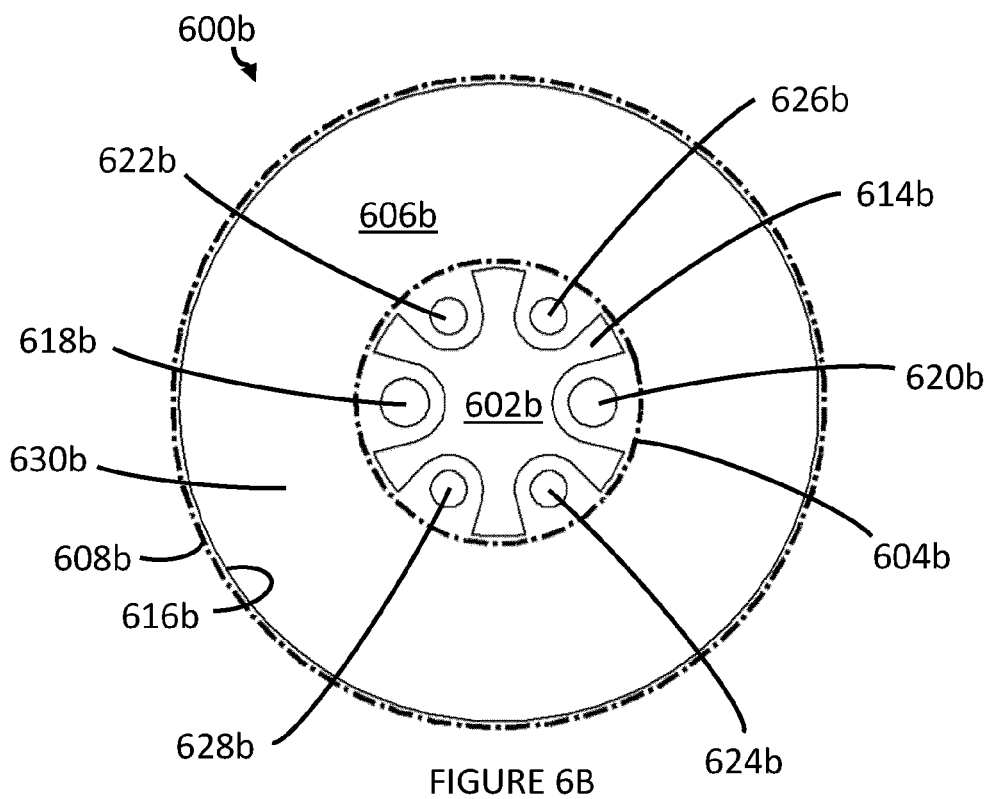
Figure 6C:
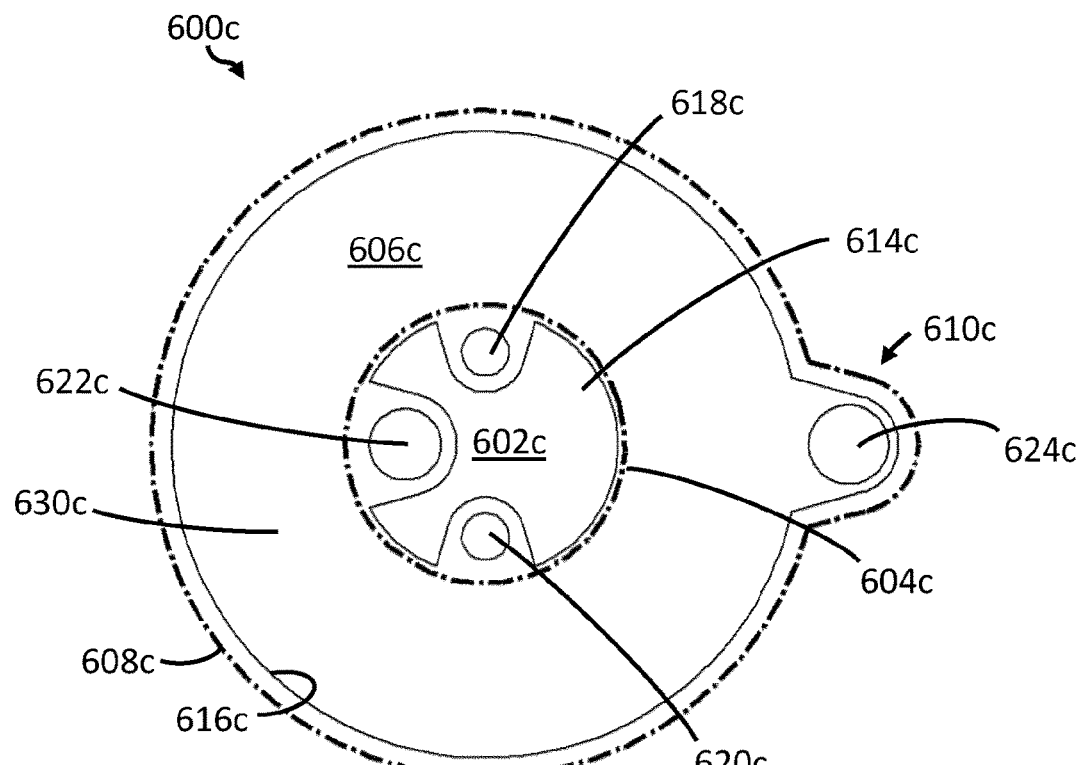
Figure 6D:
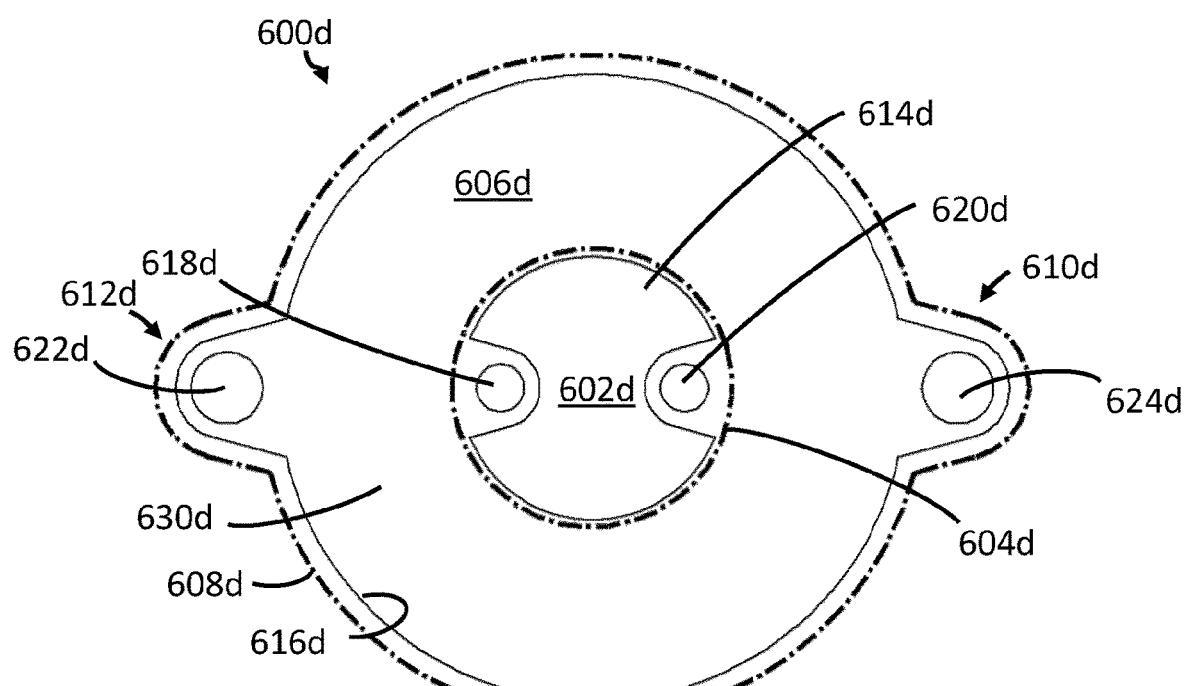
Figure 7A:
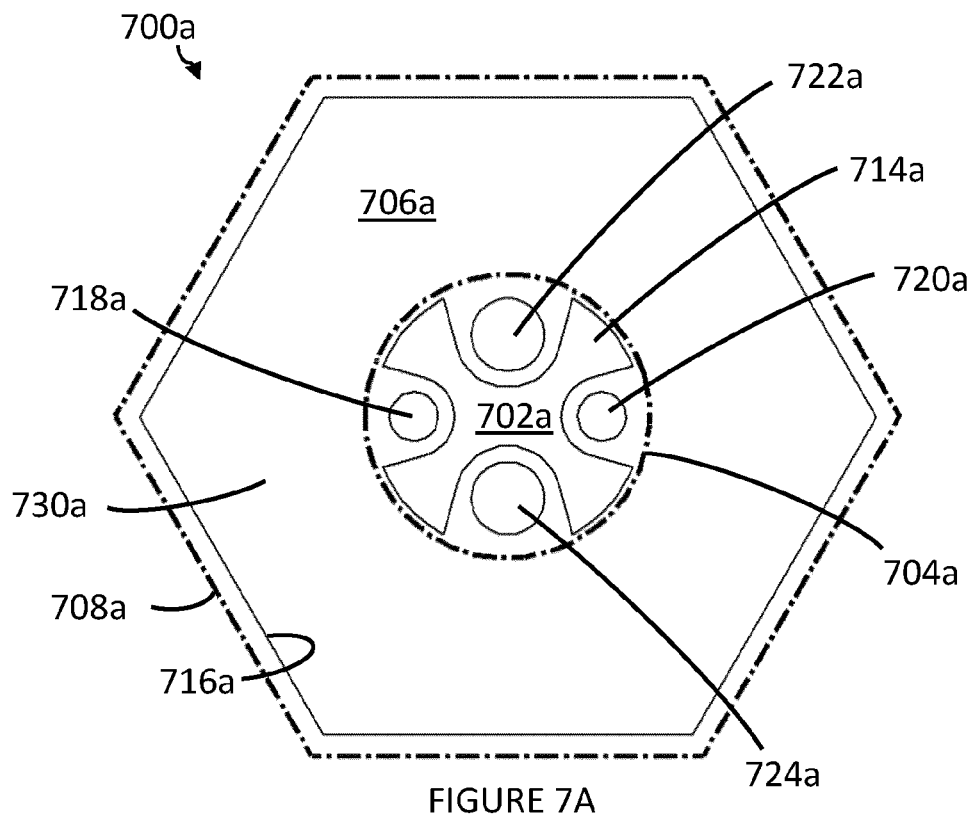
FIGS. 7A-7E are schematic drawings of layouts of a hexagonal-prism-shaped fuel cell stack shown in cross-section, according to an example embodiment.
Figure 7B:
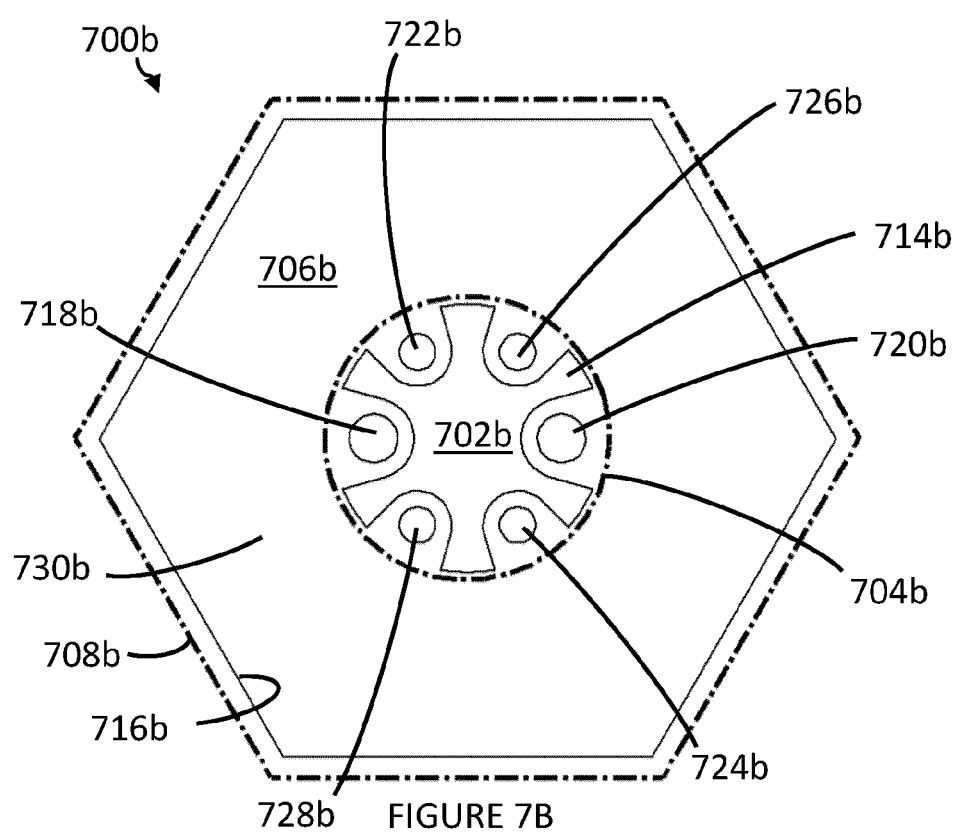
Figure 7C:
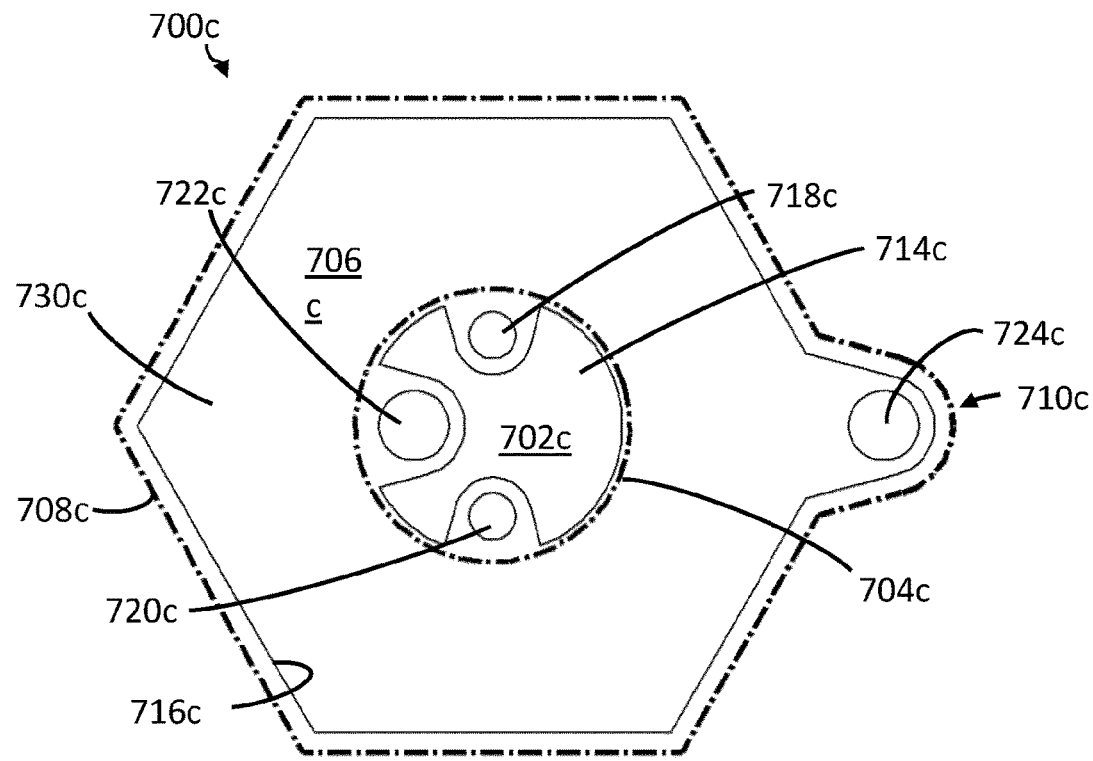
Figure 7D:
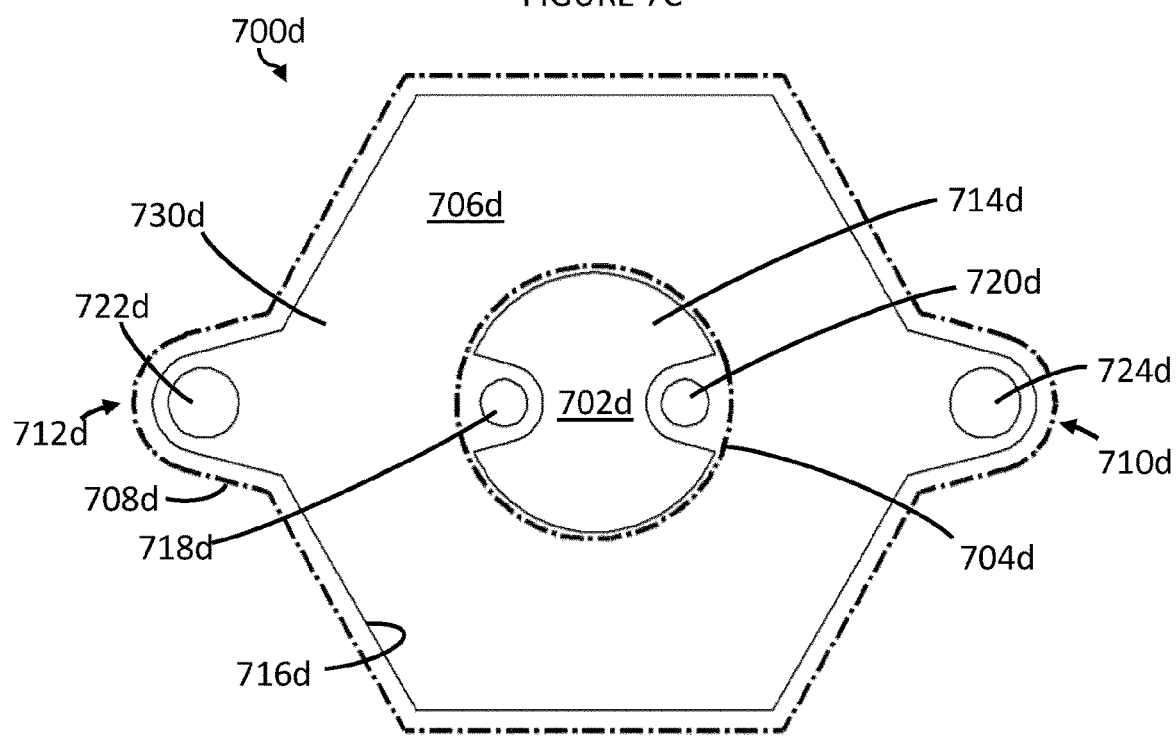
Figure 7E:
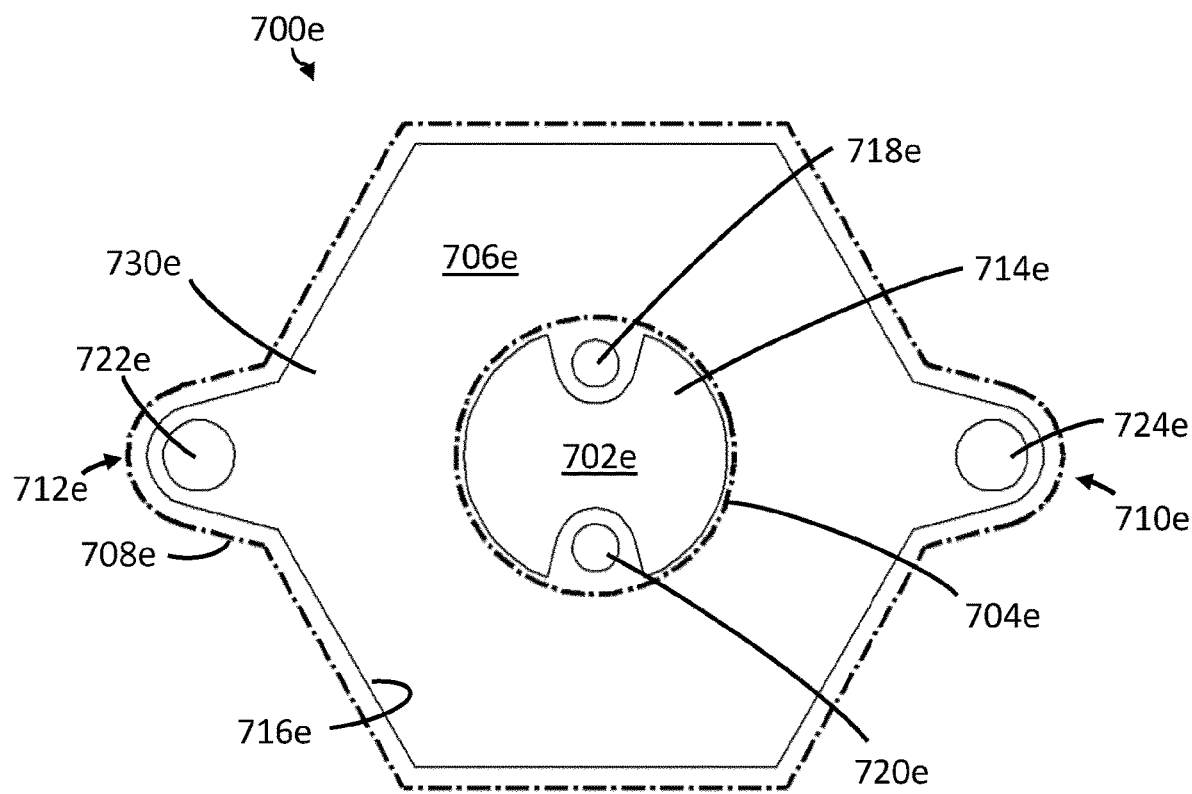
Figure 8A:
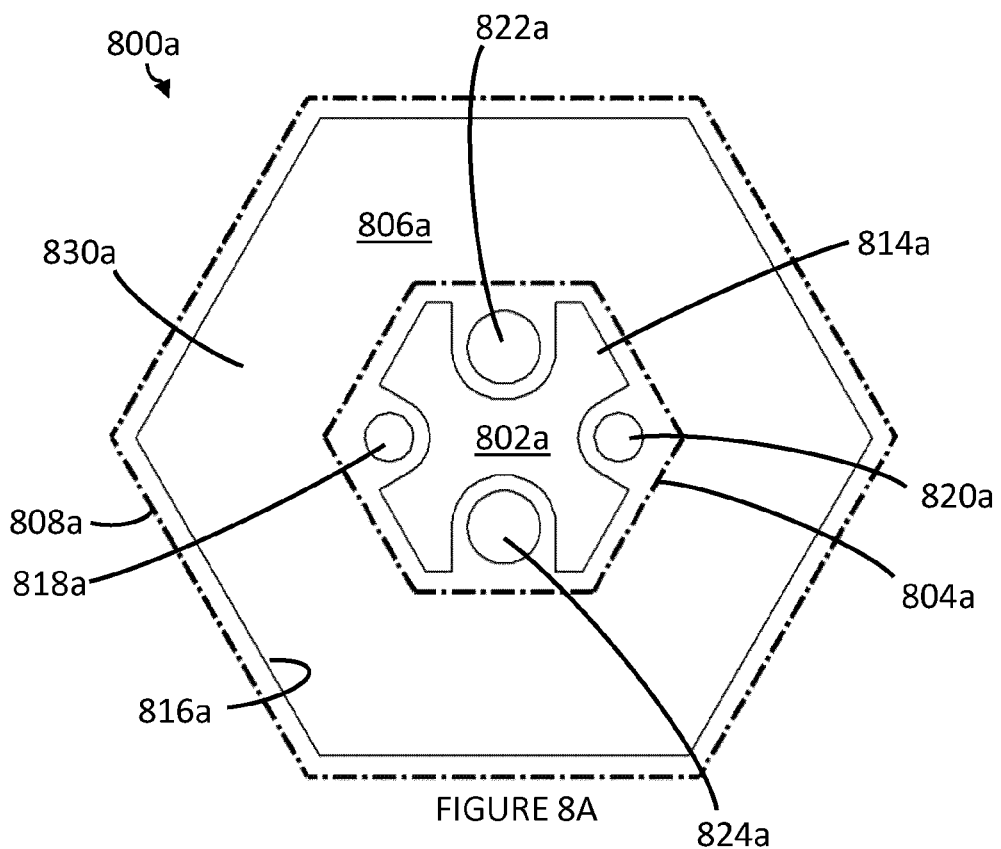
FIGS. 8A-8F are schematic drawings of layouts of a hexagonal-prism-shaped fuel cell stack shown in cross-section, according to an example embodiment.
Figure 8B:
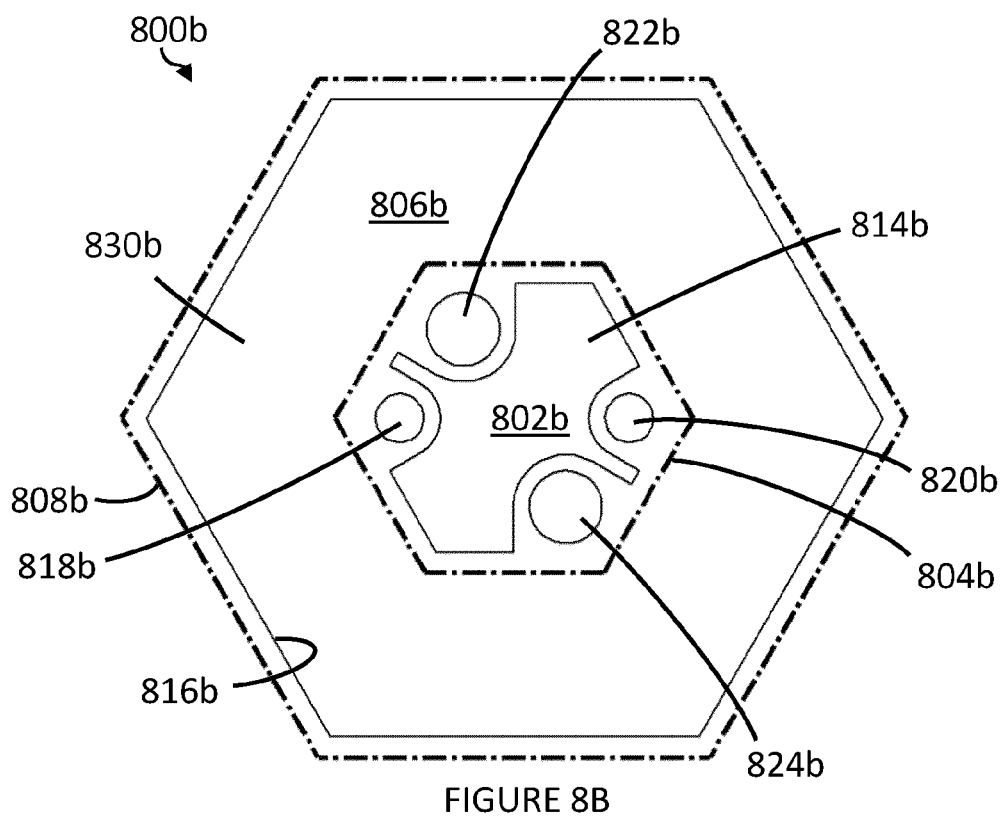
Figure 8C:
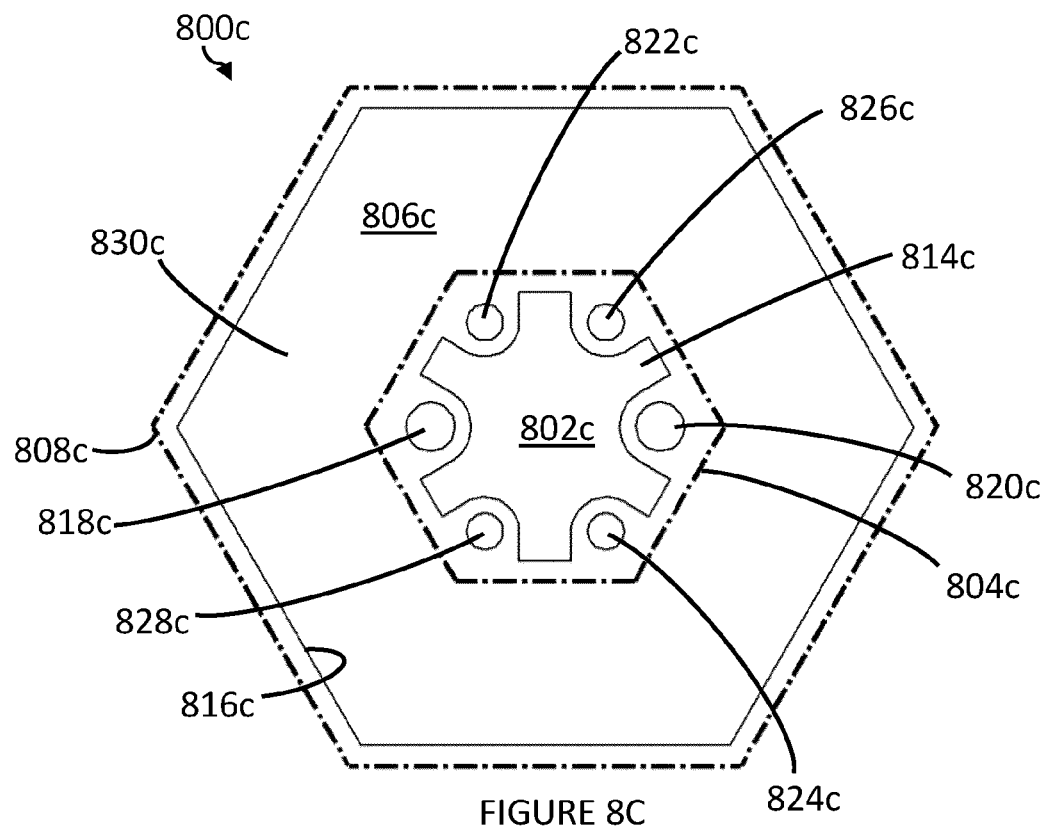
Figure 8D:
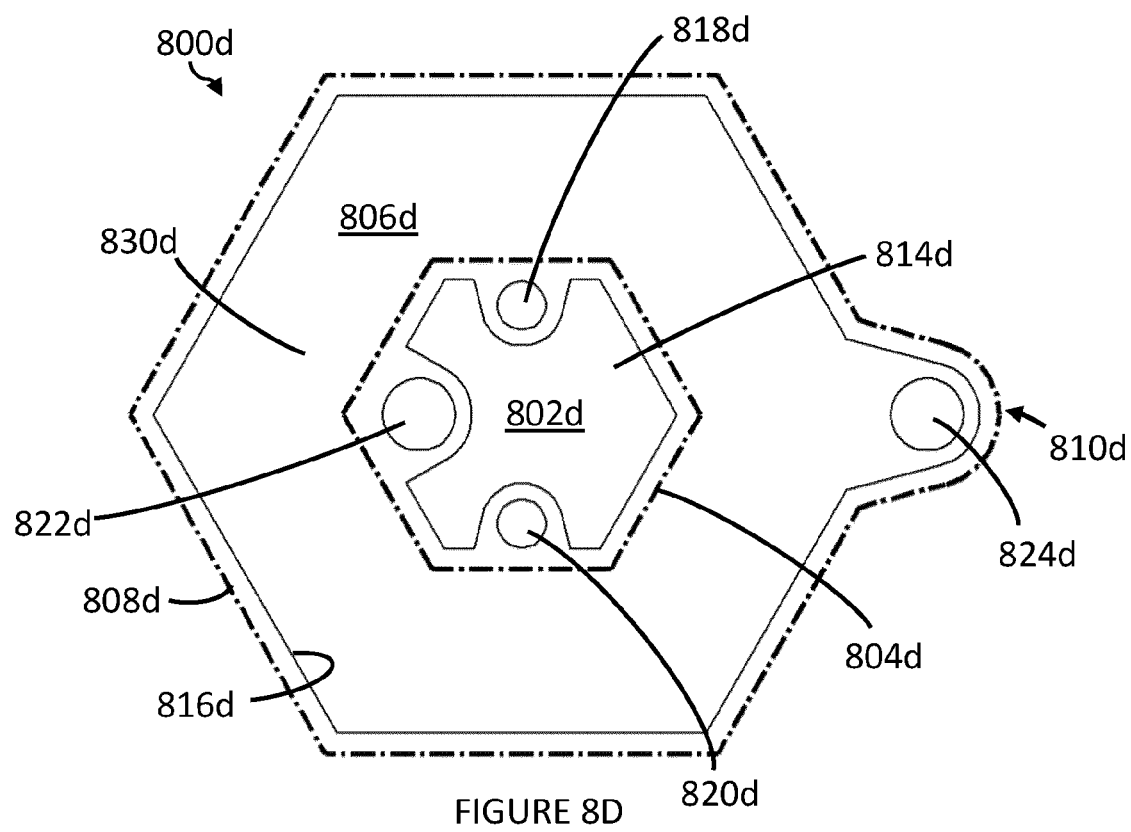
Figure 8E:
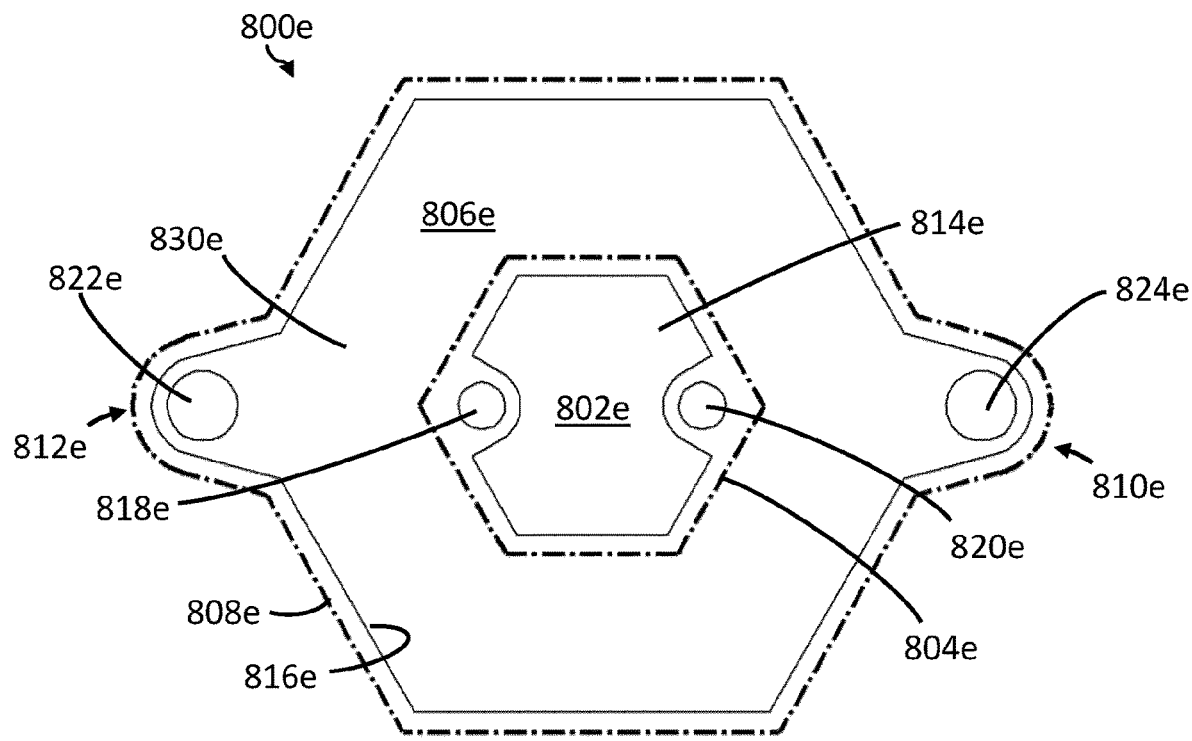
Figure 8F:
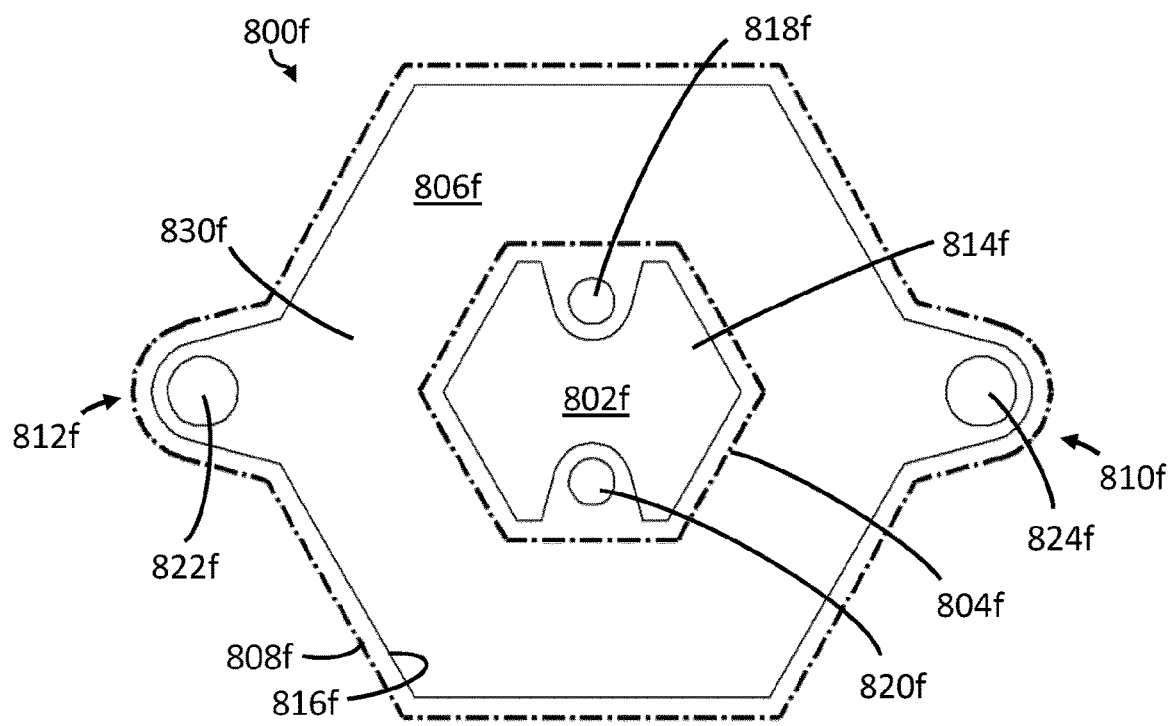

Flow field plate 1000 has the same or similar layout to layout 600a of FIG. 6A. Other implementations of flow field plate 1000 may have other suitable layouts, for example one of the layouts illustrated in FIGS. 6A-6D, 7A-7E, 8A-8F, and 9A-9C. The last two digits of reference numbers in FIGS. 10A and 10B are the same as the last two digits of the same or similar elements in FIGS. 6A-6D, 7A-7E, 8A-8F, and 9A-9C.

Flow field plate 1000 comprises an interior region 1002 bounded by a circular interior perimeter 1004, and an annular exterior region 1006 bounded by interior perimeter 1004 and an exterior perimeter 1008.

Flow field plate 1000 comprises central oxidant opening 1014, exterior surface 1016, a pair of fuel openings 1018 and 1020, and a pair of coolant openings 1022 and 1024. Flow field plate 1000 further comprises flow field 1030. When flow field plates and MEAs are stacked, openings 1014 can form a first oxidant header through which oxidant can be introduced or exhausted. A second oxidant header can be formed between exterior surface 1016 and a housing or a block enclosure, for example. The first and second oxidant headers can be fluidly coupled to the oxidant flow field (see, for example, FIG. 19B which shows a back feed/front feed transition, and back feed channels between a header and a flow field). A region between the edge of a flow field 1030 and exterior surface 1016 may include structural features to support the MEA.

Flow field 1030 is a tiered flow field (also referred to herein as a multi-tier flow field 1030). Flow field 1030 has four tiers 1030-1, 1030-2, 1030-3, and 1030-4. A person of skill in the art will appreciate that other implementations can have fewer than four tiers or more than four tiers. Flow field 1030 also has four flow transition zones 1032-1, 1032-2, 1032-3, and 1032-4.

In some implementations, flow transition zone 1032-1 includes one or more structural features to provide support for an MEA and/or associated seals.

Each tier of flow field 1030 comprises a plurality of channels, adjacent channels are separated by a respective rib. Tier 1030-1 (the closest tier to the center of flow field plate 1000) has the widest ribs and the widest channels. Tier 1030-1 also has the fewest channels per unit angle subtended at the center of flow field plate 1000. Tier 1030-2 has narrower ribs and narrower channels than tier 1030-1. Tier 1030-2 also has more channels per unit angle than tier 1030-1. Tier 1030-3 has narrower ribs and narrower channels than tier 1030-2. Tier 1030-3 also has more channels per unit angle than tier 1030-2. Tier 1030-4 (the furthest tier from the center of flow field plate 1000) has the narrowest ribs and the narrowest channels. Tier 1030-4 also has the most channels per unit angle.

In some implementations, a radial extent of tiers is selected to create a more uniform current density distribution in an MEA and to attempt to minimize a pressure drop across the flow field. A length of a tier can be determined based at least in part on a degree of uniformity of mass flow and local current density in an area of the flow field occupied by the tier. When distributions of current and/or mass flow a) deviate sufficiently from a mean flow in sections of the circumference (for the flow), or b) deviate sufficiently from an average current density along the length of the tier, a transition zone can be introduced in the flow field and sized accordingly. A suitable threshold for deviations is 10%. It is preferred that deviations are kept to less than 5%. The sizing of an adjacent tier downstream can be determined based at least in part on a balance between electrical and mass transfer voltage losses. This balance may be optimized to maximize the resulting cell voltage.

Transition zone dimensions (including a radial extent and a depth of the transition zone) can be determined based at least in part on causing a hydraulic resistance of the transition zone to be at least 10% less than that of an upstream tier.

A number of channels, a width of channels, and/or a width of landings can be selected in combination with a channel: landing ratio to control production of a current density distribution between a landing and a channel such that current is produced in a preferred location taking into account kinetic, ohmic and mass transport losses. Such losses generally may depend on local reactant, product, temperature, and liquid water conditions, for example.

A number of channels can be selected to control a remaining free variable (for example, a width of a landing or a width of a channel) such that an overall channel area and/or overall landing percentage of successive circumferences at an inlet, along a tier, and at an exit of the tier either increases a ratio of landing area to channel area in each successive downstream tier, decreases the ratio, or keeps the ratio constant. Decreasing channel area ratio in each tier can increase a flow velocity towards an exit. Increasing channel area ratio can decrease a flow velocity while recovering pressure losses. A constant ratio can result in a combination of effects.

A hydraulic diameter of channels in one tier of flow field 1030 can be different from a hydraulic diameter of channels in another tier of flow field 1030. Similarly, a width of ribs in one tier of flow field 1030 can be different from a width of ribs in another tier of flow field 1030. In some implementations, a hydraulic diameter of channels can vary within a tier. In some implementations, a width of ribs can vary within a tier.

The width of each tier in the radial direction increases tier-by-tier in the radial direction. Tier 1030-1 has a shorter width in the radial direction than tier 1030-2, and so on.

Flow fields structured as described above with reference to FIGS. 10A-10B can cause a mean speed of a flow to increase as the flow approaches an exit. This can help to purge water from the flow field, for example.

A flow field as shown in FIGS. 10A-10B may be operated in reverse so that the cross sectional area available for flow increases as the flow travels from inlet to outlet. This mode of operation allows the flow to decelerate and recover pressure as it passes through the flow field. The technology can be used to tailor a flow field structure to an operational condition of a fuel cell stack (e.g., wet and cold, hot and dry, etc.), thereby at least attempting to optimize water management for the operating environment. A fuel cell system may include a controller that monitors a high frequency resistance of the stack which, in some implementations, can be used at least in part to determine whether to reverse the flow of oxidant in the stack. Flow may be reversed by using a switching baffle or a valve in the power unit, for example.

Figure 11A:
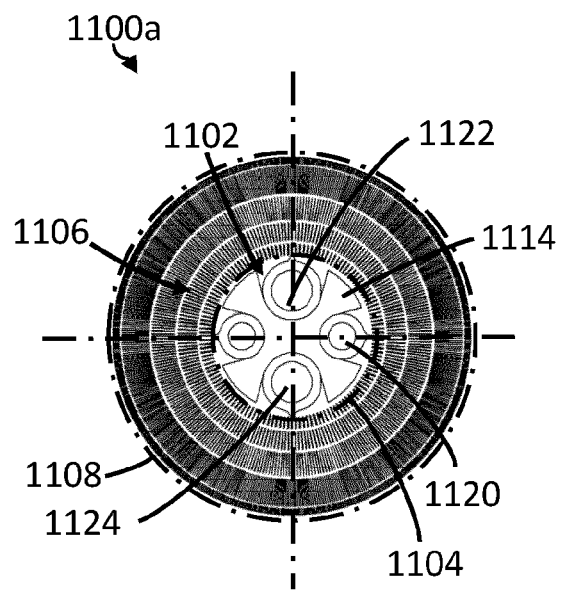
FIGS. 11A and 11B are schematic diagrams of a tiered cathode flow field plate, according to another example embodiment.
Figure 11B:
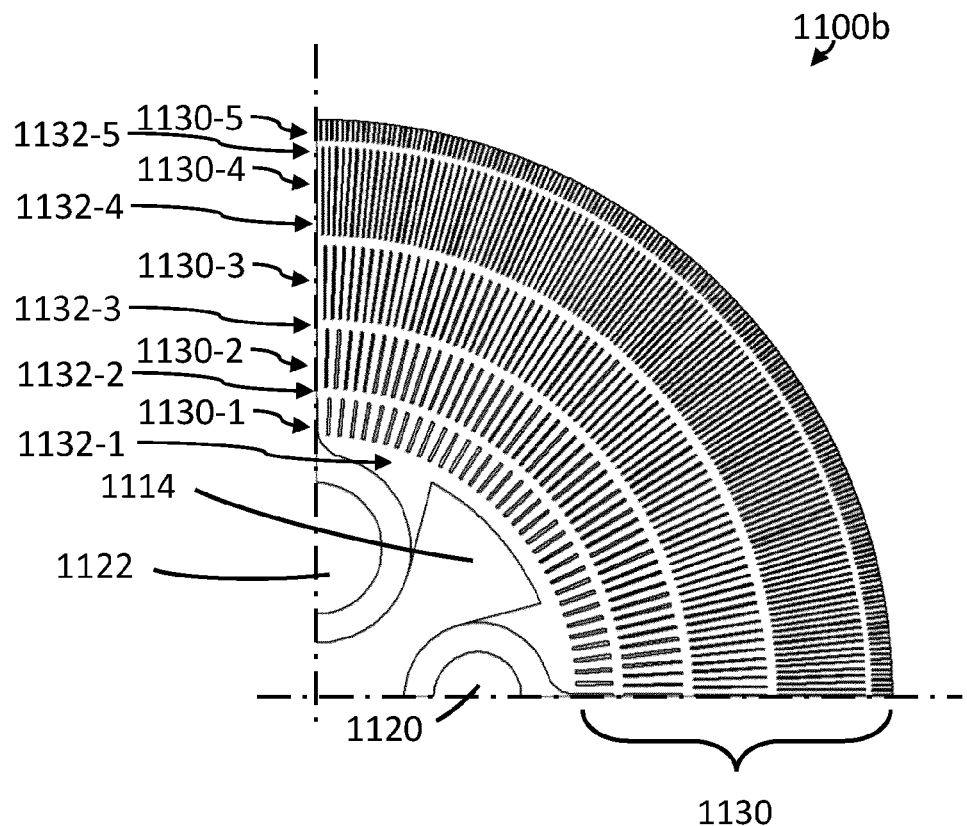

FIGS. 11A and 11B are schematic diagrams of another example implementation of a tiered cathode flow field plate 1100. FIG. 11A is a view of the side of flow field plate 1100 that includes the flow field. FIG. 11B is an expanded view of one quadrant of flow field plate 1100.

Flow field plate 1100 has the same or similar layout to layout 600a of FIG. 6A. Other implementations of flow field plate 1100 may have other layouts, for example one of the layouts described above in FIGS. 6A-6D, 7A-7E, 8A-8F, and 9A-9C.

Flow field plate 1100 comprises an interior region 1102 bounded by a circular interior perimeter 1104, and an annular exterior region 1106 bounded by interior perimeter 1104 and an exterior perimeter 1108.

Flow field plate 1100 comprises central oxidant opening 1114, exterior surface 1116, a pair of fuel openings 1118 and 1120, and a pair of coolant openings 1122 and 1124. Flow field plate 1100 further comprises flow field 1130.

Flow field 1130 is a tiered flow field. Flow field 1130 has five tiers 1130-1, 1130-2, 1130-3, 1130-4, and 1130-5. Flow field 1130 also has five flow transition zones 1132-1, 1132-2, 1132-3, 1132-4, and 1132-5.

Each tier of flow field 1130 comprises a plurality of channels, each pair of adjacent channels separated by a respective rib. Tier 1130-1 (the closest tier to the center of flow field plate 1000) has the widest ribs and the widest channels. Tier 1130-1 also has the fewest channels per unit angle subtended at the center of flow field plate 1100. Tier 1130-2 has narrower ribs and narrower channels than tier 1130-1. Tier 1130-2 also has more channels per unit angle than tier 1130-1. Tier 1130-3 has narrower ribs and narrower channels than tier 1130-2. Tier 1130-3 also has more channels per unit angle than tier 1130-2. Tier 1130-4 (the furthest tier from the center of flow field plate 1000) has the narrowest ribs and the narrowest channels. Tier 1130-4 also has the most channels per unit angle. The channels of flow field 1130 have a reducing hydraulic diameter tier-by-tier in the radial direction. The ribs of flow field 1130 have a reducing width tier-by-tier in the radial direction.

The width of each tier in the radial direction increases tier-by-tier in the radial direction with the exception of tier 1130-5 which has the shortest width in the radial direction. Tier 1130-1 has a shorter width in the radial direction than tier 1130-2, tier 1130-2 has a shorter width in the radial direction than tier 1130-3, and tier 1130-3 has a shorter width in the radial direction than tier 1130-4.

Flow fields structured as described above with reference to FIGS. 11A-11B can cause a mean speed of a flow to increase as the flow approaches an exit. This can help to purge water from the flow field, for example. In another implementation, the structure can be reversed, expanding as it moves from inlet to outlet in order to decelerate the flow and recover pressure. The technology can be used to tailor a flow field structure to an operational condition of a fuel cell stack (e.g., wet and cold, hot and dry, etc.), thereby at least attempting to optimize water management for the operating environment.

Figure 12A:
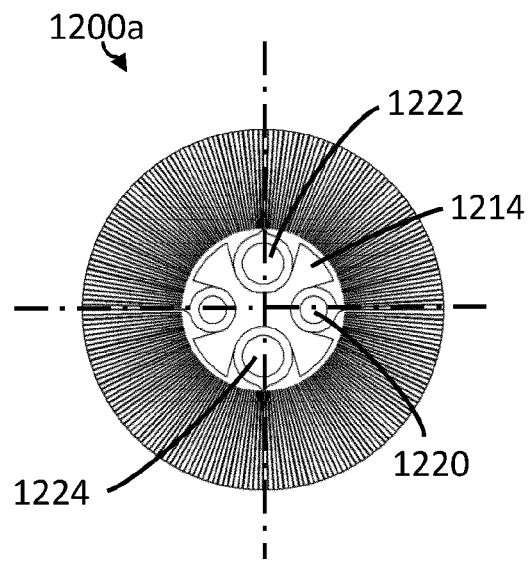
FIGS. 12A and 12B are schematic diagrams of a tiered cathode flow field plate, according to another example embodiment.
Figure 12B:
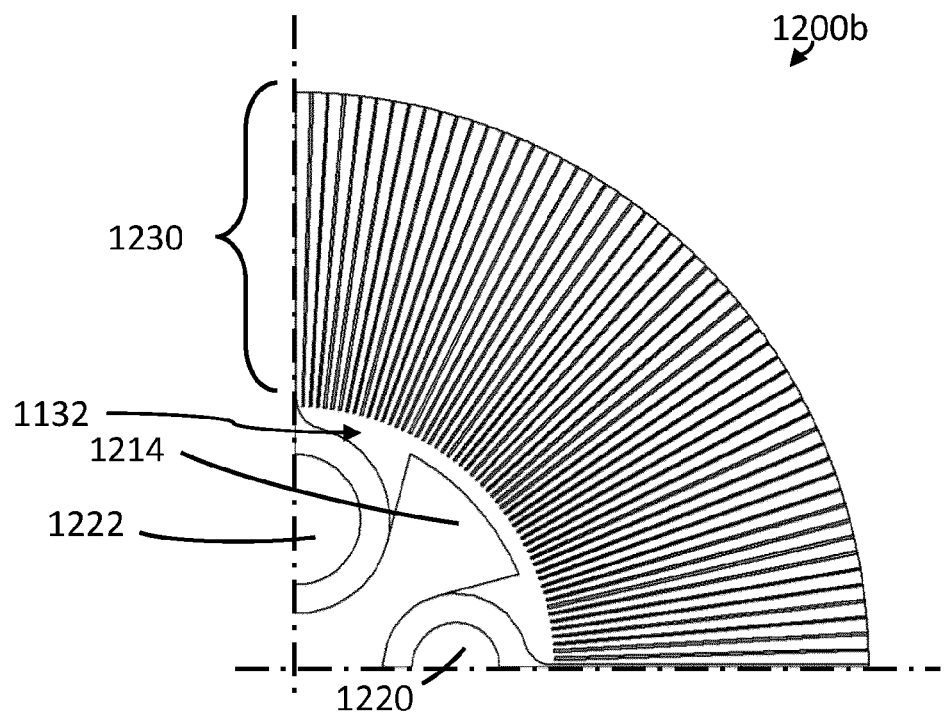

FIGS. 12A and 12B are schematic diagrams of an example implementation of a tiered cathode flow field plate 1200. FIG. 12A is a view of the side of flow field plate 1200 that includes the flow field. FIG. 12B is an expanded view of one quadrant of flow field plate 1200.

Flow field plate 1200 has the same or similar layout to layout 600a of FIG. 6A. Other implementations of flow field plate 1200 may have other layouts, for example one of the layouts described above in FIGS. 6A-6D, 7A-7E, 8A-8F, and 9A-9C.

Flow field plate 1200 comprises an interior region 1202 bounded by a circular interior perimeter 1204, and an annular exterior region 1206 bounded by interior perimeter 1204 and an exterior perimeter 1208.

Flow field plate 1200 comprises central oxidant opening 1214, exterior surface 1216, a pair of fuel openings 1218 and 1220, and a pair of coolant openings 1222 and 1224. Flow field plate 1200 further comprises flow field 1230.

Flow field 1230 has a single tier, and a single transition zone 1232. Flow field 1230 comprises a plurality of channels, each pair of adjacent channels separated by a respective rib.

Figure 13A:
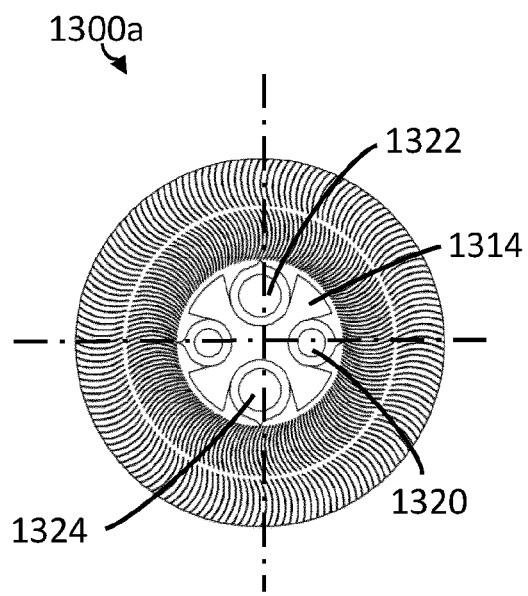
FIGS. 13A and 13B are schematic diagrams of a tiered cathode flow field plate, according to another example embodiment.
Figure 13B:
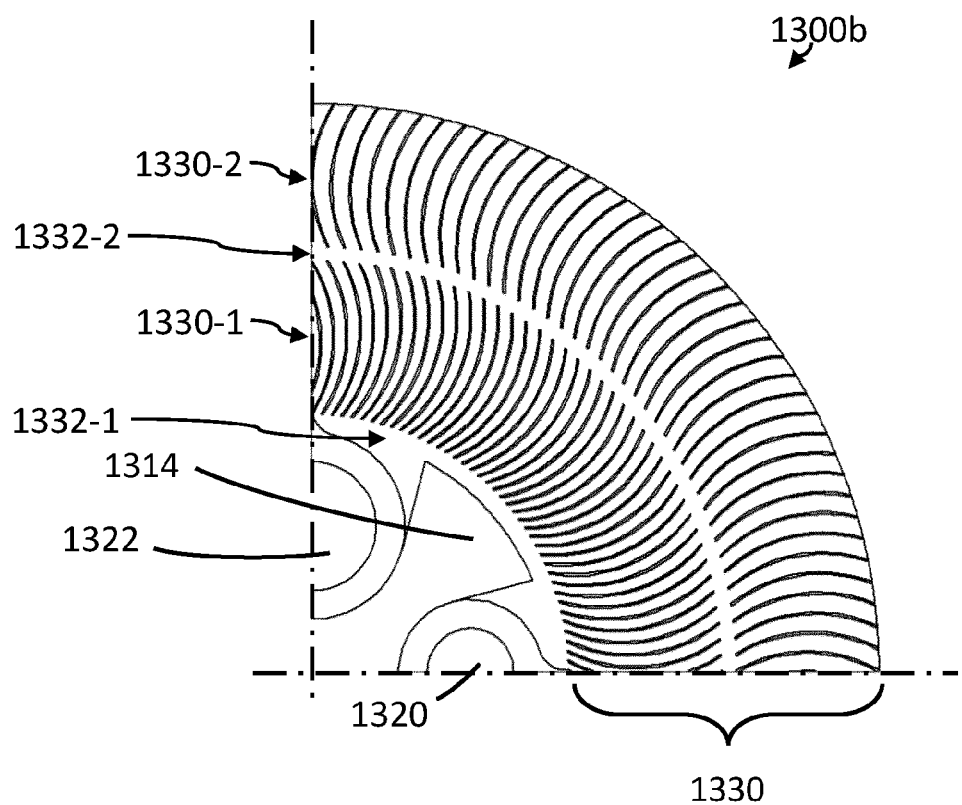

FIGS. 13A and 13B are schematic diagrams of an example implementation of a tiered cathode flow field plate 1300. FIG. 13A is a view of the side of flow field plate 1300 that includes the flow field. FIG. 13B is an expanded view of one quadrant of flow field plate 1300.

Flow field plate 1300 has the same or similar layout to layout 600a of FIG. 6A. Other implementations of flow field plate 1300 may have other layouts, for example one of the layouts described above in FIGS. 6A-6D, 7A-7E, 8A-8F, and 9A-9C.

Flow field plate 1300 comprises an interior region 1302 bounded by a circular interior perimeter 1304, and an annular exterior region 1306 bounded by interior perimeter 1304 and an exterior perimeter 1308.

Flow field plate 1300 comprises central oxidant header 1314, exterior surface 1316, a pair of fuel openings 1318 and 1320, and a pair of coolant openings 1322 and 1324. Flow field plate 1300 further comprises flow field 1330.

Flow field 1330 is a tiered flow field. Flow field 1330 has two tiers 1330-1 and 1330-2. Flow field 1330 also has two flow transition zones 1332-1 and 1332-2.

Each tier of flow field 1330 comprises a plurality of channels, each pair of adjacent channels separated by a respective rib. Tier 1330-1 (the closest tier to the center of flow field plate 1300) has the widest ribs and the widest channels. Tier 1330-1 also has the fewest channels per unit angle subtended at the center of flow field plate 1300. Tier 1330-2 (the furthest tier from the center of flow field plate 1300) has narrower ribs and narrower channels than tier 1330-1. Tier 1330-2 also has more channels per unit angle than tier 1330-1.

The channels of flow field 1330 are curved. The channels of tier 1330-1 curve to the left. The channels of tier 1330-2 curve to the right. The channels of flow field 1330 have a reducing hydraulic diameter tier-by-tier in the radial direction. The ribs of flow field 1330 have a reducing width tier-by-tier in the radial direction.

Flow fields structured as described above with reference to FIGS. 13A-13B can increase a mean speed of a flow approaching an exit. In another implementation, the structure can be reversed, expanding as it moves from inlet to outlet in order to decelerate the flow and recover pressure. The technology can be used to tailor a flow field structure to an operational condition of a fuel cell stack (e.g., wet and cold, hot and dry, etc.), thereby at least attempting to optimize water management for the operating environment.

In some implementation, the width of each tier in the radial direction may vary, for example the width of each tier in the radial direction may increase tier-by-tier in the radial direction.

Tiered Coolant and Anode Flow Fields

Figure 14A:
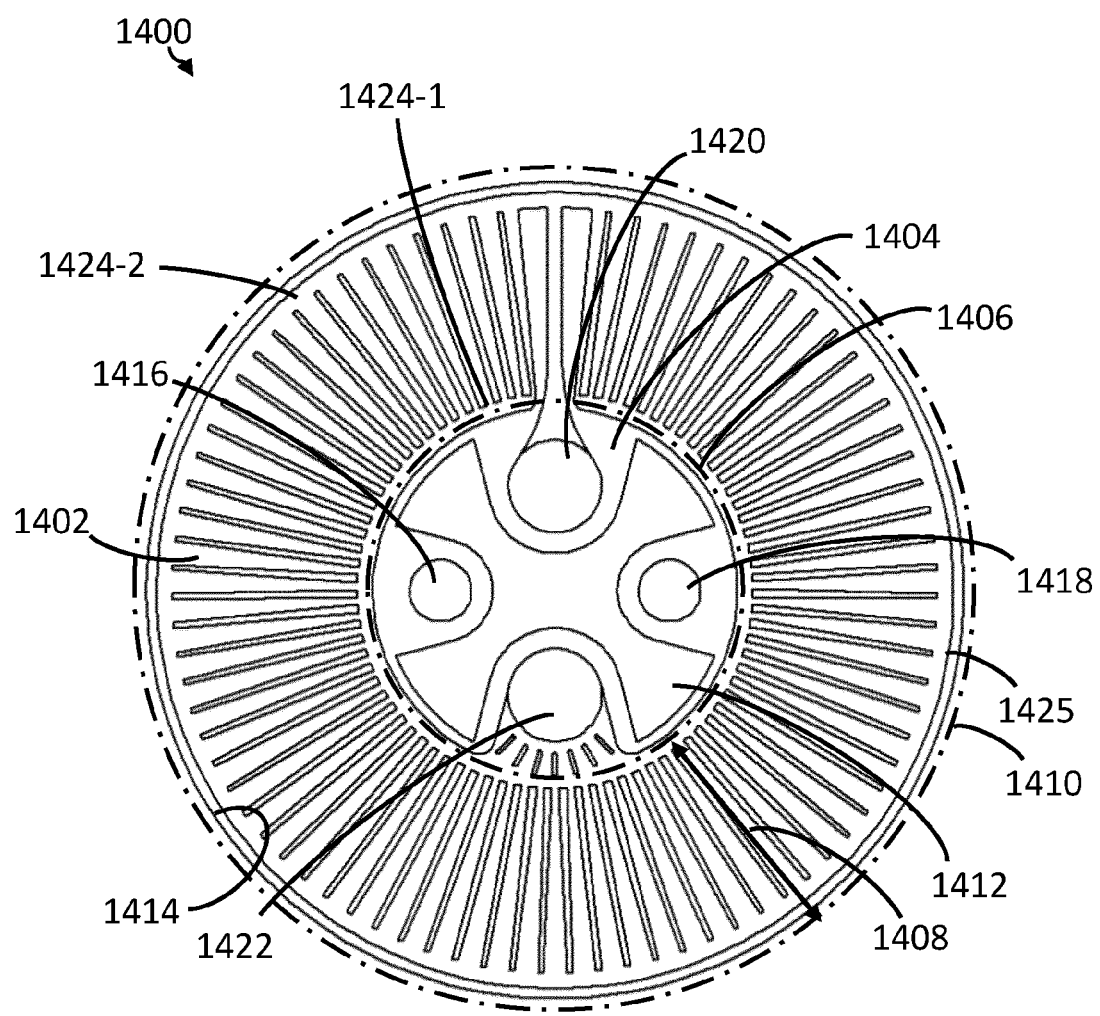
FIG. 14A is a schematic diagram of a tiered flow field plate, according to an example embodiment.

FIG. 14A is a schematic diagram of a flow field plate 1400, according to an example embodiment. FIG. 14A is a view of a first major side of flow field plate 1400 where the major side includes a single-tiered, converging-rib coolant flow field 1402.

Flow field plate 1400 has the same or similar layout to layout 600a of FIG. 6A. Other implementations of flow field plate 1400 may have other layouts, for example one of the layouts described above in FIGS. 6A-6D, 7A-7E, 8A-8F, and 9A-9C.

Flow field plate 1400 comprises an interior region 1404 bounded by an interior perimeter 1406, and an annular exterior region 1408 (indicated by a double-headed arrow) bounded by interior perimeter 1406 and an exterior perimeter 1410. In the example illustrated in FIG. 14A, interior perimeter 1406 is a circular interior perimeter, and exterior perimeter 1410 is a circular exterior perimeter.

Flow field plate 1400 comprises a central oxidant header 1412, an exterior surface 1414, a pair of fuel openings 1416 and 1418, and a pair of coolant openings 1420 and 1422.

Flow field 1402 has a single tier. Flow field 1402 includes flow transition zones 1424-1 and 1424-2. Flow transition zone 1424-1 is inside and adjacent to interior perimeter 1406. Flow transition zone 1424-2 is inside and adjacent to surface 1414. In some implementations, there is an additional perimeter wall 1425 between fluid in flow transition zone 1424-2 and exterior surface 1414.

Flow field 1402 comprises a plurality of channels, each pair of adjacent channels separated by a respective rib. In the example illustrated in FIG. 14A, the channels follow radial lines extending from flow transition zone 1424-1 to flow transition zone 1424-2. In some implementations, such as the example illustrated in FIG. 14A, the ribs are converging. The channel widens from flow transition zone 1424-1 to flow transition zone 1424-2. Depending on the direction of fluid flow (see FIGS. 14B and 14C below), the channel either converges or diverges in the direction of flow. In some implementations, the width of ribs can be tapered in one direction or the other, and the channel widths can be kept constant. In some implementations, the length of ribs within a tier varies, which can cause a width of transition zones 1424-1 and 1424-2 to vary (in the radial direction).

When flow field plates and MEAs are stacked, openings 1412, 1416, 1418, 1420, and 1422 can form headers through which fluids can be introduced or exhausted. The headers can be fluidly coupled to the flow field (see, for example, FIG. 19B which shows a back feed/front feed transition, and back feed channels between a header and a flow field).

Figure 14B:
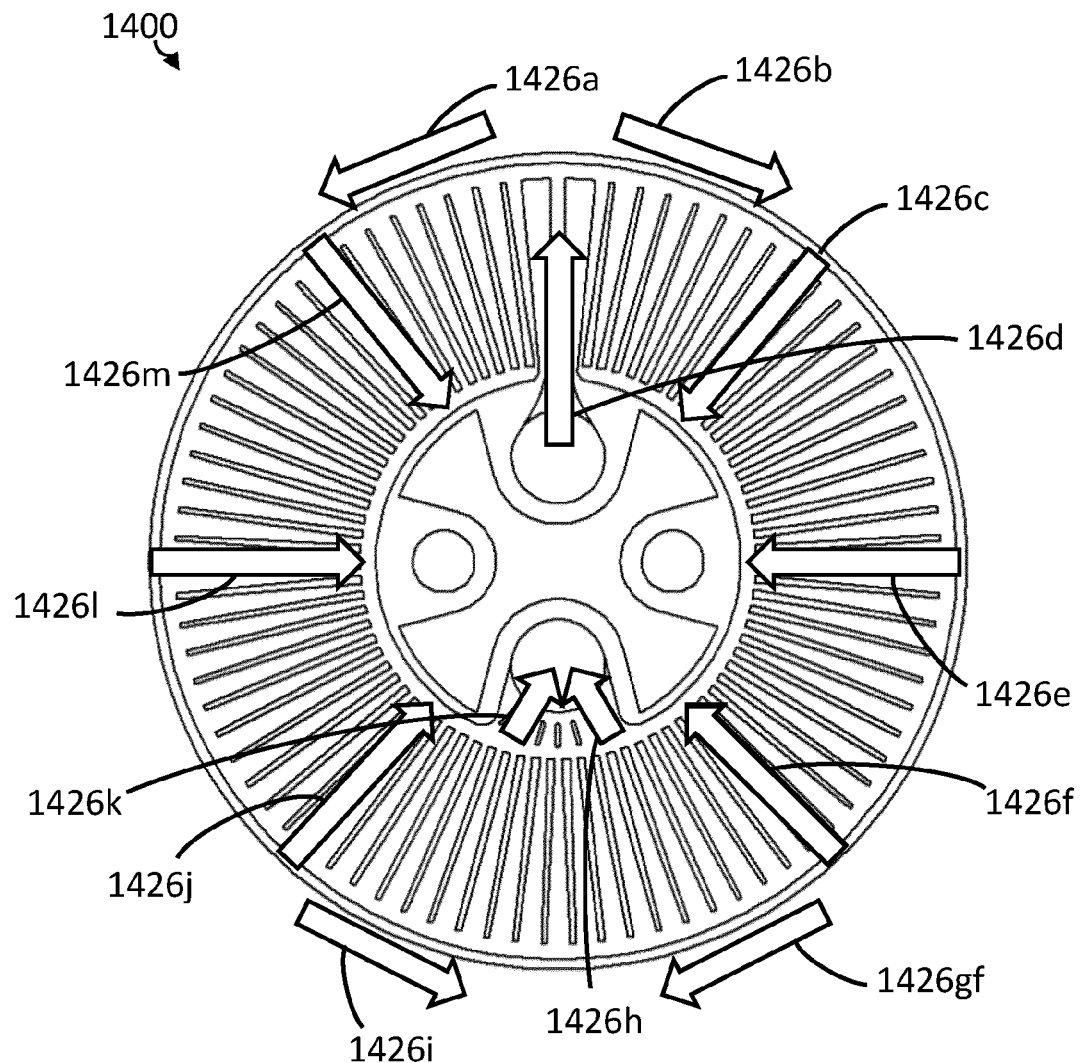
FIG. 14B is a schematic diagram of the tiered flow field plate of FIG. 14A with arrows to show directions of flow in the flow field, according to an example embodiment.

FIG. 14B is a schematic diagram of flow field plate 1400 of FIG. 14A with arrows to show directions of coolant flow in coolant flow field 1402, according to an example embodiment. Flow field 1402 directs flow in flow field plate 1400 as indicated by the arrows in FIG. 14B. Flow routes 1426a-1426m (collectively referred to as flow routes 1426) are indicated by block arrows with no hatching. Flow routes 1426 carry fluid for the purposes of moving fluid from an inlet to an outlet. In the example of FIG. 14B, the inlet is coolant opening 1420, and the output is coolant opening 1422. When flow field plates and MEAs are stacked, coolant openings 1420 and 1422 can form headers to introduce coolant to the flow field or exhaust coolant from the flow field. Coolant is fluidly coupled to the coolant flow field (see, for example, FIG. 19B which shows a back feed/front feed transition, and back feed channels between a header and a flow field).

Figure 14C:
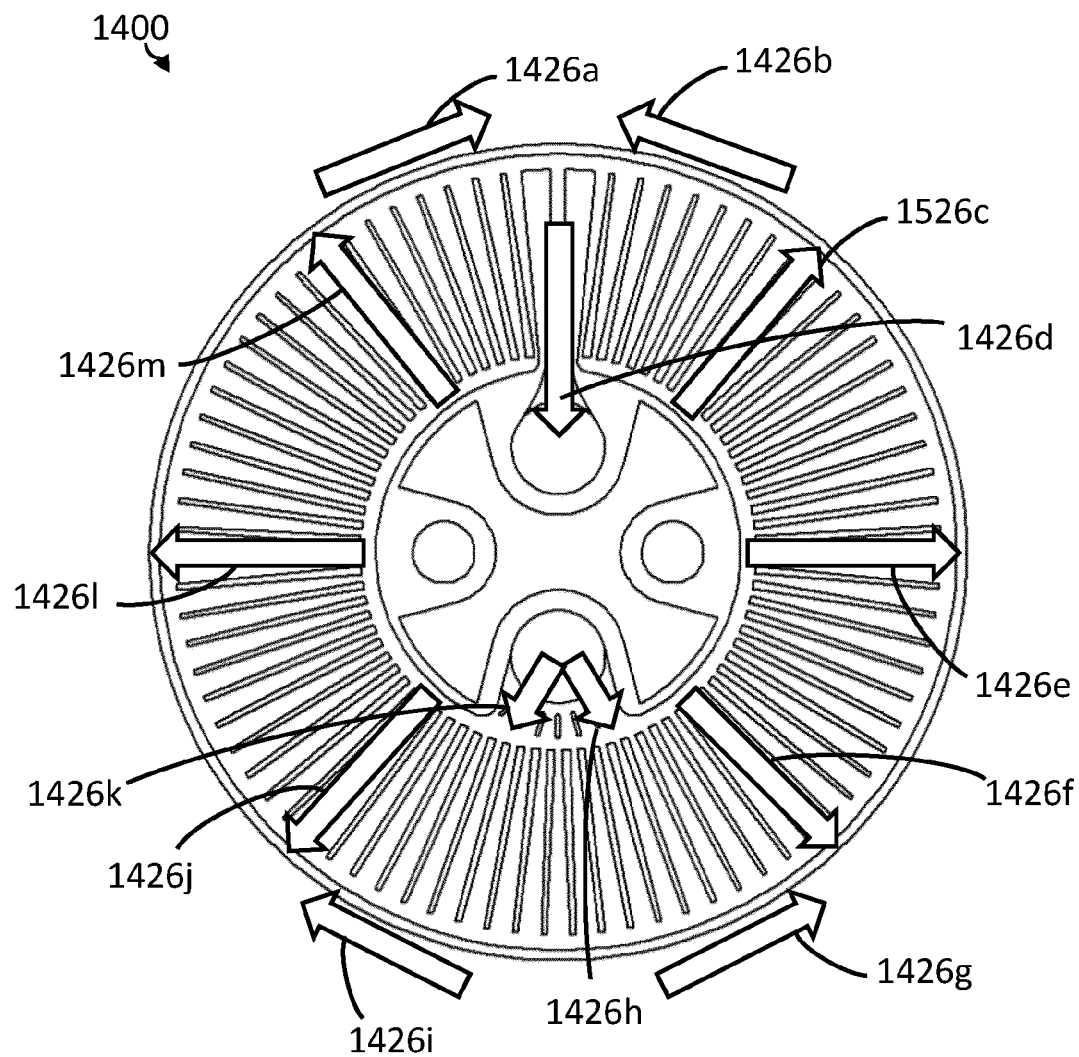
FIG. 14C is a schematic diagram of the tiered flow field plate of FIG. 14A with arrows to show directions of flow in the flow field, according to another example embodiment.

FIG. 14C is a schematic diagram of flow field plate 1400 of FIG. 14A with arrows to show directions of coolant flow in coolant flow field 1402, according to another example embodiment. Flow field 1402 directs flow in flow field plate 1402 as indicated by arrows in FIG. 14C. As in FIG. 14B, flow routes 1426 are indicated by block arrows with no hatching. Flow routes 1426 in FIG. 14C are reversed relative to flow routes 1426 in FIG. 14B. As described above, flow routes 1426 carry fluid for the purposes of moving fluid from an inlet to an outlet. In the example of FIG. 14C, the inlet is coolant opening 1422, and the output is coolant opening 1420.

Figure 15A:
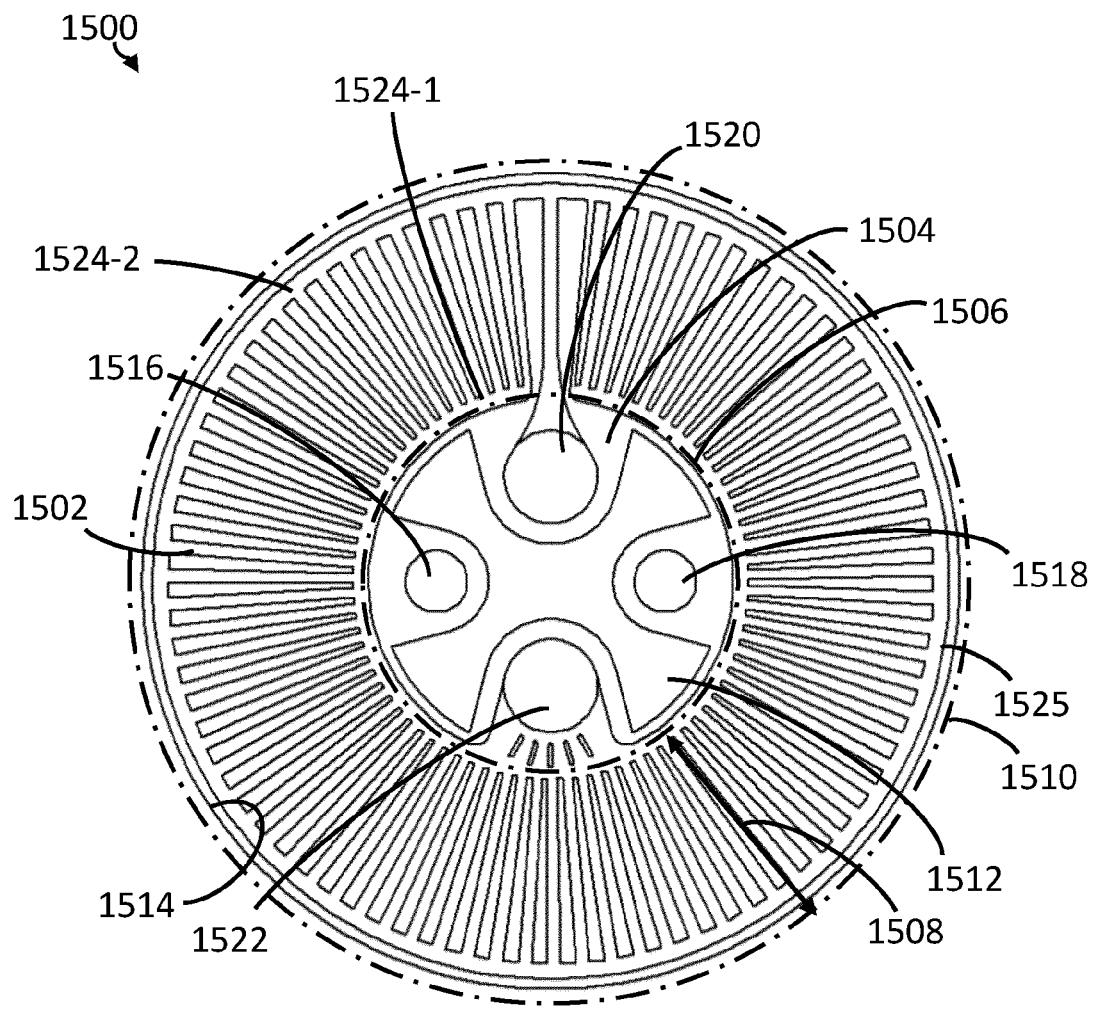
FIG. 15A is a schematic diagram of a tiered flow field plate, according to an example embodiment.

FIG. 15A is a schematic diagram of a flow field plate 1500, according to an example embodiment. FIG. 15A is a view of a major side of flow field plate 1500 where the major side includes a single-tiered, diverging-rib coolant flow field 1502.

Flow field plate 1500 has the same or similar layout to layout 600a of FIG. 6A. Other implementations of flow field plate 1500 may have other layouts, for example one of the layouts described above in FIGS. 6A-6D, 7A-7E, 8A-8F, and 9A-9C.

Flow field plate 1500 comprises an interior region 1504 bounded by an interior perimeter 1506, and an annular exterior region 1508 (indicated by a double-headed arrow) bounded by interior perimeter 1506 and an exterior perimeter 1510. In the example illustrated in FIG. 15A, interior perimeter 1506 is a circular interior perimeter, and exterior perimeter 1510 is a circular exterior perimeter.

Flow field plate 1500 comprises a central oxidant opening 1512, an exterior surface 1514, a pair of fuel openings 1516 and 1518, and a pair of coolant openings 1520 and 1522.

Flow field 1502 has a single tier. Flow field 1502 includes flow transition zones 1524-1 and 1524-2. Flow transition zone 1524-1 is inside and adjacent to interior perimeter 1506. Flow transition zone 1524-2 is inside and adjacent to exterior surface 1514. In some implementations, there is an additional perimeter wall 1525 between fluid in flow transition zone 1524-2 and exterior surface 1514.

Flow field 1502 comprises a plurality of channels, each pair of adjacent channels separated by a respective rib. In the example illustrated in FIG. 15A, the channels follow radial lines extending from flow transition zone 1524-1 to flow transition zone 1524-2. In some implementations, such as the example illustrated in FIG. 15A, the ribs are diverging. The channel narrows from flow transition zone 1524-1 to flow transition zone 1524-2. Depending on the direction of fluid flow (see FIGS. 15B and 15C below), the channel either diverges or converges in the direction of flow. In some implementations, the width of ribs can be tapered in one direction or the other, and the channel widths can be kept constant. In some implementations, the length of ribs within a tier varies, which can cause a width of transition zones 1524-1 and 1524-2 to vary (in the radial direction).

When flow field plates and MEAs are stacked, openings 1512, 1516, 1518, 1520, and 1522 can form headers through which fluids can be introduced or exhausted. The headers can be fluidly coupled to the flow field (see, for example, FIG. 19B which shows a back feed/front feed transition, and back feed channels between a header and a flow field).

Figure 15B:
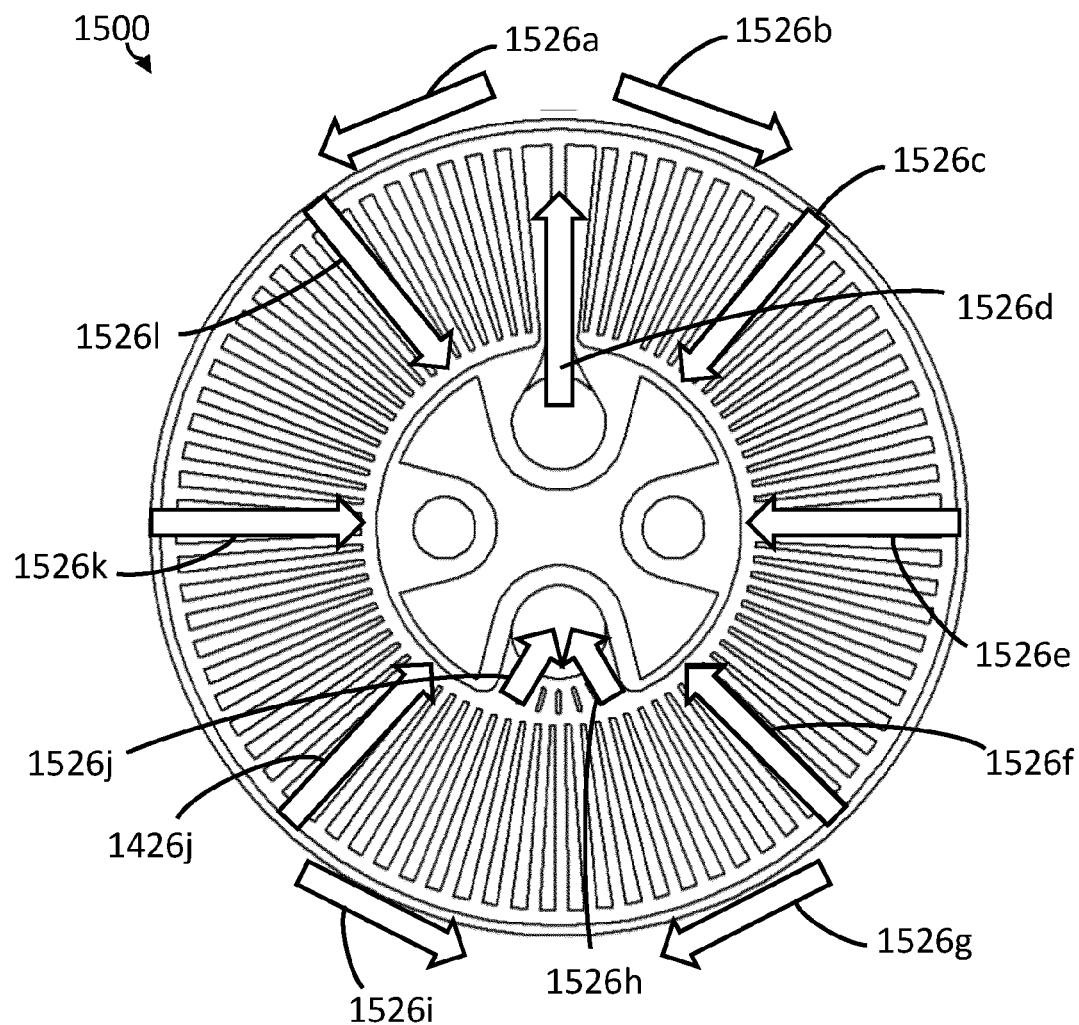
FIG. 15B is a schematic diagram of the tiered flow field plate of FIG. 15A with arrows to show directions of flow in the flow field, according to an example embodiment.

FIG. 15B is a schematic diagram of flow field plate 1500 of FIG. 15A with arrows to show directions of coolant flow in coolant flow field 1502, according to an example embodiment. Flow field 1502 directs flow in flow field plate 1500 as indicated by the arrows in FIG. 15B. Flow routes 1526a-1526m (collectively referred to as flow routes 1526) are indicated by block arrows with no hatching. Flow routes 1526 carry fluid for the purposes of moving fluid from an inlet to an outlet. In the example of FIG. 15B, the inlet is coolant port 1520, and the output is coolant port 1522.

Figure 15C:
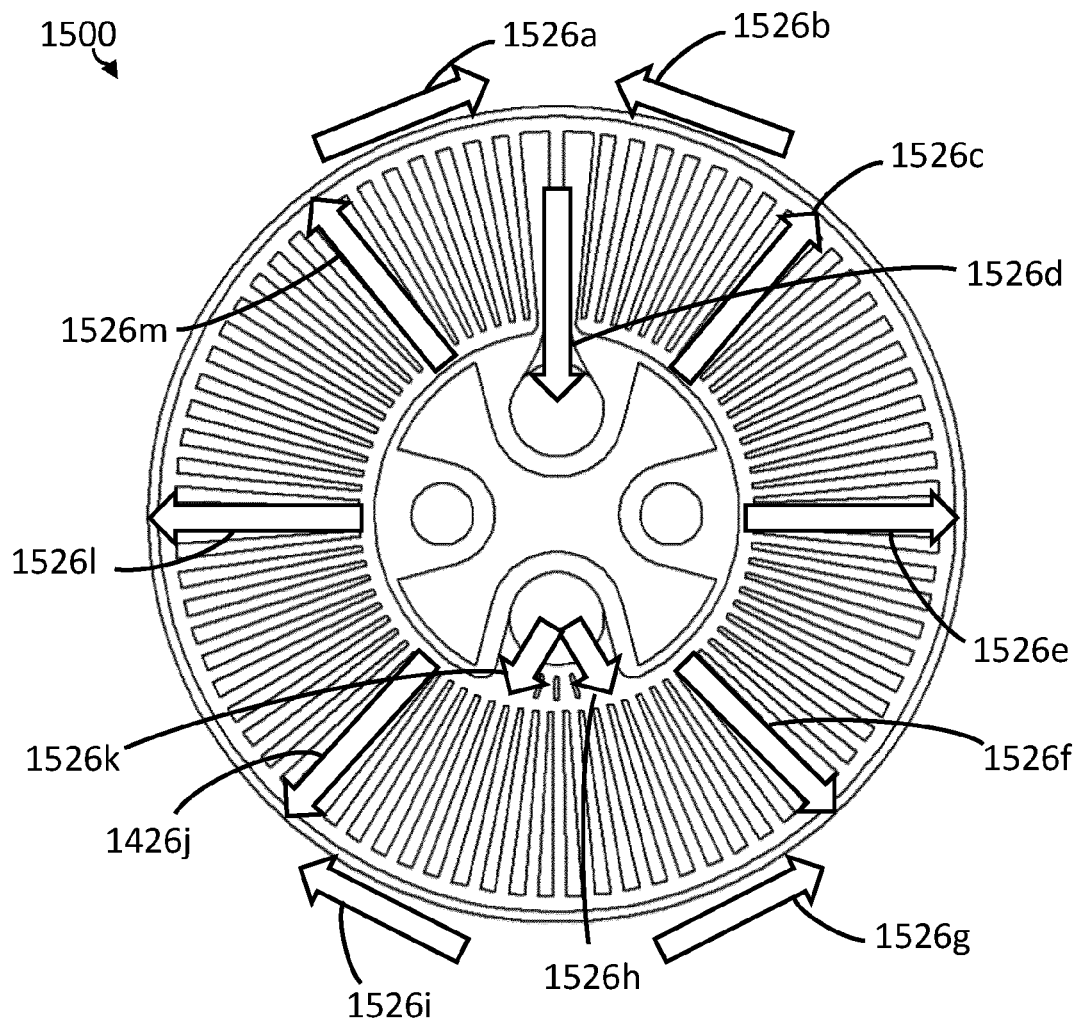
FIG. 15C is a schematic diagram of the tiered flow field plate of FIG. 15A with arrows to show directions of flow in the flow field, according to another example embodiment.

FIG. 15C is a schematic diagram of flow field plate 1500 of FIG. 15A with arrows to show directions of coolant flow in coolant flow field 1502, according to another example embodiment. Flow field 1502 directs flow in flow field plate 1502 as indicated by arrows in FIG. 15C. As in FIG. 15B, flow routes 1526 are indicated by block arrows with no hatching. Flow routes 1526 in FIG. 15C are reversed relative to flow routes 1526 in FIG. 15B. As described above, flow routes 1526 carry fluid for the purposes of moving fluid from an inlet to an outlet. In the example of FIG. 15C, the inlet is coolant port 1522, and the output is coolant port 1520.

In various of the above embodiments of flow fields, the number of channels, the width of the channels, and/or the width of the ribs vary from one tier to another. In some implementations, the width of the channels and/or the width of the ribs vary within a tier. Ribs may be of constant width, converging or diverging.

A geometry of a radial field can have an expanding circumferential cross sectional area in a radial direction. For flow from a center of a flow field to an outer perimeter, a constant width rib creates a diverging channel owing to radial growth of channels in the circumferential cross-sectional area. A diverging rib can be used to at least partially overcome the cross-sectional area growth and can be used to create a constant channel width or a tapering (converging) channel.

Changes in cross-sectional area and channel:landing ratio over the length of a tier can affect various processes that govern MEA performance, including electrical (charge) transport, mass transfer, liquid water removal, and heat removal. When a rib is diverging, a width of the rib increases with radius in the flow direction, which can increase an area for current collection from the MEA (thereby decreasing electrical losses) while decreasing an area of the MEA exposed to the gas channel (thereby increasing mass transfer resistance). Additionally, heat transfer improves and, depending on the operating conditions, the liquid water content of the MEA can increase due to a reduction in the local rate of water removal in the channel which gives lower ionic transport losses but higher mass transfer losses. A diverging rib can also be structured to provide a constant channel but expanding land area and a converging rib expands the channel. In the constant channel case, the rib expands with the same effect as in the diverging rib. In the converging rib case, the rib gets smaller along the radial length and the channel gets larger this allows more gas access to the MEA, a higher rate of water removal but potentially a lower level of MEA hydration depending on the operating conditions of the cell/stack. Overall, this means lower mass transfer losses but higher electrical losses and potentially higher ionic losses. Thermally, the ribs are smaller and farther apart so the thermal transport length is longer so there is a slightly lower rate of heat removal through thermal conduction.

MEAs can vary, for example in their use different materials, catalyst compositions, areal loadings, and thicknesses of component layers. An arrangement of a flow field plate can vary with MEA.

When a stack operates at low current densities (for example, less than 0.3 A/cm$^2$) under dry conditions, flow field regions that promote higher water content and reduce electrical and ionic losses can be preferred. When a stack operates at mid-range current densities (for example, 0.3 to 1.2 A/cm$^2$) under both dry and wet conditions, a mix of regions can be used to improve overall performance. When a stack operates at high current densities (>1.2 A/cm$^2$), regions that promote liquid water removal and high rates of mass transfer can be preferred. It can be beneficial a) to attempt to maximize an output voltage of the stack under a range of current densities likely to be encountered in operation of the stack, and b) to at least reduce inhomogeneity in local conditions in the MEA and bipolar plate in order to improve durability, reduce hot spots, and reduce undesirable internal currents.

Figure 16A:
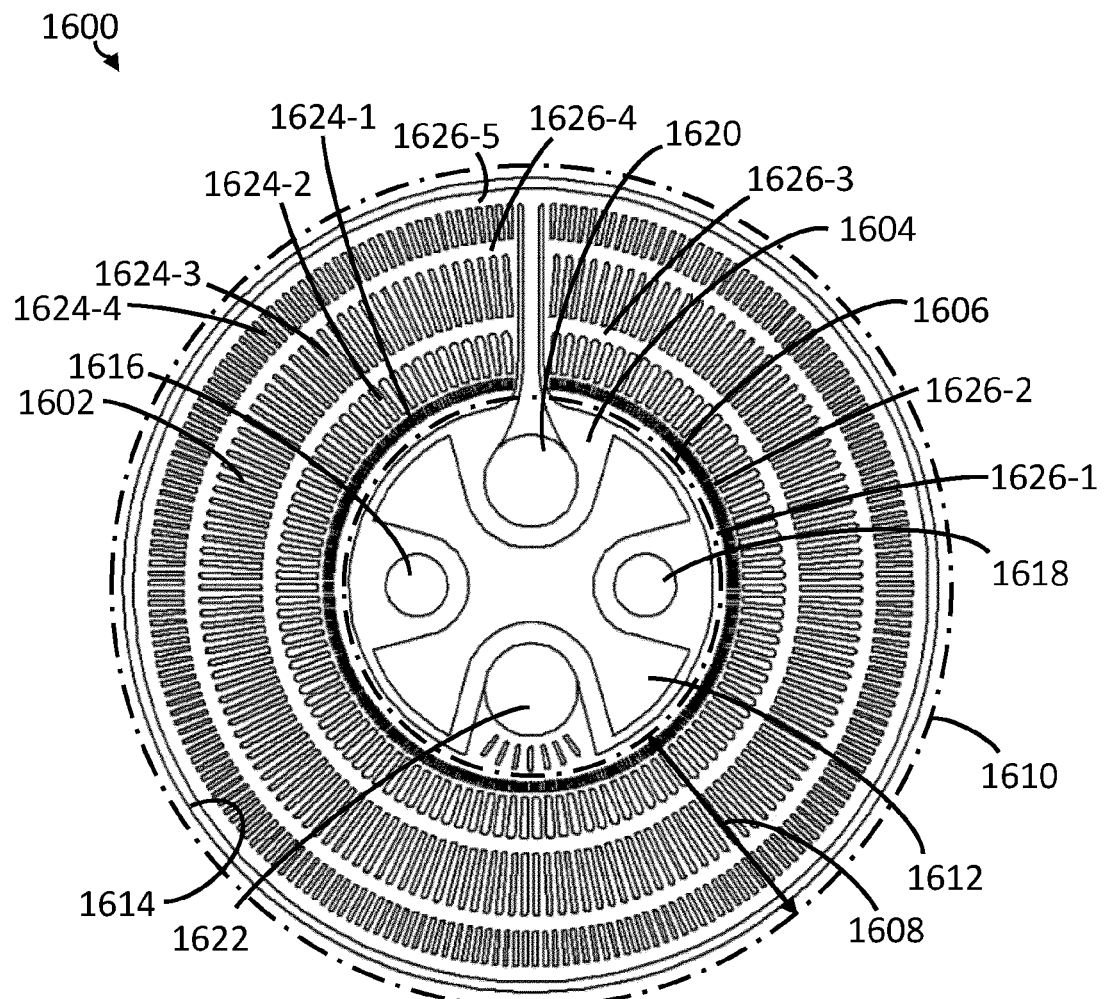
FIG. 16A is a schematic diagram of a tiered flow field plate, according to an example embodiment.

FIG. 16A is a schematic diagram of a tiered flow field plate 1600, according to an example embodiment. FIG. 16A is a view of a major side of flow field plate 1600 where the major side includes a radial-tiered coolant flow field 1602 with circumferential distributors.

Flow field plate 1600 has the same or similar layout to layout 600a of FIG. 6A. Other implementations of flow field plate 1600 may have other layouts, for example one of the layouts described above in FIGS. 6A-6D, 7A-7E, 8A-8F, and 9A-9C.

Flow field plate 1600 comprises an interior region 1604 bounded by an interior perimeter 1606, and an annular exterior region 1608 (indicated by a double-headed arrow) bounded by interior perimeter 1606 and an exterior perimeter 1610. In the example illustrated in FIG. 16A, interior perimeter 1606 is a circular interior perimeter, and exterior perimeter 1610 is a circular exterior perimeter.

Flow field plate 1600 comprises a central oxidant header 1612, an exterior surface 1614, a pair of fuel openings 1616 and 1618, and a pair of coolant openings 1620 and 1622.

Flow field 1600 is a tiered flow field. Flow field 1602 has four radially-arranged tiers 1624-1, 1624-2, 1624-3, and 1624-4 (collectively referred to as radial tiers 1624). Flow field 1602 includes five flow transition zones 1626-1, 1626-2, 1626-3, 1626-4, and 1626-5 (collectively referred to as flow transition zones 1626). Flow transition zones 1626 are also referred to herein as circumferential distributors 1626. Other implementations of a radially-tiered flow field plate (e.g., a coolant flow field plate) can have more than four tiers or fewer than four tiers. Other implementations of a radially-tiered flow field plate can have other numbers and arrangements of circumferential distributors.

Each tier of tier 1624 of flow field 1602 comprises a plurality of channels, each pair of adjacent channels separated by a respective rib. In the example illustrated in FIG. 16A, the channels are arranged in concentric circular arcs about a center of flow field plate 1600. In some implementations, the number of channels, the width of the channels, and/or the width of the ribs vary from one tier to another. In some implementations, the width of the channels and/or the width of the ribs vary within a tier. Ribs may be of constant width, converging or diverging. In the example embodiment illustrated in FIG. 16A, tier 1624-1 has a larger number of more closely-spaced channels than the other tiers. Tier 1624-1 is also referred to herein as a restrictor layer. Tier 1624-1 may cause more uniform flow distribution in interior region 1604. The effect of tier 1624-1 on flow can depend on a direction of flow.

Flow field 1602 is referred to herein as an example of a radially-tiered flow field because tiers 1624 are arranged sequentially as one moves radially across flow field plate 1600.

The width of circumferential distributors may vary along the path of each distributor, and/or from one distributor to another. Circumferential distributors 1626 are concentric circles. In other implementations, circumferential distributors 1626 may have other geometries e.g., circumferential distributors 1626 may be wavy and/or may include one or more straight-line segments. The number of circumferential distributors 1626, and their geometry may be arranged to cause flow to be evenly distributed over flow field plate 1600.

Distributors can be included in a flow field at locations in the flow field where a mass flow or pressure difference of an individual channel exceeds an average in a radial cross-section (for circumferential channels) or a circumferential cross-section (for radial channels) by more than 5%.

The following description of sizing distributors applies to circumferential distributor (e.g., circumferential distributors 1626) and radial distributors (e.g., radial distributors 1726). Distributors can be used to provide a more uniform mass flow entering an adjacent downstream tier. A distributor can be sized to have a hydraulic resistance which is at least 10% less than that of an adjacent downstream tier. Hydraulic resistance can be expressed for laminar flow as pressure drop per unit flow volume. For tiers which transit a primary flow in a radial direction of a flow field plate, which are fluidly in parallel with one another, hydraulic resistance can be defined as being in the radial direction. For distributors which transit a secondary flow preceding a radial tier, hydraulic resistance can also be defined as being in the circumferential direction. A pressure drop for laminar flows is generally proportional to a volumetric flow rate, and the volumetric flow rate is generally equal to a speed of the flow multiplied by a cross-sectional area through which the flow transits. Hence, hydraulic resistance can be inversely proportional to cross-sectional area. For tiers that are fluidly in parallel, it is desirable (for a more uniform flow) for the cross-sectional area of a distributor to be at least 10% larger than a cross-sectional area of a channel in the tiers. The cross-sectional area of a distributor is defined as a product of a width of the distributor radially and its depth through the material thickness direction of the plate (i.e. a depth of the distributor in a direction normal to the major surface of the flow field plate on which the distributor is located).

The same discussion applies to flow fields having circumferential tiers which carry a primary flow in the circumferential direction and radial distributors which carry a secondary flow in the radial direction.

For turbulent flow, the proportionality of hydraulic resistance to volumetric flow can be quadratic.

The width and depth of a circumferential distributor can be sized such that the distributor has a hydraulic resistance which is at least 10% less than a hydraulic resistance in an adjacent downstream tier. When this condition is met, secondary flow in the distributor is more likely to occur as flow exits an adjacent upstream tier thereby improving a uniformity of distribution of fluid mass entering the adjacent downstream tier. The width and depth of the distributor determine the secondary flow cross section, and the secondary flow hydraulic resistance which is then at least 10% less than the hydraulic resistance of channels in the adjacent upstream tier (in the radial direction).

Figure 16B:
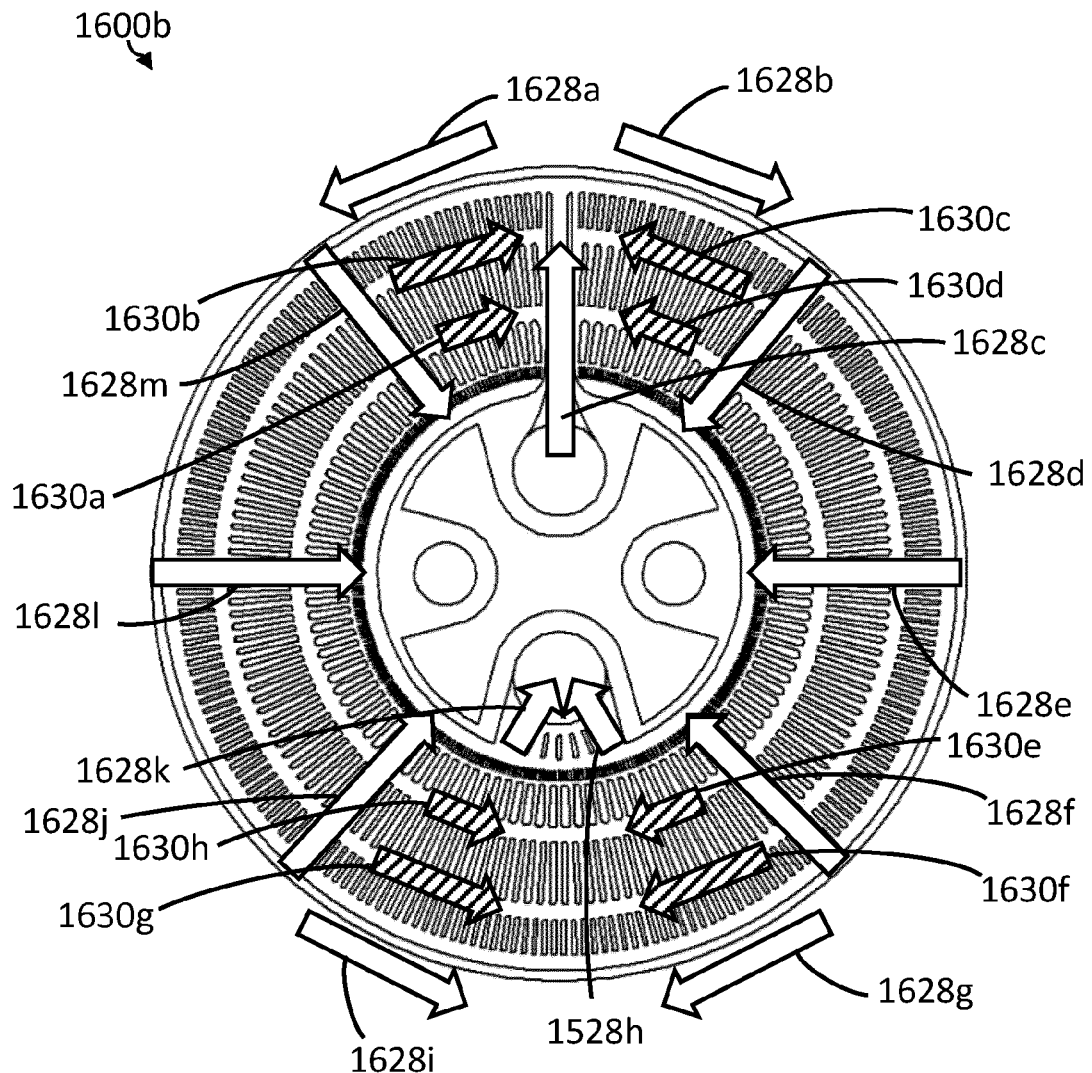
FIG. 16B is a schematic diagram of the tiered flow field plate of FIG. 16A with arrows to show directions of flow in the flow field, according to an example embodiment.

FIG. 16B is a schematic diagram of flow field plate 1600 of FIG. 16A with arrows to show directions of flow in flow field 1602, according to an example embodiment. In some implementations, flow field plate 1600 is a coolant flow field plate, and the arrows of FIG. 16B indicate directions of coolant flow. In other implementations, flow field plate 1600 is a fuel flow field plate.

In one example implementation, flow field 1602 directs flow in flow field plate 1602 as indicated by arrows in FIG. 16B. Primary flow routes 1628a-1628m (collectively referred to as primary flow routes 1628) are indicated by block arrows with no hatching. Secondary flow routes 1630a-1630h (collectively referred to as secondary flow routes 1630) are indicated by block arrows with hatching. Primary flow routes 1628 carry fluid for the purposes of moving fluid from an inlet to an outlet, while secondary flow routes 1630 carry fluid for the purposes of distributing fluid flow such that the flow distribution across flow field 1602 is balanced and uniform. In the example of FIG. 16B, the inlet is coolant port 1620, and the output is coolant port 1622.

Figure 16C:
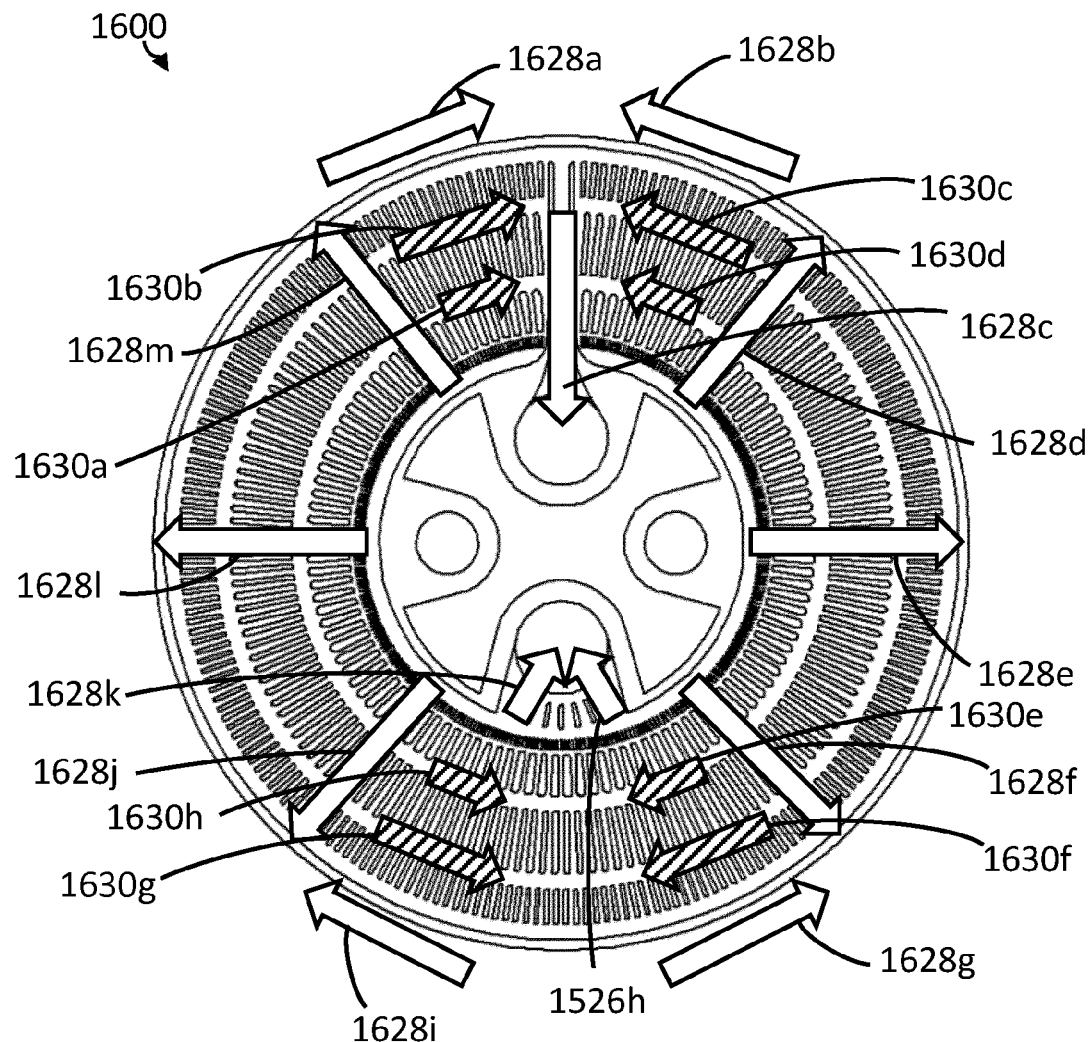
FIG. 16C is a schematic diagram of the tiered flow field plate of FIG. 16A with arrows to show directions of flow in the flow field, according to another example embodiment.

FIG. 16C is a schematic diagram of flow field plate 1600 of FIG. 16A with arrows to show directions of coolant flow in coolant flow field 1602, according to another example embodiment. Flow field 1602 directs flow in flow field plate 1602 as indicated by arrows in FIG. 16C. As in FIG. 16B, primary flow routes 1628 are indicated by block arrows with no hatching, and secondary flow routes 1630 are indicated by block arrows with hatching.

Primary flow routes 1628 of FIG. 16C are reversed relative to primary flow routes 1628 in FIG. 16B. As described above, primary flow routes 1628 carry fluid for the purposes of moving fluid from an inlet to an outlet. In the example of FIG. 16C, the inlet is coolant opening 1620, and the output is coolant opening 1622.

Secondary flow routes 1630 of FIG. 16C are in the same direction as secondary flow routes 1630 of FIG. 16B.

Figure 17A:
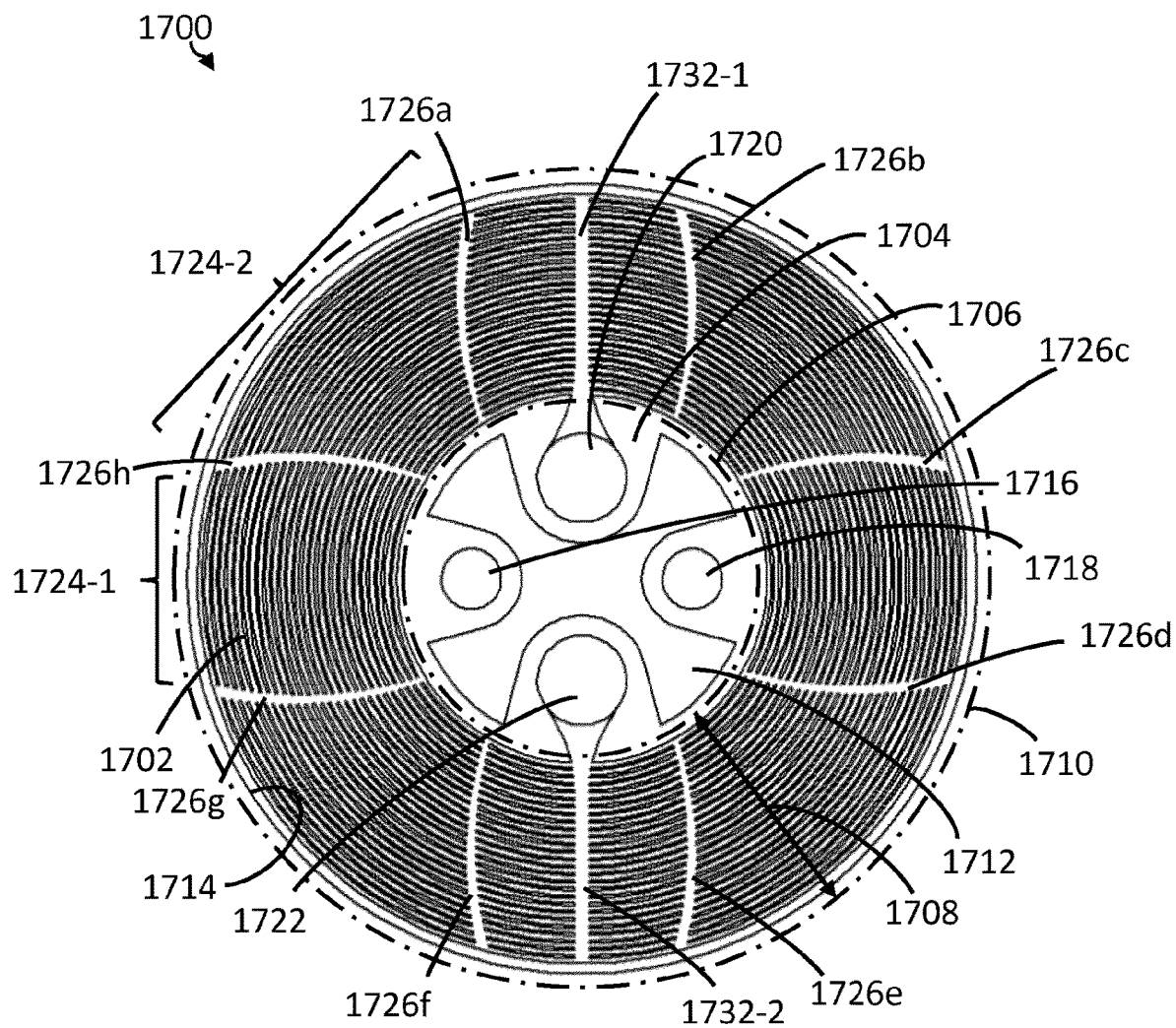
FIG. 17A is a schematic diagram of a tiered flow field plate, according to an example embodiment.
Figure 17B:
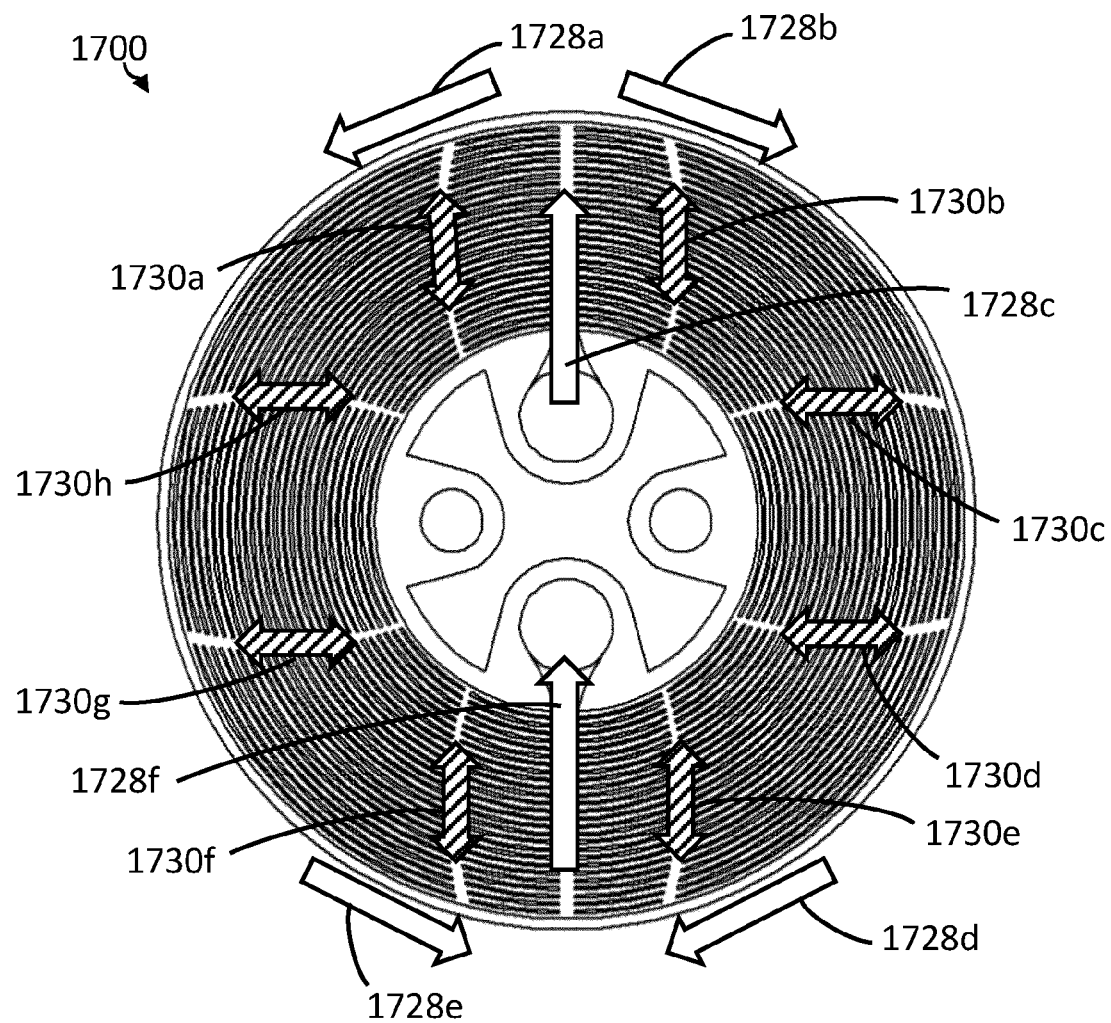
FIG. 17B is a schematic diagram of the tiered flow field plate of FIG. 17A with arrows to show directions of flow in the flow field.

FIG. 17A is a schematic diagram of a tiered flow field plate 1700, according to an example embodiment. FIG. 17A is a view of a major side of flow field plate 1700 where the major side includes a circumferential-tiered coolant flow field 1702. FIG. 17B is a schematic diagram of flow field plate 1700 of FIG. 17A with arrows to show directions of flow in flow field 1702, according to an example embodiment. In some implementations of bipolar plates, circumferential-tiered flow field 1702 can be used as an anode flow field in which case the arrows of FIG. 17B indicate directions of fuel flow. Flow fields 1502, 1602 of FIGS. 15 and 16 respectively can also be used anode flow fields. In some implementations of bipolar plates, it can be advantageous to combine a circumferential anode flow field with a radial cathode flow field. The combination can provide cross-flow and improved support for the MEA.

In one implementation, a bipolar plate includes a) an anode plate having an anode flow field, and an opposing side which is flat, and b) a cathode plate with a cathode flow field, and an opposing side which has a coolant field. In another implementation, a bipolar plate includes a) an anode plate having an anode flow field, and an opposing side which has a coolant field, and b) a cathode plate with a cathode flow field, and an opposing side which is flat. In yet another implementation, a bipolar plate includes a) an anode plate having an anode flow field, and an opposing side which has a coolant field, and b) a cathode plate with a cathode flow field, and an opposing side which has a coolant field.

Flow field plate 1700 has the same or similar layout to layout 600*a* of FIG. 6A. Other implementations of flow field plate 1300 may have other layouts, for example one of the layouts described above in FIGS. 6A-6D, 7A-7E, 8A-8F, and 9A-9C.

Flow field plate 1700 comprises an interior region 1704 bounded by an interior perimeter 1706, and an annular exterior region 1708 bounded by interior perimeter 1706 and an exterior perimeter 1710. In the example illustrated in FIG. 17A, interior perimeter 1706 is a circular interior perimeter, and exterior perimeter 1710 is a circular exterior perimeter.

Flow field plate 1700 comprises central oxidant header 1712, an exterior surface 1714, a pair of fuel openings 1716 and 1718, and a pair of coolant openings 1720 and 1722. Exterior surface 1714 is an edge of flow field plate 1700.

Flow field 1700 is a tiered flow field. Flow field 1702 has eight circumferentially-arranged tiers, including tiers 1724-1 and 1724-2 for example. Only two tiers are shown for clarity in FIG. 17A. The eight tiers of flow field 1702 are collectively referred to herein as tiers 1724. Flow field 1702 includes radial distributors 1726*a*-1726*h* (collectively radial distributors 1726). In some implementations, radial distributors are curved. In some implementations, a radius of curvature of radial distributors 1726 is based at least in part on a locus which ties together a local pressure in each channel to produce a mass flow in radial distributors 1726 which redistributes mass between the channels such that a downstream tier receives a uniform mass flow.

In some implementations, radial distributors 1726 are equally spaced. In other implementations, radial distributors 1726 are spaced, at least in part, to balance mass flow. Spacing can be determined, for example, from the results of computational fluid dynamics (CFD) simulations for a given MEA. For example the CFD simulations identify an area of non-uniform flow a radial distributor may be placed upstream from that location.

In some implementations, radial distributors 1726 have different widths which can provide varying hydraulic resistance and which can promote a flow towards a region of lower hydraulic resistance. In some implementations, radial distributors 1726 may include features to more uniformly distribute flow to each of the downstream channels. In some implementations, the features are dimensioned so that their hydraulic resistance is less than that of individual channels so as to more uniformly distribute flow.

Other implementations of a circumferentially-tiered flow field plate (e.g., a coolant flow field plate or an anode flow field plate) can have more than eight tiers or fewer than eight tiers. Other implementations of a circumferentially-tiered flow field plate can have other numbers and arrangements of transition zones and radial distributors.

Each tier of tiers 1724 of flow field 1702 comprises a plurality of channels, each pair of adjacent channels separated by a respective rib. In the example illustrated in FIG. 17A, the channels follow concentric circular arcs about a center of flow field plate 1700. In some implementations, the number of channels, the width of the channels, and/or the width of the ribs vary from one tier to another. In some implementations, the width of the channels and/or the width of the ribs vary within a tier. The width of the channels and/or the width of the ribs can determine at least in part a ratio of electrical losses and mass transfer losses, as well as affect a rate of liquid water removal/MEA hydration and heat transfer from the MEA to the channel. Channels in adjacent tiers can be aligned or not, depending on a geometry of the tiers and the channels, and the channel:landing ratio, for example.

Channels in flow field 1702 can be rectangular, semi-circular, trapezoidal or another suitable shape in cross-section. Radial distributors 1726 can be placed in locations where they can enhance flow uniformity and reduce a pressure drop across flow field 1702. When flow field plate 1700 is a coolant flow field plate, radial distributors 1726 can be placed in locations where they can enhance flow uniformity and reduce a pressure drop, and improve thermal uniformity across flow field 1702. In some embodiments the flow field is configured so that a flow across the flow field is uniform to within %/−5% of an average flow in the flow field.

As described with reference to FIGS. 16A and 16B, distributors can be included in a flow field at locations in the flow field where a mass flow or pressure difference of an individual channel exceeds an average in a radial cross-section (for circumferential channels) or a circumferential cross-section (for radial channels) by more than 5%.

Flow field 1702 is an example of what is referred to herein as a circumferentially-tiered flow field because tiers 1724 are arranged around the circumference of flow field plate 1700.

Some of radial distributors 1726 are straight (e.g., radial distributor 1726*b*), and others are curved (e.g., radial distributor 1726*a*). The number of radial distributors 1726, and their geometry (straight, zig-zagged, curved, wavy etc.), may be arranged to cause flow to be evenly distributed over flow field plate 1700. It is generally desirable to achieve more uniform flow. To this end, distributors (e.g., radial distributors 1726 in circumferential flow field 1702, and circumferential distributors 1626 in radial flow field 1602) can be placed to cause a secondary flow between the primary flow channels (or tiers) in order to re-distribute mass flow between channels to increase flow uniformity. More flow uniformity can result in a more uniform concentration of reactants, and better thermal uniformity which can drive current density (or reaction rate) uniformity and thereby improved performance and durability.

In some implementations, radial distributors 1726 (and equivalently circumferential distributors 1626 of FIG. 16A) can be placed where a mass flow of an individual channel in a tier or a flow field is expected to deviate from an average mass flow by at least 5%, for example based at least in part on CFD simulations.

Flow field 1702 directs flow in flow field plate 1702 as indicated by arrows in FIG. 17B. Primary flow directions 1728*a*-1728*f* (collectively referred to as primary flow directions 1728) are indicated by block arrows with no hatching. Secondary flow directions 1730*a*-1730*h* (collectively referred to as secondary flow directions 1730) are indicated by block arrows with hatching. Secondary flow can carry a flow excess from primary flow channels that are either overfed or underfed. Secondary flow can cause a primary flow to rebalance at a transition area (in some instances, regardless of operational conditions), and can drive a broad range of operation of a fuel cell where uniform mass flow and current production can be achieved.

Flow field plate 1700 comprises two feed headers 1732-1 and 1732-2 (also referred to herein as feed distributors 1732-1 and 1732-2). Feed headers 1732-1 and 1732-2 can be fluidly coupled to coolant openings 1720 and 1722 ((see, for example, FIG. 19B which shows a back feed/front feed transition, and back feed channels between a header and a flow field).

Referring again to FIGS. 10A-10B, 11A-11B, 12A-12B, 13A-13B, 14A-14C, 15A-15C, 16A-16C, and 17A-17B, a transition zone can be sized (i.e., given a width and a depth) to have less hydraulic resistance than the downstream flow field tier. For example, the hydraulic resistance of the transition zone may be at least 10% less than that of the downstream flow tier. Hydraulic resistance of a tier or transition zone can be determined at an entrance, along a length, or at an exit of the tier or the transition zone. A determination of hydraulic resistance can be a discrete determination or an average determination. Sizing a circumferential transition zone this way in a radial flow field plate (e.g., flow field plate 1000*a* of FIG. 10A) can at least help to drive mass flow circumferentially, thereby improving uniformity of flow in the downstream tier over the flow field plate. Sizing a radial transition zone this way in a circumferential flow field plate (e.g., flow field plate 1700 of FIG. 17A) can at least help to drive mass flow radially, thereby improving uniformity of flow in the downstream tier over the flow field plate. In some implementations, a transition zone has at least 10% lower hydraulic resistance than channels of the downstream tier.

In some implementations, the channel:landing ratio and the number of channels increases in the direction of flow. A channel:landing ratio refers to a ratio of channel width to landing width. If channels or landings are tapered, then the channel:landing ratio can vary advantageously along a length of the channel. For example, tapering channels can improve fuel cell performance by introducing a variation in a ratio of voltage and mass transfer losses along a length of the channels. The circumferential area of each tier (i.e., an area of a respective circular ring sector occupied by each tier) can increase with increasing radius. The channel:landing ratio and the number of channels can be used to control parameters of fluid flow in the flow field plate. In example implementations, the channel:landing ratio can vary between 1:1 and 40:1. Ranges from 1:1 to 40:1, and preferably from 1.25:1 to 40:1 can be beneficial for gas transport and liquid water removal. Ranges from 1:1 to 1:30, and preferably form 1:1.25 to 1:30 can be beneficial for electrical transport and contact resistance. The ranges of channel:landing ratios discussed above assume channel and landing dimensions of between approximately 0.1 mm and 3.5 mm for channels and between approximately 0.1 mm and 3.5 mm for landings.

Figure 18A:
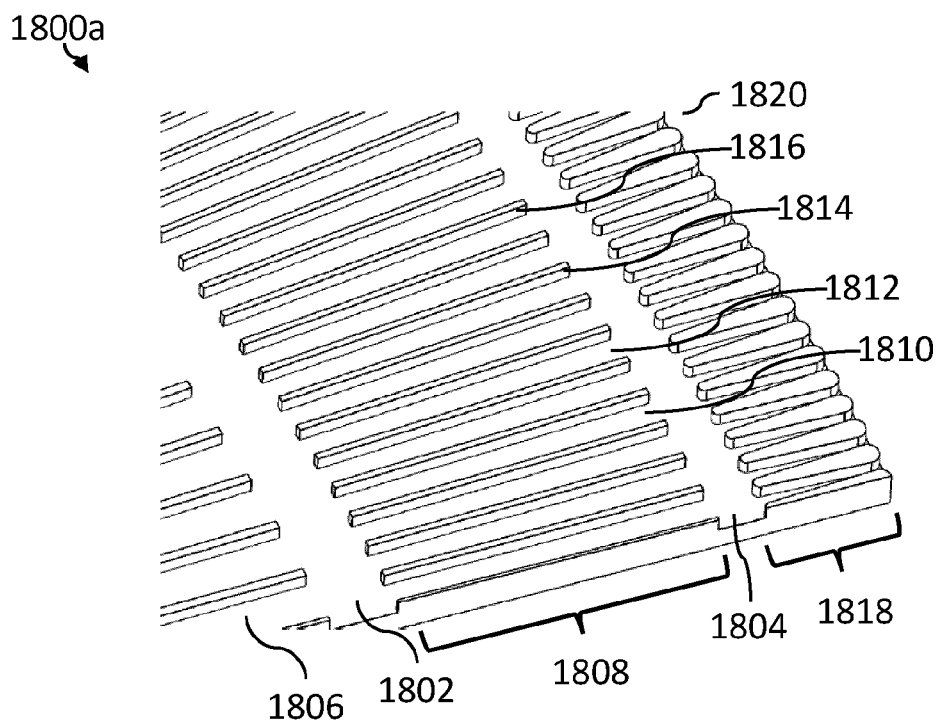
FIGS. 18A and 18B are schematic diagrams that provide a closer view of transition regions of a flow field, according to an example embodiment.
Figure 18B:
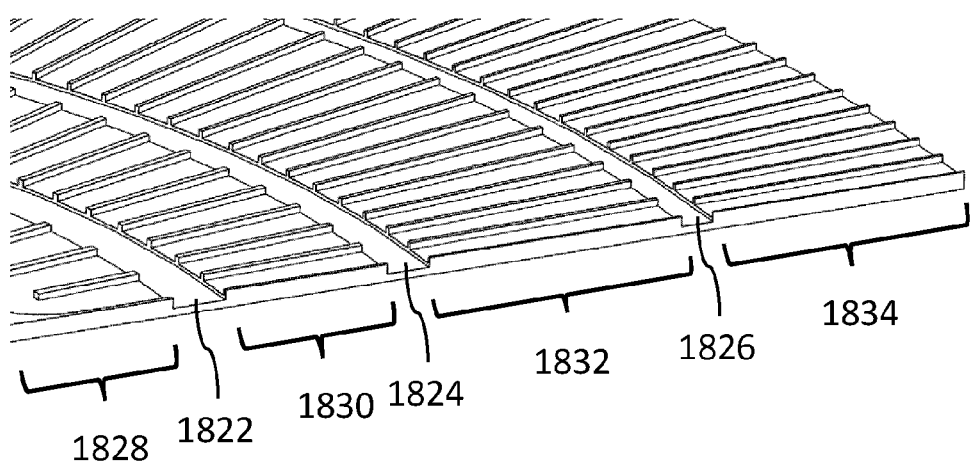

FIGS. 18A and 18B are schematic diagrams that provide a closer view of transition regions of portions 1800*a* and 1800*b*, respectively, of a flow field, according to an example embodiment. Portion 1800*a* comprises transition regions 1802 and 1804 (also referred to herein as transition zones 1802 and 1804), and flow field tiers 1806 and 1808. Flow field 1800*a* also comprises channel regions, for example channel regions 1810 and 1812. Flow field 1800*a* also comprises landing regions, for example landing regions 1814 and 1816.

Transition zones 1802 and 1804 can be dimensioned (in width and depth) to provide a hydraulic resistance to flow which is at least 10% less than that of an adjacent downstream tier. It is desirable to keep usage of plate area as low as possible, and not to compromise a plate strength or increase overall electrical resistance. In some implementations, transition region 1802 is sized to have less hydraulic resistance than tier 1808.

Flow field 1800*a* also comprises a flow restrictor 1818 at an edge 1820 of flow field 1800*a*. Flow restrictor 1818 is a converging flow restrictor which can increase flow speed of oxidant as it exits flow field plate 1800*a*. A converging flow restrictor can be particularly beneficial when a momentum of liquid water removal and achieving uniform flow are paramount. In other implementations, flow restrictor 1818 is a diverging flow restrictor which can decrease flow speed of oxidant as it exits flow field plate 1800*a*. A diverging flow restrictor can be particularly beneficial when increasing a pressure drop across a water droplet or accumulated water and achieving uniform flow are paramount. Flow restrictor 1818 can cause flow distribution to occur in upstream areas of flow field 1800*a*.

Flow field 1800*b* comprises transition regions 1822, 1824, and 1826. Flow field 1800*b* also comprises tiers 1828, 1830, 1832, and 1834. A width and depth of each of transition regions 1822, 1824, and 1826 can be selected to improve flow in flow field 1800*b*. A width of a transition region can be selected to cause hydraulic resistance to be less than that of the adjacent downstream tier (see description above with reference to FIG. 18A). A depth of a transition region can be advantageously selected to be greater than an average depth of the adjacent downstream tier. For example, a depth of transition region 1822 can be selected to be greater than an average depth of tier 1830. Selecting a depth of a transition region to be greater than an average depth of the respective adjacent downstream tier can improve uniformity of flow in flow field plate 1800*b*.

Tiered Anode Flow Fields

Figure 19A:
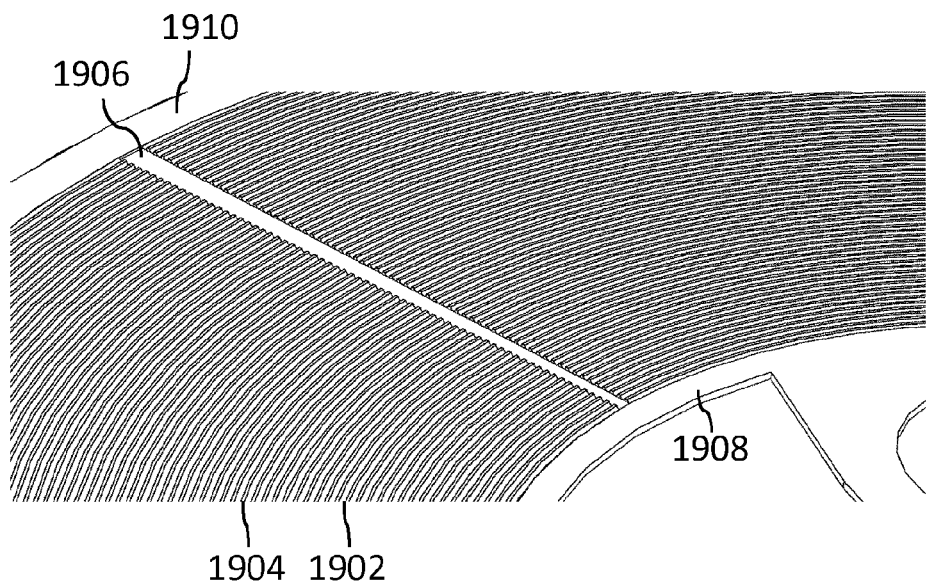
FIGS. 19A and 19B are schematic drawings that show a close-up view of an anode plate, according to an example embodiment.
Figure 19B:
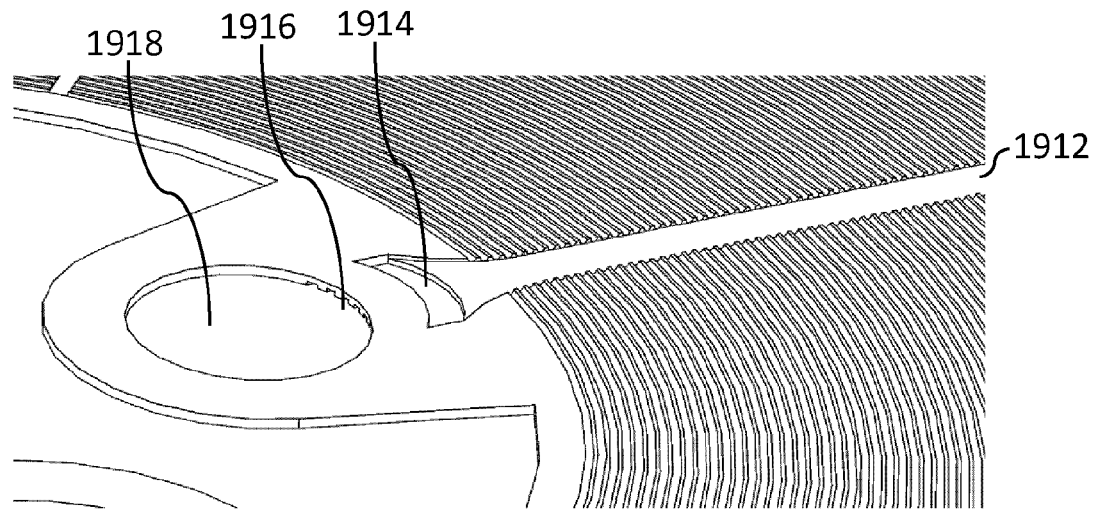

FIGS. 19A and 19B are schematic drawings that show a close-up view of an anode plate 1900, according to an example embodiment. Anode plate 1900 is a circumferentially-tiered flow field plate.

Referring to FIG. 19A, anode plate 1900 comprises channels (e.g., channel 1902) and landings (e.g., landing 1904). Anode plate 1900 also comprises a transition region 1906 which runs in a radial direction. A width of transition region 1906 can vary in the radial direction. In the example shown in FIG. 19A, a width of transition region 1906 increases with radius. Anode plate 1900 also comprises a circumferential sealing edge 1908, and an exterior sealing edge 1910.

Referring to FIG. 19B, anode plate 1900 comprises a header 1912, a back feed/front feed transition 1914, and back feed channels 1916 from port 1918.

It can be advantageous to combine tiered flow fields (for example, as described above with reference to FIGS. 10A-10B, 11A-11B, 12A-12B, 13A-13B, 14A-14C, 15A-15C, 16A-16C, and 17A-17B) with fuel cell layouts in which a central oxidant header, and a fuel inlet and outlet header are situated within a central interior perimeter of the fuel cell layout (for example, as described above with reference to FIGS. 6A-6D, 7A-7E, 8A-8F, and 9A-9C). Transition regions in tiered flow fields can provide fluid distribution and re-distribution to improve uniformity of flow of reactants and/or coolant, which can enable situating a central oxidant header, and a fuel inlet and outlet header within a central interior perimeter to improve performance overall (e.g., a power density of the fuel cell).

In some implementations, an area enclosed by the central interior perimeter is reduced to reduce the overall size of the fuel cell layout while maintaining uniform flow and a low drop in pressure across the flow field.

Fuel Cell Block

Another aspect of the technology relates to integration and packaging of fuel cell modules. As discussed above, some conventional bipolar plates are usually planar rectangular, square, or fan-shaped. Other conventional bipolar plates may be circular or hexagonal. Bipolar plates can be combined with other components, including a membrane electrode assembly (MEA) and seals, to form a fuel cell. Fuel cells can be assembled, usually in series, to form a fuel cell stack. The number and configuration of constituent fuel cells can be selected to achieve a desired power output of a fuel cell stack. There can be limits on the number of fuel cells that can be combined to form a stack. The limits can include dimensional stability, structural stiffness, leak tightness, and uniformity of compression.

When a power output suitable for a real-world application exceeds the power output of a single stack, multiple stacks can be connected in series or, less commonly, in parallel. The fuel cell balance of plant (BOP) can be assembled around the stack(s).

Stacks are typically enclosed in a housing, within which some of the BOP components can be integrated. Larger components may be integrated around the housing, for example. In general, the layout and packaging of the fuel cell system (i.e., the fuel cell stack and the balance of plant) is customized for each application based on a desired performance. A drawback of conventional approaches to integration and packaging can be the cost of non-recurring engineering effort on customization and maintenance of multiple different product platforms and, from a cost and manufacturing basis, the large number of discrete components including piping, wiring, and/or fittings and connectors.

As described earlier with reference to FIG. 5, in some implementations of the present technology, a fuel cell module having a coupling device such as a fastener (also referred to as a locking mechanism) can be inserted into a block and the locking mechanism used to provide a mechanical coupling to secure the fuel cell module in place in the block. When the fuel cell module is inserted into the block and locked in place, fluid couplings may be made automatically between fluid manifolds (also referred to herein as passageways) in the block and corresponding headers in the fuel cell module. At the same time electrical couplings may be made automatically between the fuel cell module and electrical contacts in the block. Electrical power may be carried to power loads by way of the electrical couplings.

In some implementations of the present technology, a fuel cell stack is assembled in a block to form a fuel cell module in which the block serves as a housing. A fluid manifolding stack interface is provided to fluidly couple headers in the fuel cell stack to fluid manifolding (also referred to herein as passageways) internal to the block or to an adjoining block of a fuel cell assembly. More detail is provided with reference to FIGS. 20A-20H below.

Figure 20A:
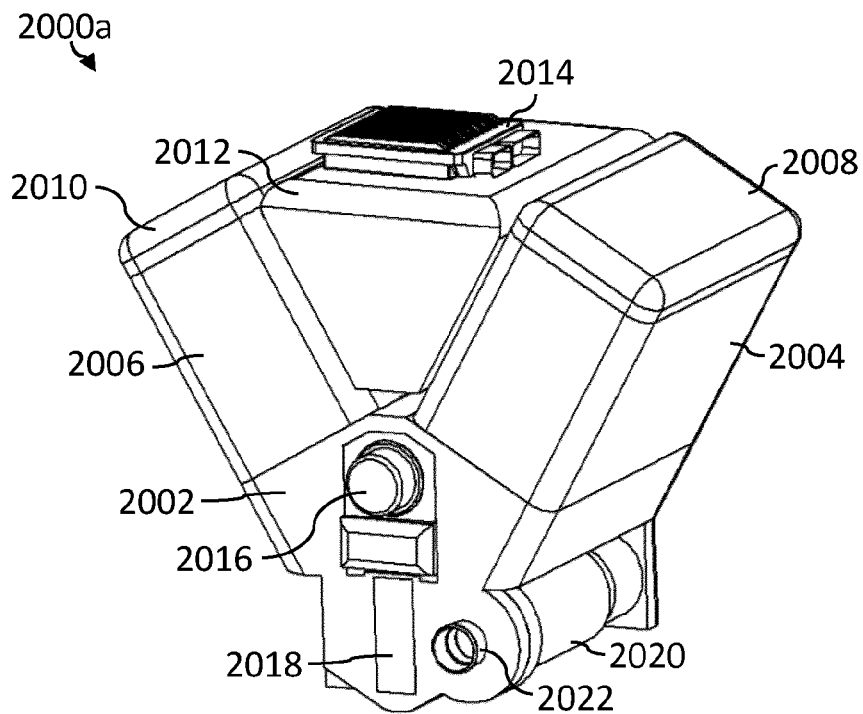
FIGS. 20A and 20B are schematic drawings of a fuel cell power unit, according to an example embodiment.

FIG. 20A is a schematic drawing of a fuel cell power unit 2000a, according to an example embodiment. FIGS. 20C-20E are schematic drawings of partial assemblies 2000b-2000e of fuel cell power unit 2000a of FIG. 20A. The same reference numerals are used in FIGS. 20A-20E to indicate the same or similar elements of fuel cell power unit 2000a.

Referring to FIG. 20A, fuel cell power unit 2000a comprises a plurality of blocks (2004, 2006) that each contain one or more fuel cell stacks (optionally packaged as fuel cell modules) and an additional block 2012 that contains BOP equipment. In the illustrated embodiment, blocks 2004, 2006 have a V-inclined configuration. The overall configuration of fuel cell power unit 2000a may be reminiscent of a V-style internal combustion engine.

In some embodiments, fuel cell power unit 2000a is dimensioned to fit into an engine compartment of a vehicle in place of an internal combustion engine. Fuel cell power unit 2000a may have mounts that are positioned and configured to allow fuel cell power unit 2000a to be attached to engine mounts for the internal combustion engine. Fuel cell engine power unit 2000a may be configured to use mounting points that are already present in a vehicle or mounting points that can be provided without modifying a vehicle layout.

In some embodiments, each of blocks 2004, 2006 supports a subset of fuel cell modules of fuel cell power unit 2000a. For example, from 1 to 6 fuel cell modules may be supported by block 2004 and the same number of fuel cell modules may be supported by block 2006. The fuel cell modules of each block 2004, 2006 can be adjacent to one other and oriented in the same direction as one another. In some implementations, the fuel cell modules of different blocks 2004, 2006 are oriented at angle to one another.

Each of blocks 2004 and 2006 may have a respective block cover 2008 and 2010 (also referred to herein as lids 2008 and 2010). Lids 2008, 2010 may be removed to access fuel cell modules within cavities in blocks 2004/2006. Blocks 2004, 2006 and lids 2008, 2010 protect the fuel cells from contact with dust, moisture, and other contaminants that may surround power unit 2000a.

Fuel cell power unit 2000a further comprises a power electronics/power converter unit 2012, and a fuel cell controller unit 2014. Block 2002 comprises a micro-coolant loop pump 2016, a bypass valve 2018, an air compressor 2020, and an air intake 2022. Fuel cell power unit 2000a may further comprise various valves, actuators, and/or sensors (not shown in FIG. 20A).

Figure 20B:
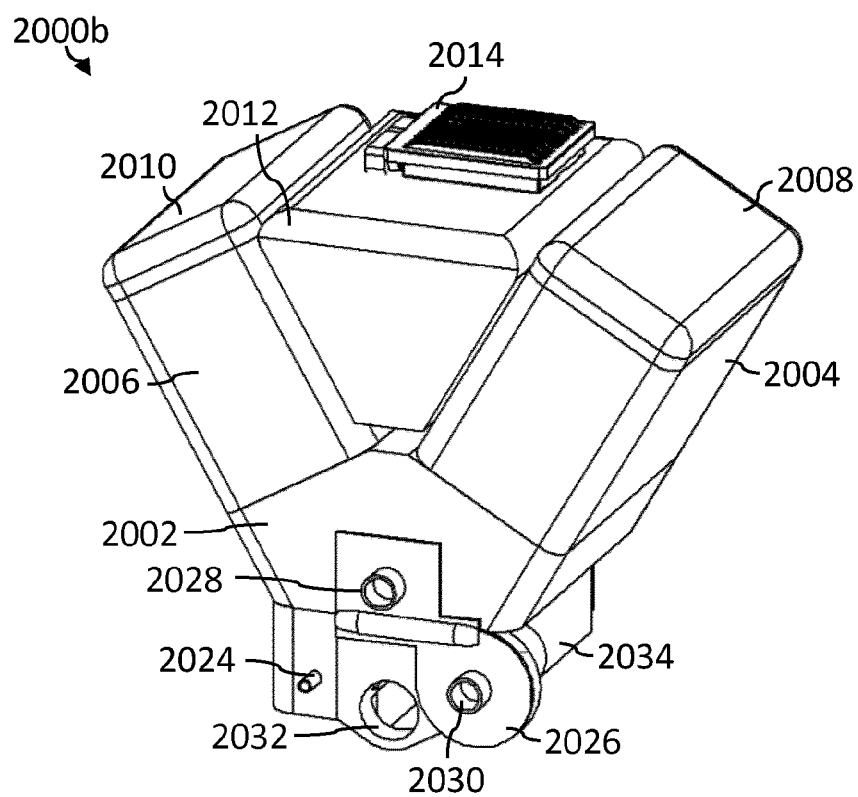
Figure 20C:
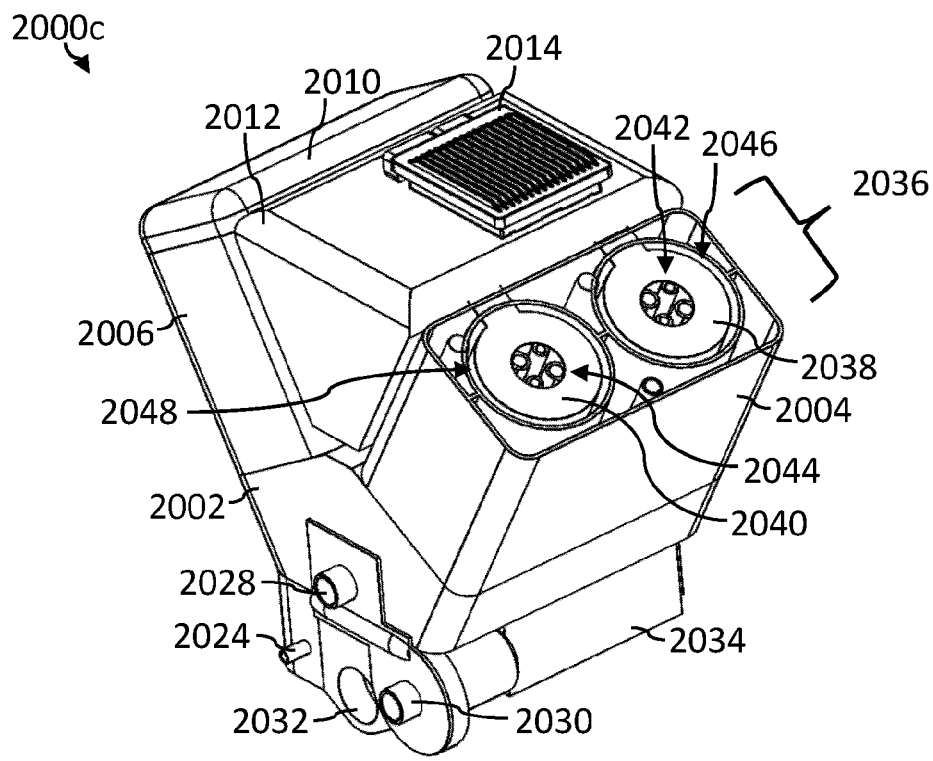
FIGS. 20C-20E are schematic drawings of partial assemblies of the fuel cell power unit of FIGS. 20A and 20B.
Figure 20D:
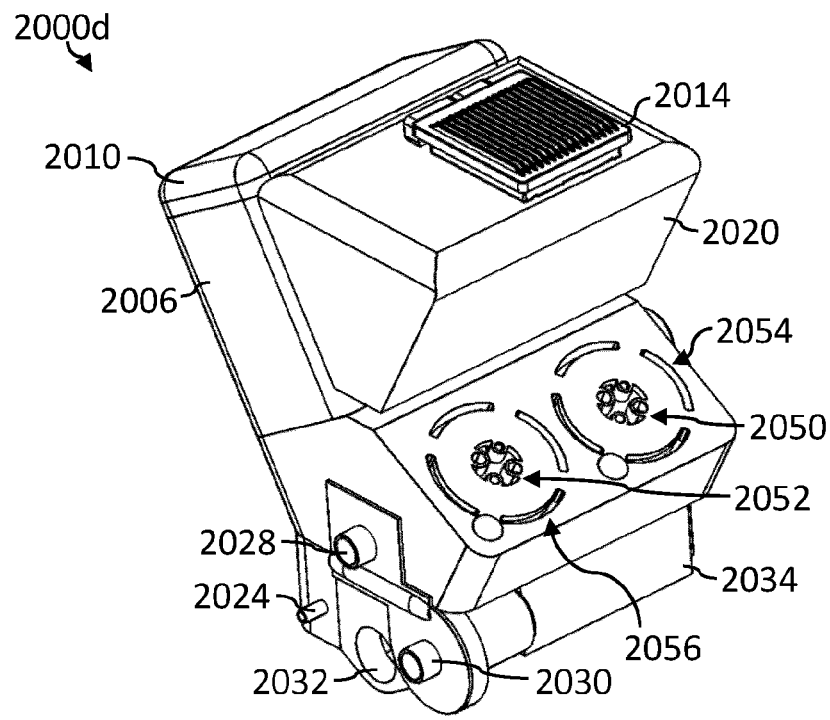
Figure 20E:
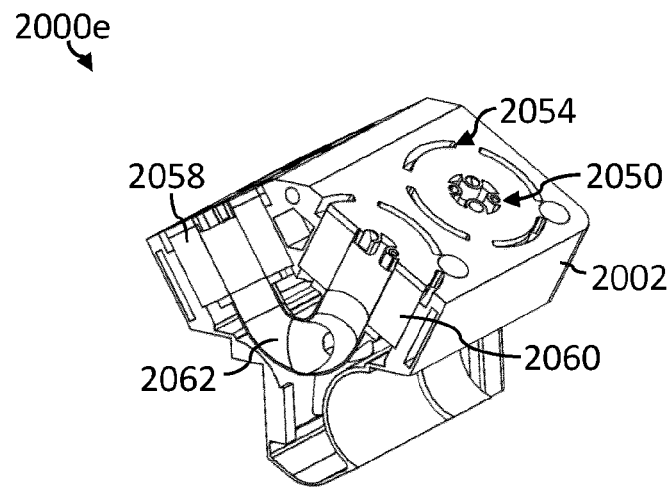

Referring to FIG. 20B, block 2002 of partial assembly 2000b comprises a hydrogen pump 2024, a coolant pump 2026, a pair of coolant ports 2028 and 2030, a central exhaust 2032, and an intercooler 2034.

Referring to FIG. 20C, block 2004 of partial assembly 2000c comprises a row 2036 having two fuel cell modules 2038 and 2040. As described with reference to FIG. 5, in some implementations, each of fuel cell modules 2038 and 2040 includes a respective fuel cell stack and a respective housing. In other implementations, fuel cell stacks are assembled in blocks 2004 and 2006, and each of blocks 2004 and 2006 forms a housing of one or more respective fuel cell modules.

Fuel cell stacks of modules 2038 and 2040 comprise central internal manifolding 2042 and 2044, respectively. Fuel cell stacks of modules 2038 and 2040 comprise internal manifolding 2046 and 2048, respectively, at an exterior perimeter of the stack.

Referring to FIG. 20D, block 2002 of partial assembly 2000d comprises central internal fluid manifolding stack interfaces 2050 and 2052, and internal manifolding stack interfaces 2054 and 2056 at an exterior perimeter of fuel cell stacks 2038 and 2040, respectively. Block 2002 may also provide a compression plate for an implementation in which a fuel cell stack is assembled in block 2004 or 2006 using block 2004 or 2006 as a housing. An opposing compression plate may be provided by lid 2008 or 2010, respectively.

Referring to FIG. 20E, block 2002 of partial assembly 2000e comprises humidifier cartridges 2058 and 2060, and internal fluid manifolding 2062.

Figure 20F:
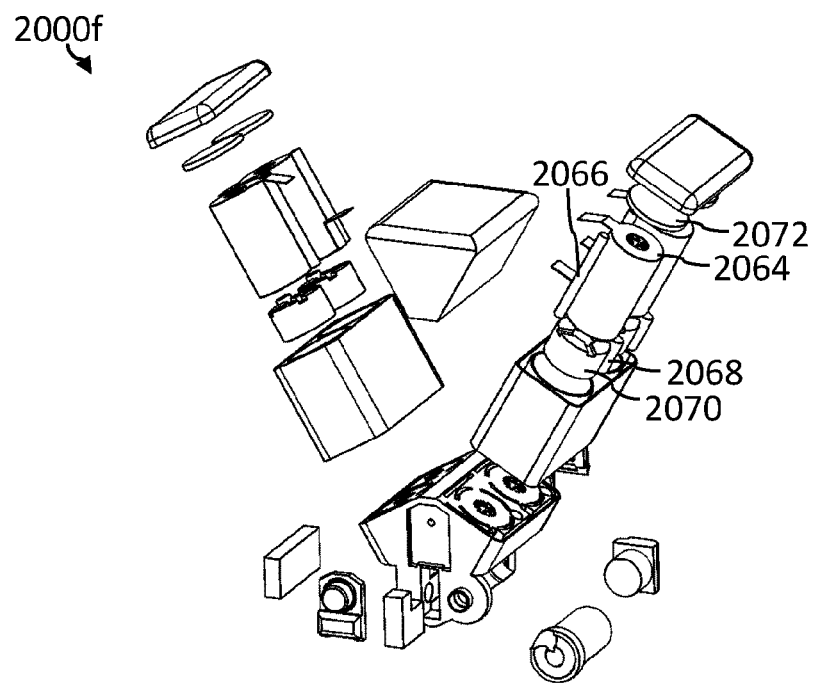
FIG. 20F is an exploded view of the fuel cell power unit of FIG. 20A.

FIG. 20F is an exploded view of fuel cell power unit 2000a of FIG. 20A. Fuel cell power unit 2000a comprises current collector plates at each end of each fuel cell module (for example, current collector plate 2064—for clarity, only one is labeled in FIG. 20F), a passive/ejector fuel pump 2066, a water separator 2068, an oxidant humidifier 2070, and a compression and isolation cap or lid 2072.

Figure 20G:
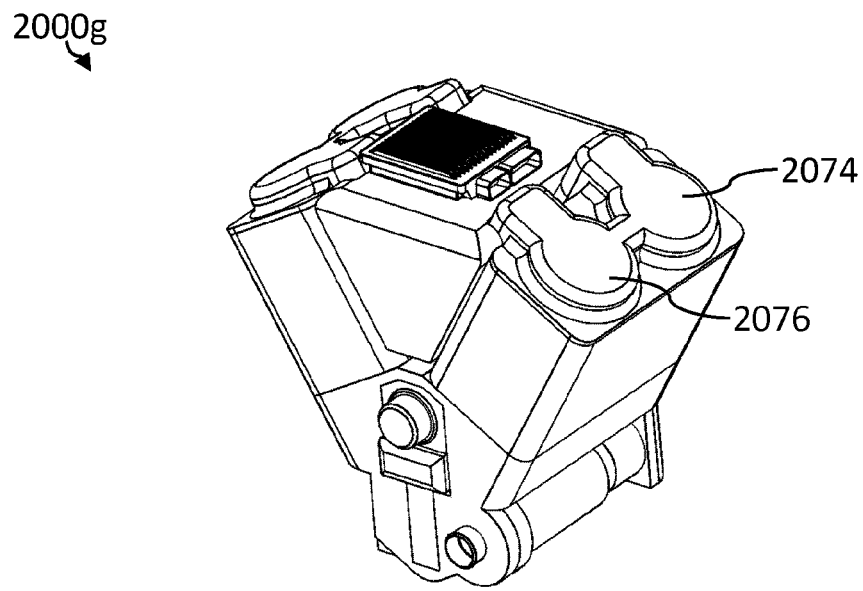
FIG. 20G is a schematic diagram of a fuel cell power unit according to another example embodiment.

FIG. 20G is a schematic diagram of a fuel cell power unit 2000g, according to another example embodiment. Fuel cell power unit 2000g comprises combination lids 2074 and 2076 that provide oxidant manifolding as well as stack compression. Oxidant can be fed from both ends of the stack simultaneously, and oxidant exhausted via an oxidant manifold on the exterior of the stack inside the housing.

Figure 20H:
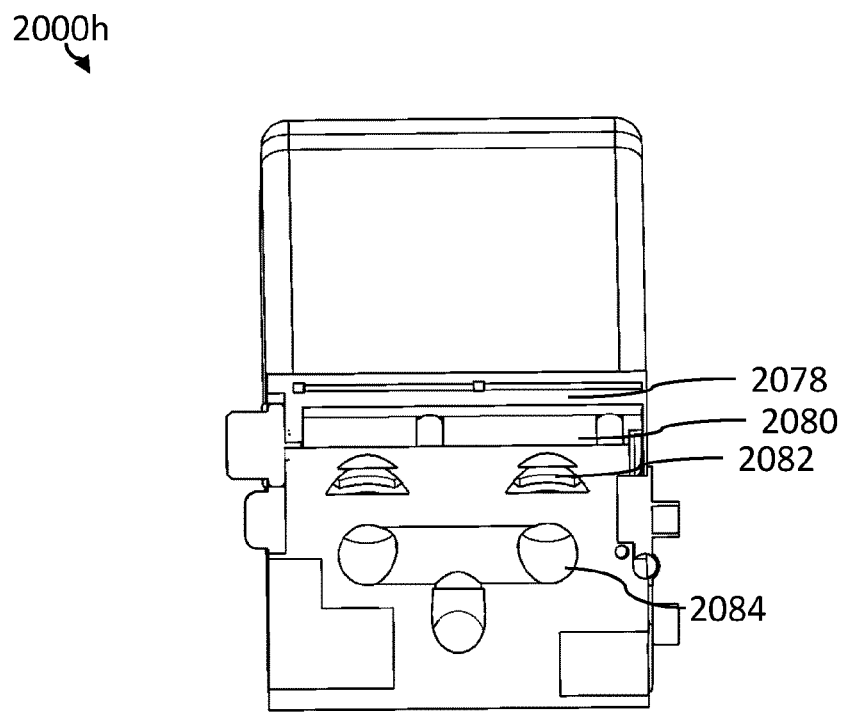
FIG. 20H is a schematic diagram of a fuel cell power unit cut away to expose fluid routing via passageways that are internal to a block.

FIG. 20H is a schematic diagram of a fuel cell power unit (e.g., fuel cell power unit 2000a or 2000g) cut away to expose fluid routing via passageways that are internal to a block (e.g., block 2002 of FIG. 20A), according to an example embodiment. Passageways include internal fuel passageways 2078, internal coolant passageways 2080, and internal oxidant passageways 2084. The illustrated block also includes internal oxidant humidifiers 2082.

It can be seen that in some embodiments a fuel cell block (e.g. block 2004 or 2006) may be penetrated by channels (e.g. cylindrical bores). Fuel cell stacks as described herein may be received in each of the channels. The fuel cell block 2004, 2006 may be fixed to another block (e.g. block 2002). In some embodiments, each fuel cell stack is compressed between a surface of or supported by block 2002 and a lid (e.g. lid 2008, 2010, 2072, 2074, 2076). Advantageously the surface supported by the other block 2002 may provide fluid manifolding stack interfaces (e.g. 2050 or 2052). In some such embodiments proper compression of a fuel cell stack in a cylinder may be achieved by fastening (e.g. by bolting) a compression lid that includes suitable springs onto the fuel cell block.

While in some implementations, fuel cell modules are assembled and coupled to a fuel cell power unit. In other implementations, a fuel cell stack can be assembled in a block of the fuel cell power unit (e.g., block 2004 or 2006). For example, individual plates and MEAs can be laid into the block. The block can perform functions that would normally be provided by a stack housing and stack compression system. The enclosure of the block can for example provide stack housing and compression. A lower (e.g. block 2002) can provide another (opposing) compression plate surface—typically the same surface that provides a fluid manifolding interface. Furthermore, in some implementations, block 2002 and/or block 2004 and/or block 2006 can serve to provide stack alignment.

In some implementations, an inner wall of a block 2004, 2006 can form a boundary for oxidant flow. In some implementations, a lid and cap of block 2004, 2006 can be used to apply compression to the stack. An adjacent block (e.g., block 2002) can provide the other (opposing) compression plate surface, between which the fuel cell stack can be sandwiched and compressed.

In this approach, the fuel cell stack is highly integrated into a fuel cell power unit. In some embodiments, oxidant, fuel, and/or coolant can be fed from both ends of a stack at the same time. A lid and cap of block 2004, 2006 can optionally include manifolds to direct an oxidant stream, a fuel stream, and/or a coolant stream to the lid end of a stack at the same time as manifolds in block 2002 directs oxidant, fuel, and/or coolant to the base of the stack. Manifolds in block 2002 can be fluidly coupled to manifolds in the lid, and optionally for the oxidant a second air compressor can be included. Blocks 2004, 2006 can include fluid passageways similarly to block 2002.

As illustrated in FIGS. 20A-20H, fuel cell power unit 2000a can have one or more features not found in conventional fuel cell systems. These features include:

Fluid routing (including fuel, oxidant, and coolant) can be contained within block 2002. Fluid routing can be molded internally within block 2002. See, for example, internal fluid manifolding 2062 of FIG. 20E. Internal fluid manifolding can include one or more passageways for directing fuel, oxidant, and/or coolant to respective headers in one or more fuel cell modules.

Major balance of plant (BOP) components can be provided in block 2002. Examples of BOP components that can be integrated include an air compressor 2026, humidfier cartridges 2058 and 2060, system bypass (see bypass valve 2018 of FIG. 20A), a passive or active fuel (e.g. hydrogen) pump 2024, and a cooling pump 2026.

Cooling pump 2026 may have a micro loop and a main loop, which may reduce start, stop, and/or freeze-start demands on an MEA. In some implementations, for example fuel cell power unit 2000a of FIG. 20A, a micro-coolant loop pump 2016 is integrated with block 2002. The micro-coolant loop can be used to recirculate coolant by shutting down a main coolant distribution valve and using waste heat from the stacks to assist in raising a temperature of the stack(s) and block(s) more rapidly than would otherwise.

A block heater can be coupled to the block, and to the micro-coolant loop, to provide an additional heat source in order to increase a temperature of the engine block(s) and stack(s) more rapidly than otherwise.

A power electronics/power converter unit 2012 (including a DC-DC converter, or a DC-AC converter, or both) can be integrated as shown in FIG. 20A. Power electronics/power converter unit 2012 can provide a regulated voltage for BOP components integrated with fuel cell power unit 2000a.

Mounting locations can be provided so that BOP components can be embedded internally or at least partially enclosed by block 2002 and/or blocks 2004 and 2006.

Block 2002 can provide a media supply plate as well as stack compression, stack alignment, and/or intrusion protection (against dust, water, etc.).

Block 2002 can provide oxidant flow to fuel cell stacks 2038 and 2040 from central manifolds at both ends of the stacks (e.g., at the top and the bottom of the stacks). In some implementations, block 2002 provides oxidant flow via central internal manifolding 2042 and 2044 at the top of fuel cell modules 2038 and 2040, respectively, and via central internal manifolding at the bottom of fuel cell modules 2038 and 2040 through central internal fluid manifolding stack interfaces 2050 and 2052, and oxidant is exhausted to an exterior perimeter of modules 2038, 2040 via internal manifolding 2046 and 2048, respectively, at the exterior perimeter.

In some implementations, fuel cell power unit 2000a includes a plug-in block heater (not shown in FIGS. 20A-20E).

Fuel cell modules (e.g., modules 2038 and 2040) can be inserted in fuel cell power unit 2000a.

A lid and compression and isolation plate can provide compression and (optionally) at least a portion of the oxidant manifolding.

Since fuel cell power unit 2000a has no external piping and wiring, it advantageously occupies a smaller volume than a conventional fuel cell system having a similar power rating. The result is a fuel cell power unit with higher power density.

Fuel cell power unit 2000a may be mounted under a cabin of a truck, for example.

Fuel cell power unit 2000a may be manufactured by envision machining, casting, 3D-printing, extrusion, molding, etc. or another suitable method of manufacturing.

Figure 21A:
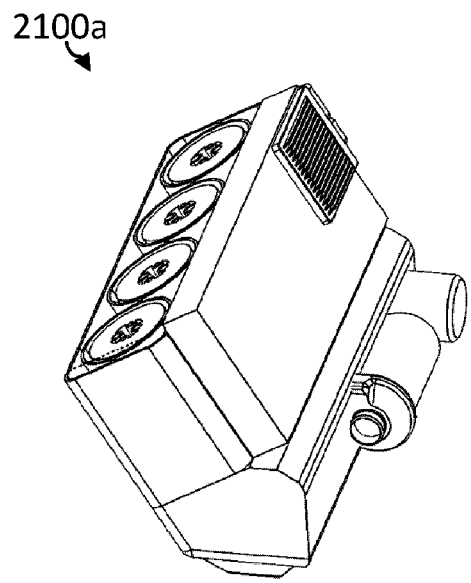
Figure 21B:
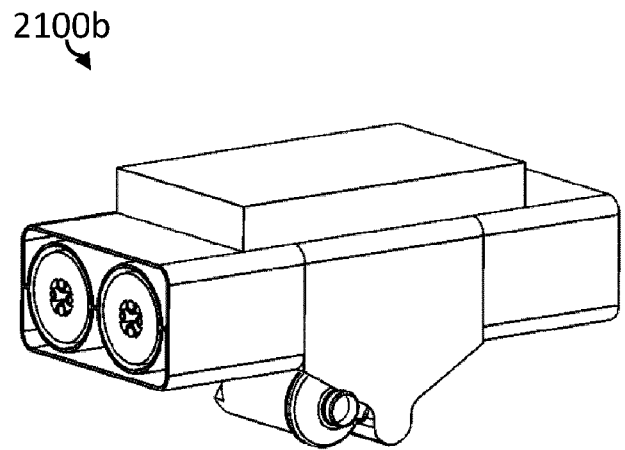
Figure 21C:
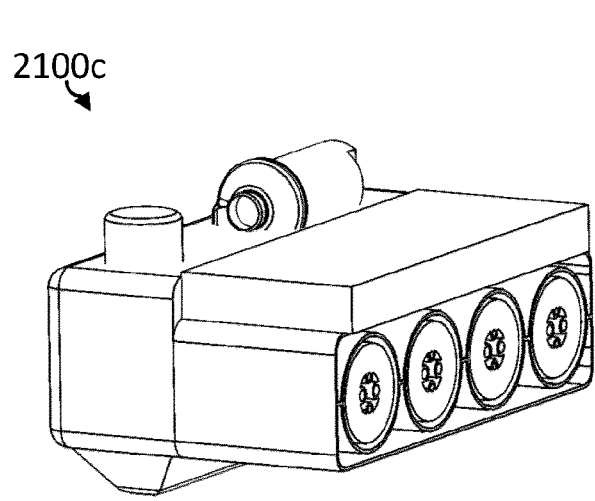
Figure 21D:
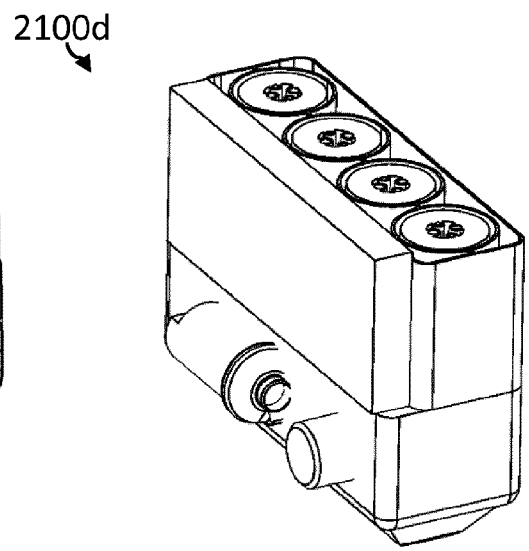

FIGS. 21A-21G are schematic diagrams of fuel cell power unit configurations, according to various example embodiments. FIG. 21A is a schematic diagram of a cylinder inclined fuel cell power unit 2100a. FIG. 21B is a schematic diagram of a vertical fuel cell power unit 2100b. FIG. 21C is a schematic diagram of a horizontal fuel cell power unit 2100c. FIG. 21D is a schematic diagram of a boxer fuel cell power unit 2100d. FIG. 21E is a schematic diagram of a revolver fuel cell power unit 2100e. FIG. 21F is a schematic diagram of a radial fuel cell power unit 2100f with a square outer form factor. FIG. 21G is a schematic diagram of a radial fuel cell power unit 2100g with a circular outer form factor.

Systems and methods described herein relate to fuel cell modules and fuel cell power units, and can advantageously:
reduce demands on an oxidant supply system, for example by reducing a pressure drop between an oxidant inlet and an oxidant outlet;
increase an available active area of the fuel cell module relative to the layout of the fuel cell module; and
reduce production costs of the fuel cell module and the fuel cell block, and increase service life.
Improved flow uniformity which increases performance and lifetime of the MEA. Improved flow uniformity which increases performance and lifetime of the MEA Improved flow uniformity which increases performance and lifetime of the MEA.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Methods as described herein may be varied in a range of ways. For example, while processes or blocks are presented in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed sequentially, they may instead be performed simultaneously or in different sequences. It is therefore intended that the following claims are interpreted to include all such variations as are within their intended scope.

Where a component (e.g. frame, fan, membrane, panel, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the technology.

Where this disclosure indicates that a feature is provided "in some embodiments" or in "example embodiments" or "in some implementations" that feature may optionally be provided an any other described embodiment as long as the feature is not incompatible with the other described embodiment. The feature may be provided on its own or in any combination with other features.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A fuel cell stack comprising:
a plurality of fuel cells configured to provide an oxidant header, a fuel input header and a fuel output header that extend through the plurality of fuel cells along the stack,
wherein each of the plurality of fuel cells comprises a membrane electrode assembly sandwiched between first and second flow field plates, the membrane electrode assembly and flow field plates each having a major surface wherein an interior region is bounded by an interior perimeter and an exterior region bounded by the interior perimeter and an exterior perimeter that encompasses the interior perimeter, and the interior region is formed with a plurality of openings that collectively fill a majority of an area of the interior region, the plurality of openings including at least:
an oxidant opening;
a fuel inlet opening; and
a fuel outlet opening;
wherein:
at least a portion of a perimeter of the oxidant opening is coextensive with the interior perimeter;
at least a portion of the fuel inlet opening and at least a portion of the fuel outlet opening are partly surrounded by at least a portion of the perimeter of the oxidant opening;
the oxidant openings of the flow field plates and membrane electrode assembly are aligned to provide the oxidant header;
the fuel inlet openings of the flow field plates and membrane electrode assembly are aligned to provide the fuel input header; and
the fuel outlet openings of the flow field plates and membrane electrode assembly are aligned to provide the fuel output header;
the first and second flow field plates are respectively formed to provide first and second flow fields respectively located in the exterior regions of the first and second flow field plates that face the membrane electrode assembly and extend substantially circumferentially around the interior region; and
the fuel input header and the fuel output header are both in fluid communication with the first flow field; and
the oxidant header is in fluid communication with the second flow field.

2. The fuel cell stack of claim 1, wherein the first and second flow fields each cover at least 90% of an area of the exterior region.

3. The fuel cell stack of claim 1 wherein a ratio of the area of the exterior region to the area of the interior region is at least 2½:1.

4. The fuel cell stack of claim 1 wherein the first and second flow fields extend radially outward from the interior perimeter.

5. The fuel cell stack of claim 1 wherein in each of the first and second flow field plates the oxidant opening has an area that is at least equal to a combined area of the fuel inlet opening and the fuel outlet opening.

6. The fuel cell stack of claim 1 wherein the first flow field comprises a first transition region located adjacent to a first tier of one or more tiers, each of the one or more tiers comprising a respective plurality of channels wherein adjacent ones of the channels are separated by a respective landing, wherein the first transition region is configured to provide a hydraulic resistance to flow that is less than a hydraulic resistance of the first tier.

7. The fuel cell stack of claim 6, wherein the hydraulic resistance of the first transition region is at least 10% lower than the hydraulic resistance of the first tier.

8. The fuel cell stack of claim 6 wherein the first transition region has a cross sectional area that is at least 10% greater than the cross sectional areas of the channels of the first tier.

9. The fuel cell stack of claim 6 wherein the first transition region has a depth that is greater than depths of the channels of the first tier.

10. The fuel cell stack of claim 6 wherein the one or more tiers comprises a plurality of tiers and the fuel cell stack comprises one or more additional transition regions located between two adjacent ones of the plurality of tiers wherein the one or more additional transition regions have depths that are greater than an average depth of the channels of the adjacent ones of the plurality of tiers.

11. The fuel cell stack of claim 6, wherein the first flow field is a circumferential flow field, and the channels of the one or more tiers are curved to direct a flow of fluid from the fuel input header around the interior perimeter to the fuel outlet header.

12. The fuel cell stack of claim 11 wherein the one or more tiers comprises a plurality of tiers that are spaced circumferentially around the interior perimeter.

13. The fuel cell stack of claim 6, wherein the first flow field is a radial flow field, the one or more tiers are spaced radially, the respective plurality of channels of each tier are oriented radially, and the first transition region is a circumferential transition region that is adjacent to, and surrounds, the interior perimeter.

14. The fuel cell stack of claim 6 wherein the one or more tiers comprises a plurality of tiers and each of the plurality of tiers comprises a different number of the channels.

15. The fuel cell stack of claim 6, wherein the channels of a second tier of the one or more tiers are tapered in width.

16. The fuel cell stack according to claim 1 wherein the plurality of openings that collectively fill a majority of the area of the interior region include a first coolant opening and the first coolant openings of the flow field plates and membrane electrode assembly are aligned to provide a first coolant header that extends along the fuel cell stack, wherein the first coolant header is in fluid communication with a third flow field in each of the fuel cells.

17. The fuel cell stack of claim 16 wherein the plurality of openings that collectively fill a majority of the area of the interior region include a second coolant opening and the second coolant openings of the flow field plates and membrane electrode assembly are aligned to provide a second coolant header that extends along the fuel cell stack, wherein the second coolant header is in fluid communication with the third flow field in each of the fuel cells.

18. The fuel cell stack of claim 1 wherein at least one of the fuel input header and the fuel output header are in fluid communication with the first flow field by way of a transition that penetrates through the first flow field plate.

19. The fuel cell stack of claim 1 wherein the second flow field comprises a first transition region located adjacent to a first tier of one or more tiers of the second flow field, each of the one or more tiers of the second flow field comprising a respective plurality of channels wherein adjacent ones of the channels of the second flow field are separated by a respective landing, wherein the first transition region of the second flow field is configured to provide a hydraulic resistance to flow that is less than a hydraulic resistance of the first tier of the second flow field.

20. The fuel cell stack of claim 19 wherein the one or more tiers of the second flow field comprises a plurality of tiers, the second flow field comprises one or more additional transition regions located between two adjacent ones of the plurality of tiers and the one or more additional transition regions of the second flow field have depths that are greater than an average depth of the channels of the adjacent ones of the plurality of tiers.

21. The fuel cell stack of claim 20 wherein the second flow field comprises one or more additional transition regions located between two adjacent ones of the plurality of tiers.

22. The fuel cell stack of claim 19, wherein the second flow field is a radial flow field, the one or more tiers of the second flow field are spaced radially, the respective plurality of channels of each tier of the second flow field are oriented radially, and the first transition region of the second flow field is a circumferential transition region that is adjacent to, and surrounds, the interior perimeter.

23. The fuel cell stack of claim 1 wherein the second flow field is a radial flow field, the second flow field plate defines an outer surface that extends around the second flow field and the outer surface is apertured to allow passage of an oxidant through the outer surface.

24. The fuel stack of claim 1 comprising a housing enclosing the fuel cells and configured to apply axial compression to the fuel cells of the fuel cell stack.

25. The fuel cell stack according to claim 1 comprising an end cap at one end of the fuel cell stack, wherein the end cap supports a humidifier, a purge valve, and a fuel pump operative to pump fuel into the fuel inlet header or out of the fuel outlet header.

26. A fuel cell assembly comprising at least one fuel cell stack according to claim 1 and a fuel cell block, wherein the fuel cell block comprises:

a cavity, a fuel inlet passageway for directing fuel to the fuel inlet header of the fuel cell stack;

a fuel outlet passageway for collecting a fuel exhaust stream from the fuel outlet header of the fuel cell stack; and an oxidant passageway for directing oxidant to, or collecting an oxidant exhaust stream from the oxidant header of the fuel cell stack and a fluid manifolding stack interface, wherein the fuel cell stack is received within the cavity and the fluid manifolding stack interface fluidly couples the fuel inlet header to the fuel inlet passageway in the block, the fuel outlet header to the fuel outlet passageway in the block, and the oxidant header to the oxidant passageway in the block.

27. The fuel cell assembly of claim 26 comprising a plurality of the fuel cell stacks each received in a corresponding cavity within the block.

28. The fuel cell assembly of claim 26 wherein each respective fuel cell stack in the block comprises a respective coolant inlet header and a respective coolant outlet header and the fuel cell block comprises a coolant inlet passageway for directing coolant to the coolant inlet header of each respective fuel cell stack; and a coolant outlet passageway for collecting a coolant exhaust stream from the coolant outlet header of each respective fuel cell stack wherein the fluid manifolding stack interface fluidly couples the coolant inlet header of each respective fuel cell stack to the coolant inlet passage and couples the coolant outlet header of each respective fuel cell stack to the coolant outlet passage.

* * * * *